(12) United States Patent
Miyazoe et al.

(10) Patent No.: US 7,694,317 B2
(45) Date of Patent: Apr. 6, 2010

(54) CATV TRANSMISSION LINE MONITORING SYSTEM, METHOD, AND PROGRAM

(75) Inventors: Eiji Miyazoe, Kanagawa (JP); Katsunobu Hagiwara, Shizuoka (JP); Masafumi Nakatake, Tokyo (JP)

(73) Assignee: OSS Broadnet K.K., Kanagawa (JP)

( * ) Notice: Subject to any disclaimer, the term of this patent is extended or adjusted under 35 U.S.C. 154(b) by 1263 days.

(21) Appl. No.: 11/121,987

(22) Filed: May 5, 2005

(65) Prior Publication Data

US 2005/0204397 A1    Sep. 15, 2005

Related U.S. Application Data

(63) Continuation of application No. PCT/JP03/13612, filed on Dec. 9, 2002.

(30) Foreign Application Priority Data

Nov. 11, 2002    (JP) .............................. 2002-326787

(51) Int. Cl.
H04N 7/16    (2006.01)
H04N 7/173    (2006.01)
(52) U.S. Cl. .................... 725/14; 725/107; 725/111
(58) Field of Classification Search ................ 725/14, 725/107, 111
See application file for complete search history.

(56) References Cited

U.S. PATENT DOCUMENTS 6,449,250 B1 *    9/2002    Otani et al. ................ 370/219
6,501,756 B1 *    12/2002    Katsube et al. ............. 370/392
2007/0183591 A1 *    8/2007    Geile et al. ................. 379/362

FOREIGN PATENT DOCUMENTS

| JP | 10-164547 | 6/1998 |
|---|---|---|
| JP | 11-331235 | 11/1999 |
| JP | 2002-247607 | 8/2002 |

* cited by examiner

Primary Examiner—Christopher Kelley
Assistant Examiner—Franklin S Andramuno
(74) Attorney, Agent, or Firm—Wenderoth, Lind & Ponack, L.L.P.

(57) ABSTRACT

When a failure detection server calculates a measurement average value at every predetermined time with respect to measured values collected in the past, and collects measured values from cable modems, the server sets a failure determination threshold value by adding or subtracting a predetermined difference threshold value to or from the measurement average value so as to determine the presence of failure. A failure analysis server performs a screening process of inputting determined failure information and eliminating logically conflicting failure information, obtains a differential of the screened failure information between this time and previous time so as to extract changed failure information and newly generated failure information, and then, repeats state determination at an upstream connection point, starting from a cable modem having failure information, so as to estimate the failure generated location.

21 Claims, 46 Drawing Sheets

FIG. 9

| MEASUREMENT ITEM | SORT | SYSTEM-DEFINED THRESHOLD VALUE | | STATISTICAL DIFFERENCE THRESHOLD VALUE | | | | USER-DEFINED THRESHOLD VALUE | |
|---|---|---|---|---|---|---|---|---|---|
| | | SL | SH | VL | L | H | VH | UL | UH |
| DOWNSTREAM TRANSMISSION LEVEL | THRESHOLD VALUE (UNIT) | 45 (dBµV) | 75 (dBµV) | −3 (dB) | −1 (dB) | +1 (dB) | +3 (dB) | (dBµV) | (dBµV) |
| UPSTREAM TRANSMISSION LEVEL | THRESHOLD VALUE (UNIT) | 68 (dBµV) | 118 (dBµV) | −4 (dB) | −2 (dB) | +2 (dB) | +4 (dB) | (dBµV) | (dBµV) |
| DOWNSTREAM S/N | THRESHOLD VALUE (UNIT) | 25 (dB) | | −4 (dB) | −2 (dB) | +2 (dB) | | (dB) | |
| UPSTREAM S/N | THRESHOLD VALUE (UNIT) | 25 (dB) | | −4 (dB) | −2 (dB) | +2 (dB) | +4 (dB) | (dB) | |

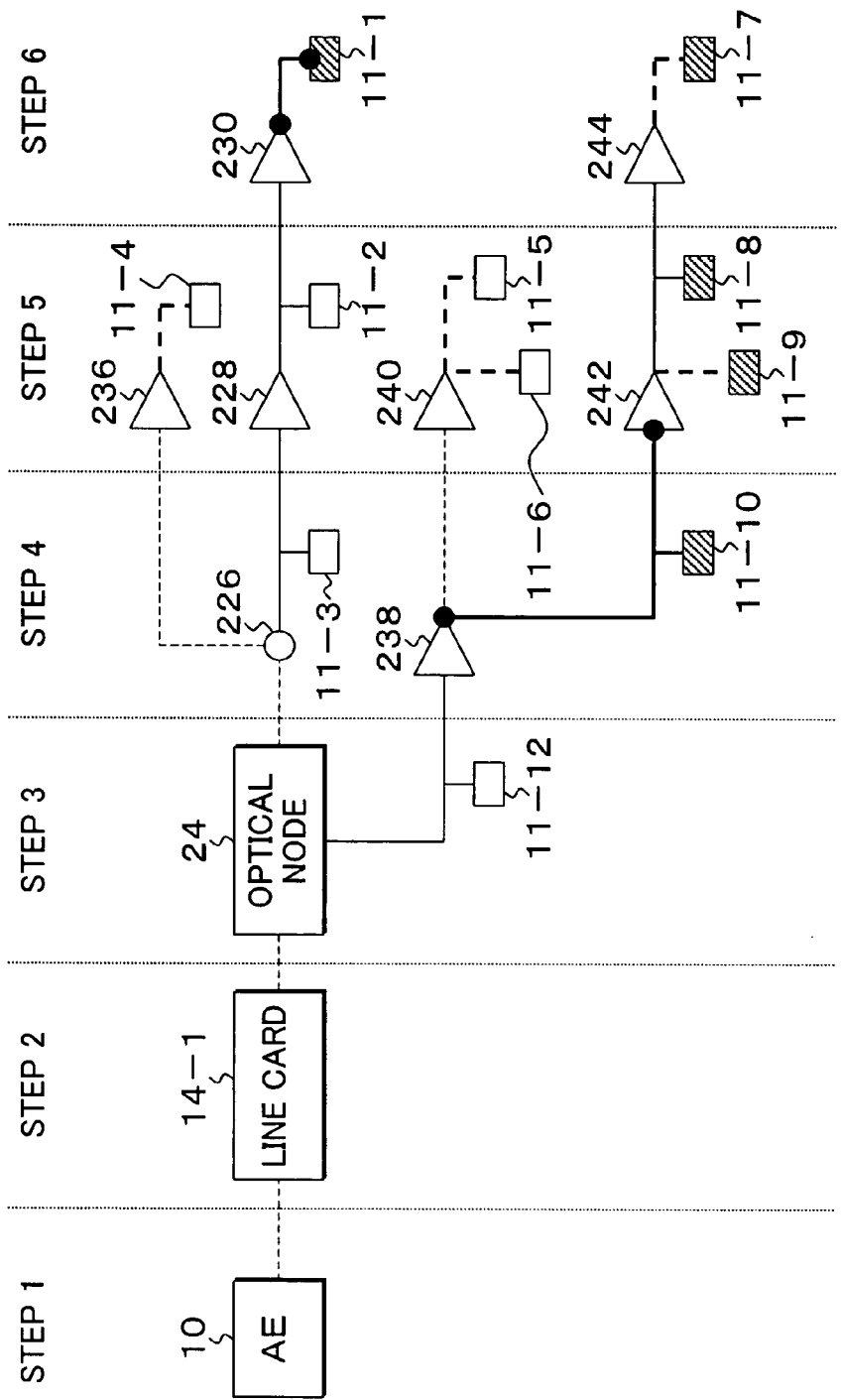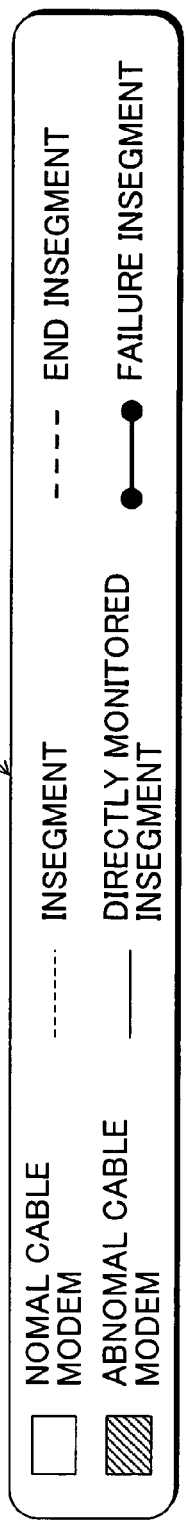
FIG. 22A
FIG. 22B

| ADDRESS | STATUS | FAILURE SUBSTANCE | STATE INFORMATION |
|---|---|---|---|
| BODY 7-Z | UNDETERMINED | | |
| PORT 7-0 | UNDETERMINED | DOWNSTREAM S/N FAILURE | |
| PORT 7-1 | UNDETERMINED | DOWNSTREAM S/N FAILURE | |
| PORT 7-2 | UNUSED | | |
| PORT 1-2 | UNDETERMINED | | |

| ADDRESS | STATUS | FAILURE SUBSTANCE | STATE INFORMATION |
|---|---|---|---|
| BODY 7-Z | UNDETERMINED | | |
| PORT 7-0 | UNDETERMINED | DOWNSTREAM S/N FAILURE | |
| PORT 7-1 | UNDETERMINED→FAILURE | DOWNSTREAM S/N FAILURE | |
| PORT 7-2 | UNUSED | | |
| PORT 1-2 | UNDETERMINED | | |

| ADDRESS | STATUS | FAILURE SUBSTANCE | STATE INFORMATION |
|---|---|---|---|
| BODY 7-Z | UNDETERMINED→ENTIRE FAILURE | | |
| PORT 7-0 | UNDETERMINED→FAILURE | DOWNSTREAM S/N FAILURE | |
| PORT 7-1 | FAILURE | DOWNSTREAM S/N FAILURE | |
| PORT 7-2 | UNUSED | | |
| PORT 1-2 | UNDETERMINED | | |

| ADDRESS | STATUS | FAILURE SUBSTANCE | STATE INFORMATION |
|---|---|---|---|
| BODY 7-Z | ENTIRE FAILURE | | |
| PORT 7-0 | FAILURE | DOWNSTREAM S/N FAILURE | |
| PORT 7-1 | FAILURE | DOWNSTREAM S/N FAILURE | |
| PORT 7-2 | UNUSED | | |
| PORT 1-2 | UNDETERMINED | | |

| ADDRESS | STATUS | FAILURE SUBSTANCE | STATE INFORMATION |
|---|---|---|---|
| BODY 1-Z | UNDETERMINED→MIXED FAILURE | | |
| PORT 1-0 | NORMAL | | |
| PORT 1-1 | NORMAL | DOWNSTREAM S/N FAILURE | |
| PORT 1-2 | UNDETERMINED→FAILURE | DOWNSTREAM S/N FAILURE | BACKWARD FAILURE SEGMENT |

| ADDRESS | STATUS | FAILURE SUBSTANCE | STATE INFORMATION |
|---|---|---|---|
| BODY 2-Z | UNDETERMINED→ENTIRE FAILURE | | |
| PORT 2-0 | UNDETERMINED→FAILURE | NO RESPONSE | |
| PORT 8-0 | NORMAL | | |
| PORT 8-1 | NORMAL | | |
| BODY 8-Z | UNDETERMINED | | |

| ADDRESS | STATUS | FAILURE SUBSTANCE | STATE INFORMATION |
|---|---|---|---|
| BODY 2-Z | UNDETERMINED→ENTIRE FAILURE | | FORWARD FAILURE INSEGMENT |
| PORT 2-0 | FAILURE | NO RESPONSE | |
| PORT 8-0 | NORMAL→FAILURE | NO RESPONSE | |
| PORT 8-1 | NORMAL | | |
| BODY 8-Z | UNDETERMINED→ENTIRELY NORMAL | | |

| ADDRESS | STATUS | FAILURE SUBSTANCE | STATE INFORMATION |
|---|---|---|---|
| BODY 4-Z | UNDETERMINED→ENTIRE FAILURE | | |
| PORT 4-0 | UNDETERMINED→FAILURE | DOWNSTREAM TRANSMISSION LEVEL VARIATION FAILURE | |
| BODY 1-Z | UNDETERMINED | | |
| PORT 1-0 | UNDETERMINED | | |

| ADDRESS | STATUS | FAILURE SUBSTANCE | STATE INFORMATION |
|---|---|---|---|
| BODY 4-Z | ENTIRE FAILURE | | |
| PORT 4-0 | FAILURE | DOWNSTREAM TRANSMISSION LEVEL VARIATION FAILURE | |
| BODY 1-Z | UNDETERMINED→MIXED FAILURE | | |
| PORT 1-0 | UNDETERMINED→FAILURE | DOWNSTREAM TRANSMISSION LEVEL VARIATION FAILURE | FAILURE INSEGMENT |
| PORT 1-1 | NORMAL | | |
| PORT 1-2 | NORMAL | | |

CATV TRANSMISSION LINE MONITORING SYSTEM, METHOD, AND PROGRAM

This application is a continuation of PCT/JP03/13612, filed Oct. 24, 2003.

TECHNICAL FIELD

The present invention relates to CATV transmission line monitoring systems, methods, and programs for estimating failure locations on transmission lines by detecting failure from collected information of cable modems installed so as to be distributed over feeder lines of the premises of subscribers and a trunk line, and in particular, relates to CATV transmission line monitoring systems, methods, and programs for estimating failure locations by detecting failure from measured values without being affected by diurnal variation, seasonal variation, etc.

BACKGROUND ART

In a conventional CATV transmission line monitoring system, transponders are mounted on an optical node, two-way amplifiers, power supplies, etc. installed on the transmission lines, and a transmission line monitoring computer in the center side periodically subjects each of the transponders to polling via a headend, so as to collect data of the devices to be monitored. In this monitoring system, each of the transponders directly monitors and operates an object device, therefore many parameters of, for example, opening and closing of a casing, power consumption, interior temperature, etc. can be collected. Furthermore, it has an advantage of having an advanced function such as a function of opening and closing an upstream gate of branching lines, in which, for example, part of an operation for specifying streamed noise failure in the upstream can be subjected to a remote operation performed at a headend station.

However, there have been various drawbacks, for example, since the conventional CATV transmission line monitoring system using transponders is an independent communication system in which both the hardware and software are dedicated to transmission line monitoring, the system is expensive, and the transponders are mounted in outdoor-use device casings, accordingly, harsh environmental conditions, i.e., high temperature and high humidity cause failure and malfunctions in the transponders per se, thereby generating operation/maintenance cost increasing factors.

Therefore, attention has been focused on cable modems used in the cable television internet, and it is proposed a simple CATV transmission line monitoring system for monitoring transmission lines by utilizing standard network management protocol of cable modems, as a simple CATV transmission line monitoring system in which excessive monitoring and control functions provided in the case when transponders are used are omitted and merely minimum functions required for maintenance of transmission lines are implemented (JP2002-247607).

Meanwhile in a conventional system for monitoring transmission lines by utilizing cable modems, measured values according to cable modems, such as downstream reception levels and downstream S/N, are collected through polling, and failure is detected by comparing the measured values with predetermined threshold values. However, since CATV transmission lines are strongly affected by temperature variation due to, for example, solar irradiation and seasonal variation, failure determination using threshold values as absolute values is not always appropriate. Therefore, relative evaluation in which measured values collected through polling are stored as statistical data in, for example, year units, and threshold values are set relatively with the average value of the corresponding season and time of the previous year serving as a reference, thereby effectively determining failure. However, measured values of at least one year have to be stored for such relative evaluation, and it takes too much time to start the relative evaluation. Moreover, the diurnal temperature variation of the same day of the previous year is not necessarily same as the actual diurnal temperature variation. Therefore, threshold values are set relatively using the monthly average value of the same month of the previous year as a reference, wherein it is expected that the difference with the actual diurnal temperature variation is considerably large when the monthly average is used, and, even in failure determination according to relative threshold values, it is difficult to sufficiently eliminate the influence due to temperature variation.

When failure is determined from measured values obtained through polling of cable modems disposed in the premises of subscribers on feeder lines which are ends of CATV transmission lines, generally, failure points are mapped with the positions of the cable modems positioned at ends in the system diagram of the CATV transmission lines having a tree structure, and geometry analysis is performed, thereby estimating failure locations on the transmission lines. If there are not many failure points, the estimation of malfunction locations is carried out comparatively easily. However, because measured values are collected by subjecting a plurality of cable modems, which are disposed in the premises of subscribers on end feeder lines of CATV transmission lines, to polling, so as to determine malfunctions, in some cases, measured values of a plurality of cable modems are determined to be in failure at the same time, and the substances of the failure are different in failure points. In this case, analysis of failure locations by means of geometry analysis cannot be assumed to be always appropriate, and an algorithm of which process for estimating failure locations that is simple and highly accurate is required.

In addition to the cable modems disposed in the premises of subscribers on end feeder lines of CATV transmission lines, cable modems are disposed also on trunk lines in accordance with needs, and measured values are collected through polling so as to determine failure. However, measured values of the cable modems disposed on transmission lines in this manner are sometimes erroneously determined to be in failure due to causes unique to cable modems even though upstream and downstream signals are normal, and presence of erroneous failure points on the transmission lines may lead to erroneous estimation of malfunction locations.

Furthermore, measured values collected through polling from cable modems disposed on premises of subscribers on feeder lines and a trunk line of CATV transmission lines are stored, and subjected to multipoint statistical display for carrying out comparison display of, for example, downstream signal levels of a plurality of cable modems in a graph of monthly variation thereof. However, the number and types of transmission devices to be passed through from a headend to cable modems vary in each cable modem, and there is a problem that, even if the measured values of such cable modems are subjected to multipoint statistical display, appropriate comparison and determination cannot be carried out since the correlation as a transmission system is low.

DISCLOSURE OF INVENTION

An object of the present invention is to provide a CATV transmission line monitoring system, a method, and a program for enabling failure determination of measured values without being affected by temperature variation due to, for example, solar irradiation and seasonal variation.

Another object of the present invention is to provide a CATV transmission line monitoring system, a method, and a program for enabling quick and accurate estimation of failure locations on CATV transmission lines in accordance with failure points on the transmission lines and ends of the transmission lines.

Another object of the present invention is to provide a CATV transmission line monitoring system, a method, and a program that can appropriately carry out multipoint statistical display of measured values of the transmission lines and ends of the transmission lines.

In order to accomplish the objects, the present invention is configured as the following.

(Statistical Difference Threshold Value)

The present invention provides a CATV transmission line monitoring system serving as a failure detection server for enabling failure determination of measured values without being affected by temperature variation due to, for example, solar irradiation and seasonal variation.

The CATV transmission line monitoring system is characterized by comprising an information collecting unit for collecting, in a headend side, measured values detected at a plurality of cable modems installed so as to be distributed over feeder lines of a subscriber's premise side and a trunk line of CATV transmission lines having a tree structure; a statistical processing unit for, at every predetermined time interval, calculating an average value of the measured values collected during the interval and storing the average value as statistically processed information; a threshold value setting unit for, when the measured values are collected from the cable modems, setting a failure determination threshold value by adding or subtracting a predetermined statistical difference threshold value to or from the average value of a previous time; and a failure determination unit for determining the presence of failure by comparing the set failure determination threshold value with a threshold value collected at this point, and storing the determination result as failure information.

Herein, the statistical processing unit calculates, for example at every 20-minute interval, an average value of the measured values collected during the interval. The threshold value setting unit sets failure determination threshold values in multiple degrees by subjecting a plurality of statistical difference threshold values to addition/subtraction (addition and/or subtraction) with respect to an average value of a previous time.

As described above, in the present invention, an average value is obtained from the measured values of, for example, each 20 minute interval collected from cable modems, and used as a reference value for relatively determining the threshold values of the subsequent 20 minutes, and the threshold values for failure determination are set by adding or subtracting predetermined plus and minus statistical difference threshold values to or from the reference value; accordingly, relative threshold value setting corresponding to actual temperature variation due to, for example, solar irradiation and seasonal variation can be realized, and, even when measured values vary under great influence of temperature variation, precise failure determination canceling out the variation due to temperature variation can be carried out.

The present invention provides a CATV transmission line monitoring method, and the method is characterized by comprising an information collecting step of collecting, in a headend side, measured values detected at a plurality of cable modems installed so as to be distributed over feeder lines of a subscriber's premise side and a trunk line of CATV transmission lines having a tree structure, by an information collecting unit;

a statistical processing step of, at every predetermined time interval, calculating an average value of the measured values collected during the interval and storing the average value as statistically processed information, by a statistical processing unit;

a threshold value setting step of, when the measured values are collected from the cable modems, setting a failure determination threshold value by adding or subtracting a predetermined statistical difference threshold value to or from the average value of a previous time, by a threshold setting unit; and a failure determination step of determining the presence of failure by comparing the set failure determination threshold value with a threshold value collected at this point, and storing the determination result as failure information, by a failure determination unit.

The present invention provides a program executed by a computer constituting a CATV transmission line monitoring system installed in a headend side. The program is characterized by causing the computer to execute an information collecting step of collecting, in the headend side, measured values detected at a plurality of cable modems installed so as to be distributed over feeder lines of a subscriber's premise side and a trunk line of CATV transmission lines having a tree structure;

a statistical processing step of, at every predetermined time interval, calculating an average value of the measured values collected during the interval and storing the average value as statistically processed information;

a threshold value setting step of, when the measured values are collected from the cable modems, setting a failure determination threshold value by adding or subtracting a predetermined statistical difference threshold value to or from the average value of a previous time; and a failure determination step of determining the presence of failure by comparing the set failure determination threshold value with a threshold value collected at this point, and storing the determination result as failure information.

(Failure Analysis Process)

The present invention provides a CATV transmission line monitoring system that can estimate failure locations on CATV transmission lines quickly and accurately according to failure points on the transmission lines and ends of the transmission lines.

The CATV transmission line monitoring system is characterized by comprising a failure information input unit for inputting failure information (determined failure information) determined from measured values of a plurality of cable modems installed so as to be distributed over feeder lines and a trunk line of CATV transmission lines having a tree structure, and failure information (trap failure information) collected from the cable modems; a screening processing unit for eliminating logically conflicting failure information from the failure information of the cable modems; a failure information extraction unit for extracting changed failure information and newly generated failure information by obtaining a differential of screened failure information between this time and a previous time; and a failure location estimation unit for estimating a failure generated location by repeating state determination at an upstream connection point, starting from an end position of the CATV transmission lines on which a cable modem having the failure information is disposed.

A screening process for eliminating logically conflicting failure information from the failure information of the cable modems to be subjected to analysis is performed in this manner; accordingly, accuracy of subsequently performed estimation of the failure location(s) can be significantly improved. For example, when a measurement point on transmission is determined to be in failure, and if a measurement point in the downstream side is normal and a measurement point in the upstream side is also normal, the failure information is logically conflicting, and therefore eliminated as failure information and it is treated as being normal.

Herein, the failure location estimation unit is characterized by being provided with a transmission line definition unit for defining, with respect to transmission devices positioned at two connection points, an insegment (failure search unit) of the downstream-side device ranging from a common circuit of the downstream-side transmission device to an individual circuit of the upstream-side transmission device, and expressing the CATV transmission lines as a continuous collection of the insegments; a failure specification processing unit for setting an end insegment (failure end insegment) at which the cable modem corresponding to the failure information is positioned, and then, specifying the failure insegment by repeating determination in an insegment unit toward the upstream side; and a failure substance estimation unit for estimating the failure substance by analyzing the failure substance of the transmission device of the specified failure insegment.

In this manner, in the present invention, a new idea of insegment is introduced as a unit for analyzing a failure substance, and CATV transmission lines are expressed by being logically abstracted as an insegment collection; accordingly, the data structure thereof is simplified, and the data structure is caused to be suitable for analysis of failure locations.

It should be noted that the insegment does not represent mere connection point (branching point when viewed from the upstream) on the transmission lines, but is an idea including the interior of transmission devices of a downstream-side device, i.e., from a common circuit of the downstream-side transmission device to an individual circuit of the upstream-side transmission device. When a failure insegment is specified in accordance with the idea, the internal circuit of the amplifier is further analyzed so as to estimate down to the malfunction substance of the device.

The transmission line definition unit allocates a unique address to each of device bodies, input ports, and output ports of the transmission devices on the CATV transmission lines, and the address of the insegment allocates the output port address of the upstream-side transmission device, which belongs to the insegment. Therefore, specifically, the insegment continuous collection is expressed by being logically abstracted as a continuous collection of address/parent address, i.e., the allocated address of the insegment and the allocated address of the upstream-side insegment serving as a parent address.

In this manner, in practice, CATV transmission lines serving as an insegment collection are expressed as a continuous collection of address/parent address using allocated address of the insegment, and the data structure thereof is simple. When failure information and device information are linked by use of the addresses, efficient analysis of malfunction locations can be performed in insegment units.

If a cable modem is disposed between the common circuit of the downstream-side transmission device and the individual circuit of the upstream-side transmission device belonging to an insegment, the transmission line definition unit divides the insegment into insegments of the upstream side (backward) and the downstream side (forward) bordering at the position of the cable modem. In this case, the failure specification processing unit specifies the downstream-side divided insegment (forward) as a failure location if the cable modem positioned on a failure insegment has normal information, and specifies the upstream-side divided insegment (backward) as a failure location if the cable modem has failure information.

In this manner, by virtue of the cable modem disposed on the transmission line, the failure insegment is divided into that of the upstream and that of the downstream so as to perform estimation narrowing down the failure location, and, subsequent to the estimation of a malfunction location, estimation of the malfunction substance of the malfunctioned device body can be performed in high accuracy.

Herein, when division of an insegment by virtue of presence of a cable modem is applied to an end insegment, the end insegment can be assumed to be a divided insegment consisting of merely that of backward without the forward part of the downstream side of the cable modem. Therefore, the rule for determining a malfunction location in divided insegments that "the upstream-side divided insegment (backward) is specified as a failure location if the cable modem has failure information" can be applied to the end insegment without modification.

The transmission line definition unit defines a step number which is counted up every time passing through, toward the downstream, a transmission device of the CATV transmission lines;

the failure specifying unit specifies a failure insegment by specifying a failure end insegment according to the failure information of the insegment collection, and advancing threads for failure search sequentially all at once toward the upstream side in the unit of the step number starting from each failure end insegment.

In practice, the analysis process for estimating malfunction locations with respect to an insegment collection expressing CATV transmission lines in this manner can be implemented by parallel processing of a plurality of threads managed by a program called handler, that is, so-called multi-thread. The present invention introduces an idea of a step number as a processing unit for executing the threads. When a plurality of multi-threads are advanced toward the upstream side in a synchronized manner in accordance with the step number, each of the multi-threads autonomically and efficiently searches and specifies failure locations even if the scale of the transmission lines is enormous.

The thread determines, every time advancing to an upstream insegment, whether or not it is a connection point after determining the state of an output port of the transmission device belonging to the insegment, and, after a connection point is determined, advances to a next insegment if the thread per se arrived last, and disappears if there is any thread that has not arrived yet.

In this manner, among the plurality of threads of which processes are started all at once from failure end insegments at ends of transmission lines, the thread that arrived last at a meeting point survives, and advances toward the upstream side. The only survived thread arrives at a starting point (failure detection server) having the step number of one, finishes searching failure locations, and specifies failure insegments.

The transmission devices on the CATV transmission lines comprise internal circuits unique to each of the devices, and in order to analyze the malfunction substance of the transmission device belonging to the specified failure insegment, the information relating to the internal circuits of the transmission device is required. However, it is cumbersome to prepare data structures of the internal circuits unique to each of the transmission devices.

Therefore, the transmission line definition unit of the present invention defines each of the transmission devices on the CATV transmission lines by selecting and setting effectiveness or ineffectiveness of constituent elements in a common template; and the failure estimation unit estimates the failure cause by analyzing the template of the transmission device of the specified failure insegment.

Herein, the transmission line definition unit includes, as the constituent elements of which effectiveness or ineffectiveness is to be selected and set in the common template, a downstream common amplifying unit, a downstream common gain-control unit, an upstream common amplifying unit, an upstream common gain-control unit, a downstream output, an individual downstream amplifying unit, a downstream input, a power supply input, a power supply output, an optical reception unit, and an optical transmission unit.

In this manner, in the present invention, a device template that can be used commonly for all transmission devices is prepared. When the constituent elements of the template are selectively specified, the data structures of the internal circuits unique to the devices are generated, and utilized as an object for analyzing the malfunction substance by means of an analysis program unique to the devices.

The failure information input unit requests a CATV transmission line monitoring system (failure detection server), which is dedicated to failure detection, to transfer failure information determined from measured values collected through polling of the cable modems and the failure information from the cable modems so as to input them. In this manner, the CATV transmission line monitoring system of the present invention can distribute processing load by separating the system into that for malfunction analysis and that for malfunction detection. Meanwhile, existing CATV transmission lines can be managed by merely providing the malfunction detection system, and the malfunction analysis system can be formed so as to be common to new ones and existing ones.

The present invention provides a CATV transmission line monitoring method for estimating failure locations on CATV transmission lines according to failure points on the transmission lines and ends of the transmission lines. The method is characterized by comprising a failure information input step of inputting failure information determined from measured values of a plurality of cable modems installed so as to be distributed over feeder lines and a trunk line of CATV transmission lines having a failure information input unit tree structure, and failure information collected from the cable modems, by a failure information input unit;

a screening step of eliminating logically conflicting failure information from the failure information of the cable modems, by a screening processing unit;

a failure information extraction step of extracting changed failure information and newly generated failure information by obtaining a differential of screened failure information between this time and a previous time, by a failure information extraction unit; and a failure location estimation step of estimating a failure generated location by repeating state determination at an upstream connection point, starting from an end position of the CATV transmission lines on which a cable modem having the failure information is disposed, by a failure location estimation unit.

The present invention provides a program executed by a computer for estimating failure locations on CATV transmission lines according to failure points on the transmission lines and ends of the transmission lines. The program is characterized by causing the computer to execute a failure information input step of inputting failure information determined from measured values of a plurality of cable modems installed so as to be distributed over feeder lines and a trunk line of CATV transmission lines having a failure information input unit tree structure, and failure information collected from the cable modems;

a screening step of eliminating logically conflicting failure information from the failure information of the cable modems;

a failure information extraction step of extracting changed failure information and newly generated failure information by obtaining a differential of screened failure information between this time and a previous time; and a failure location estimation step of estimating a failure generated location by repeating state determination at an upstream connection point, starting from an end position of the CATV transmission lines on which a cable modem having the failure information is disposed.

(Hop Number and Multipoint Statistical Display)

The present invention provides a CATV transmission line monitoring system that can appropriately perform multipoint statistical display of measured values of transmission lines and ends of the transmission lines. The CATV transmission line monitoring system is characterized by comprising a measured value input unit for inputting measured values collected from cable modems installed so as to be distributed over feeder lines of a subscriber's premise side and a trunk line of CATV transmission lines having a tree structure;

a hop number setting unit for setting a hop number which is counted up every time passing through an active device, toward the downstream side, starting from an optical node of the CATV transmission lines; and a statistical processing unit for selecting measured values of a plurality of cable modems disposed at the positions having the same hop number among the input measured values, and generating statistical information from the selected measured values of the plurality of cable modems, so as to subject the statistical information to comparison display in a multipoint manner.

Herein, the measured value input unit obtains and inputs an average value, a maximum value, and a minimum value of every predetermined time period, with respect to the measured values collected from the cable modems. The statistical processing unit subjects the statistical information to comparison display with respect to the measured values collected from the cable modems by dividing them into that of a period such as 24 hours, one week, one month, and one year.

In this manner, the present invention introduces the idea of a hop number which is added one by one every time passing through an active device, toward the downstream side, starting from an optical node, with respect to CATV transmission lines; wherein a same hop number of cable modems means that the number of active devices passed through on the transmission lines is the same, and it can be determined that the cable modems are present on the positions under almost the same transmission conditions. Therefore, in multipoint comparison display of measured values of cable modems, when measured values corresponding to the same hop number are selected, the measured values are correlated under the same transmission conditions, and statistical determination can be significantly performed.

The present invention provides a CATV transmission line monitoring method that can appropriately perform multipoint statistical display of measured values of transmission lines and ends of the transmission lines. The method is characterized by comprising a measured value input step of inputting measured values collected from a plurality of cable modems installed so as to be distributed over feeder lines of a subscriber's premise side and a trunk line of CATV transmission lines having a tree structure, by a measured value input unit;

a hop number setting step of setting a hop number which is counted up every time passing through an active device, toward the downstream side, starting from an optical node of the CATV transmission lines, by a hop number setting unit; and a statistical processing step of selecting measured values of a plurality of cable modems disposed at the positions having the same hop number among the input measured values, and generating statistical information from the selected measured values of the plurality of cable modems, so as to subject the statistical information to comparison display in a multipoint manner.

The present invention provides a program executed by a computer serving as a CATV transmission line monitoring system for performing multipoint statistical display of measured values of transmission lines and ends of the transmission lines.

The program is characterized by causing the computer to execute a measured value input step of inputting measured values collected from a plurality of cable modems installed so as to be distributed over feeder lines of a subscriber's premise side and a trunk line of CATV transmission lines having a tree structure;

a hop number setting step of setting a hop number which is counted up every time passing through an active device, toward the downstream side, starting from an optical node of the CATV transmission lines; and a statistical processing step of selecting measured values of a plurality of cable modems disposed at the positions having the same hop number among the input measured values, and generating statistical information from the selected measured values of the plurality of cable modems, so as to subject the statistical information to comparison display in a multipoint manner.

BRIEF DESCRIPTION OF DRAWINGS

FIG. 9 is an explanatory diagram of specific examples of system-defined threshold values, statistical difference threshold values, and user-defined threshold values with respect to measurement items used in the present invention;

FIG. 22 is an explanatory diagram of insegments and step numbers serving as the basis of the failure analysis of the present invention;

BEST MODE FOR CARRYING OUT THE INVENTION

1. System Configuration

Figure 1:
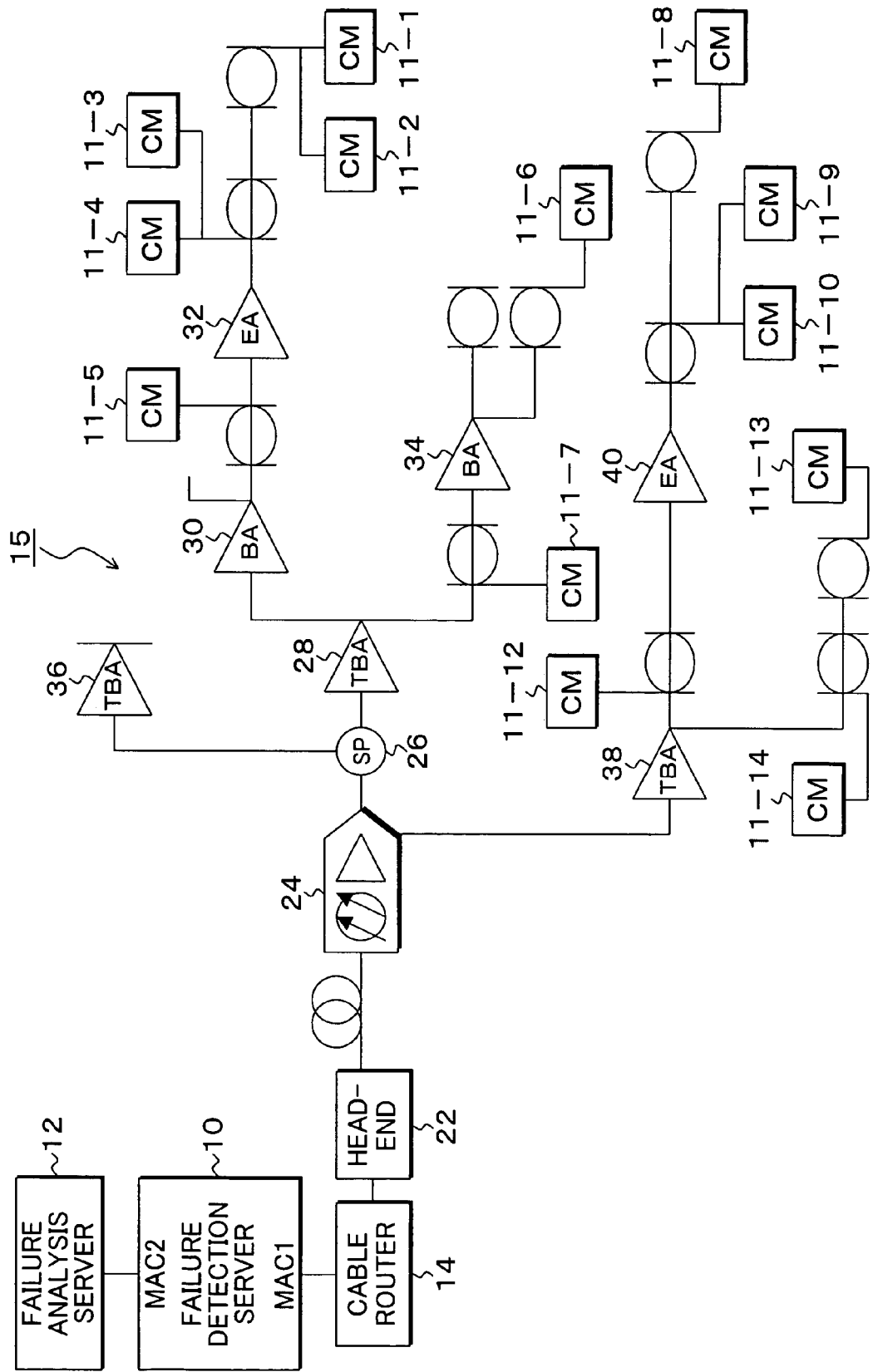
FIG. 1 is an explanatory diagram of a CATV system to which the present invention is applied.

FIG. 1 is an explanatory diagram of a CATV system to which the present invention is applied. In FIG. 1, a CATV transmission line monitoring system of the present invention comprises a failure detection server 10 and a failure analysis server 12. The failure detection server 10 determines whether the measured values of a transmission state collected by polling the cable modems installed in premises of subscribers in the end side of CATV transmission lines 15 and the cable modems installed on trunk lines are normal or in failure. The failure analysis server 12 estimates a failure occurring location(s) on the CATV transmission lines by analyzing the determination results determined by the failure detection server 10 according to the measured values of the cable modems. The CATV transmission lines 15 are optical/coaxial transmission lines (HFC transmission lines), in which an optical node 24 is provided subsequent to a headend 22, and the lines following the optical node 24 are coaxial cable transmission lines. Transmission devices that can be provided on the CATV transmission lines 15 include, for example according to JCTEA standards, trunk bridger amplifiers TBAs, trunk distribution amplifiers TDAs, bridger amplifiers BAs, distribution amplifiers DAs, and extender amplifiers EAs; furthermore, splitters for dividing the trunk lines and feeder lines can be provided. The CATV transmission lines 15 of FIG. 1 are part of transmission lines and provided with, as transmission devices, TBAs 28, 36, and 38, BAs 30 and 34, and EAs 32 and 40 on the transmission lines of the illustrated system. On the feeder lines serving as the end side of the CATV transmission lines 15 cable modems (CMs) 11-1 to 11-4, 11-6, 11-8, 11-9, 11-10, 11-13, and 11-14 are installed in the premises of subscribers. Moreover, cable modems 11-5, 11-7, and 11-12 are installed on the trunk lines on the transmission lines connecting to the feeder lines at the end. The failure detection server 10 subjects the cable modems 11-1 to 11-14 in the end side or on the trunk lines of the CATV transmission lines 15 to polling, thereby collecting measured values relating to the transmission state, and determines whether it is normal or failure.

Figure 2:
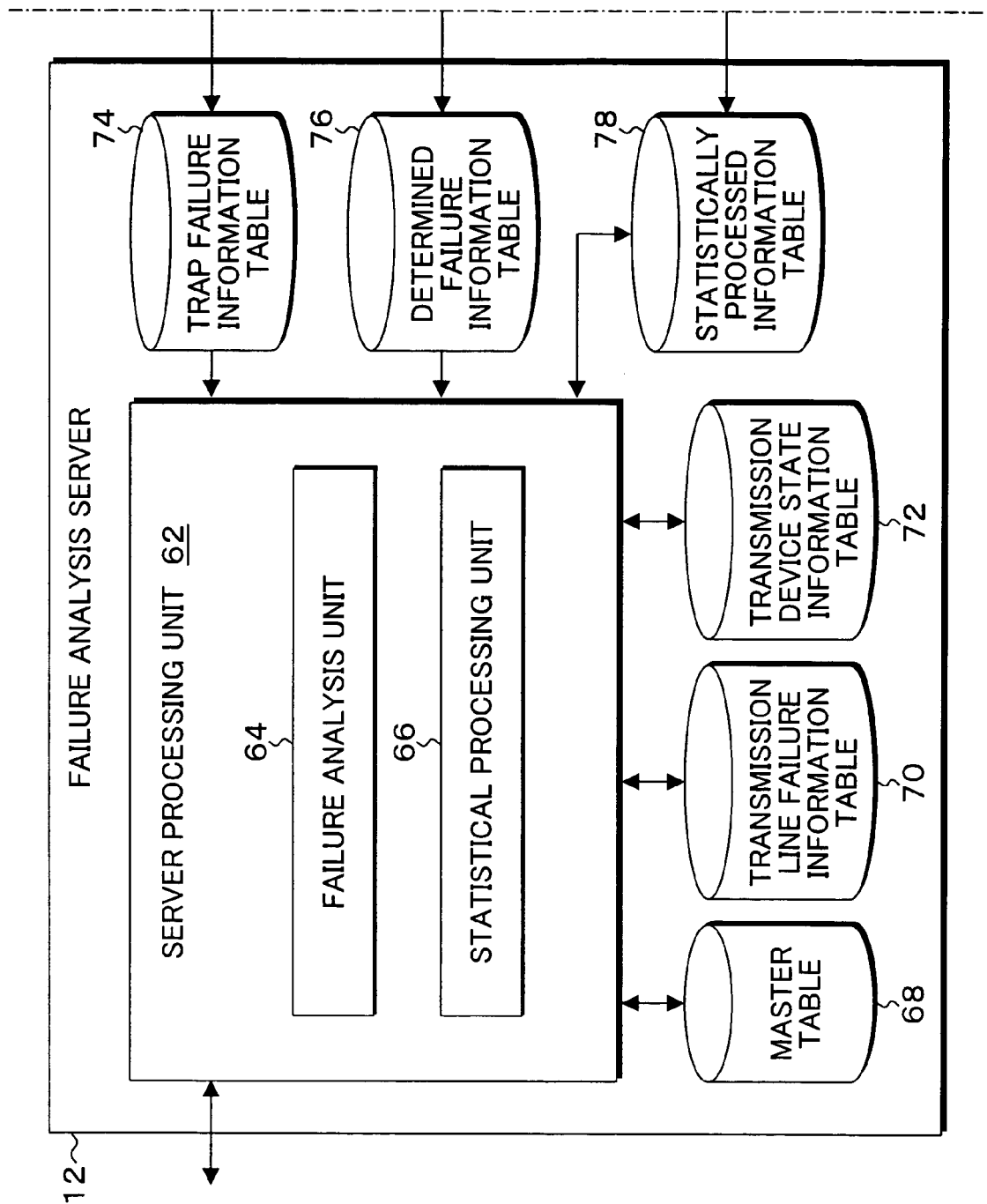
FIG. 2 is a block diagram of a functional configuration of a CATV transmission line monitoring system of the present invention.
Figure 3:
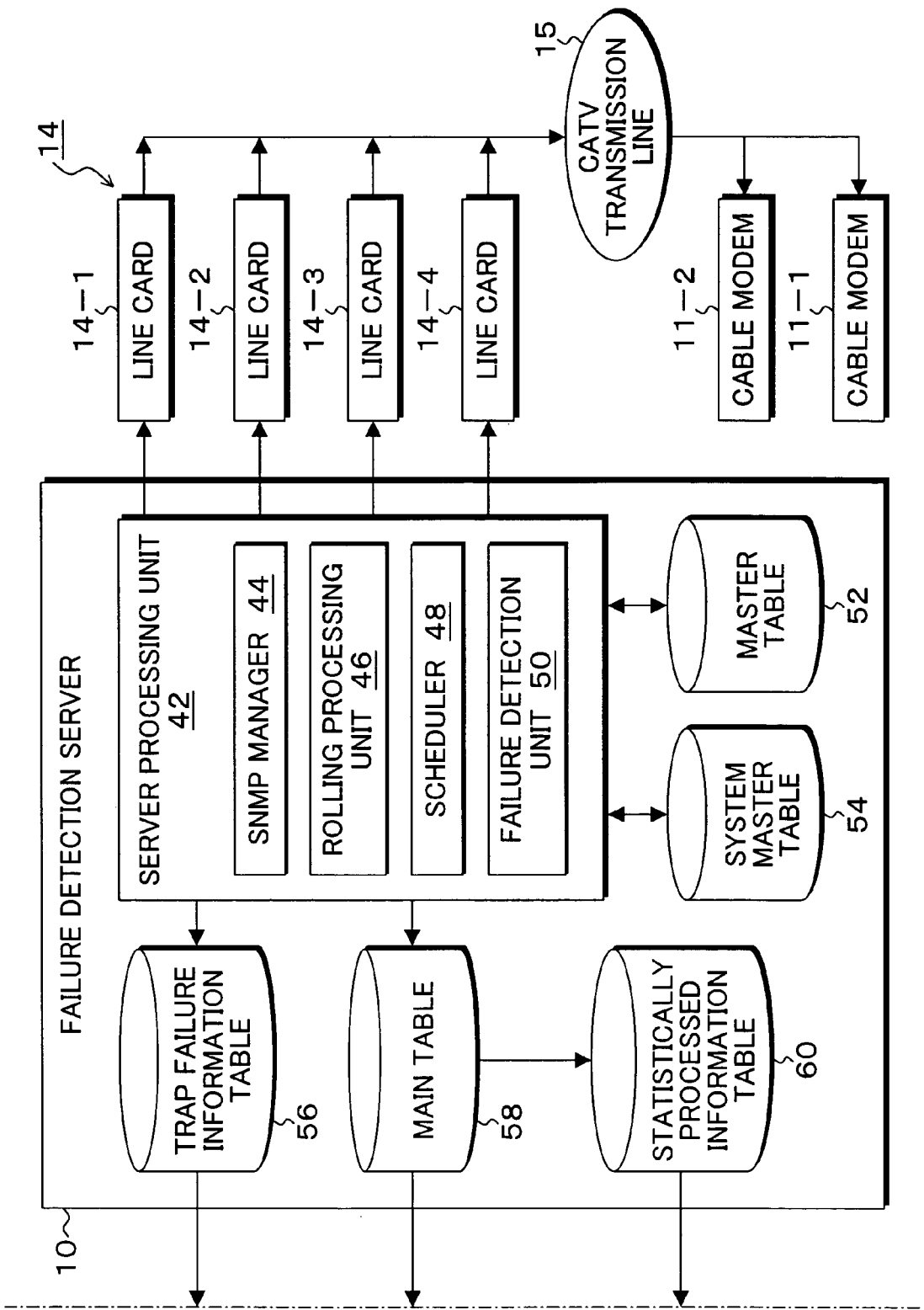
FIG. 3 is a block diagram, subsequent to that of FIG. 2, of a functional configuration of the CATV transmission line monitoring system of the present invention.

FIG. 2 and FIG. 3 are block diagrams showing functional configurations of the failure detection server 10 and the failure analysis server 12 serving as the CATV transmission monitoring system of the present invention. In FIG. 2 and FIG. 3, the failure detection server 10 is provided with a server processing unit 42, and, in the server processing unit 42 provided are an SNMP manager 44, a polling processing unit 46, a scheduler 48, and a failure detection unit 50. A master table 52 and a system master table 54 are provided for the server processing unit 42. Furthermore, a trap failure information table 56, a main table 58, and a statistically processed information table 60 are provided for the server processing unit 42. The trap failure information table 56 receives and records link-down traps responding to no-response to the polling performed on the cable modems. The main table 58 records the determination results whether the measured values collected by the failure detection unit 50 from the cable modems are normal or abnormal. The statistically processed information table 60 obtains an average value, a maximum value, and a minimum value of the measured values, of for example every 20-minute interval, in the main table 58 obtained through polling as statistically processed information and record them.

The failure analysis server 12 is provided with a server processing unit 62, and functions of a failure analysis unit 64 and a statistically processing unit 66 are provided in the server processing unit 62. For the server processing unit 62, a master table 68, a transmission line failure information table 70, a transmission device state information table 72, a trap failure information table 74, a determined failure information table 76, and a statistically processed information table 78 are provided. The failure analysis server 12 requests the failure detection server 10 to transfer failure information in a constant time cycle, for example, in every polling period of the failure detection server 10; stores the trap failure information, which is in the trap failure information table 56 and indicating no-response to polling, in the trap failure information table 74; and stores the determined failure information, which is in the main table 58, in the determined failure information table 76. It should be noted that, regarding the statistically processed information table 60, since the processed data is that of every 20-minute interval, the failure analysis server 12 requests a transfer thereto in every 20 minutes, but not at the polling rate, and stores the transferred data in the statistically processed information table 78. The failure analysis unit 64 estimates the failure location(s) on the CATV transmission lines according to the failure information of the trap failure information table 74 and the determined failure information table 76 transferred from the failure detection server 10. The statistical processing unit 66 subjects the 20-minute statistically processed data, which has been transferred to the statistically processed information table 78, to multipoint-manner statistical processing and displaying of the measured values indicating the transmission state at cable modem measurement positions. Referring again to the failure detection server 10, the server processing unit 42 is connected to the CATV transmission lines 15 via four line cards 14-1 to 14-4 provided in a cable router 14, and subjects cable modems including the cable modems 11-1 and 11-2 to polling, thereby collecting the measured values of the transmission state. The cycle of the polling performed by the polling processing unit 46 provided in the server processing unit 42 is, for example, 30 seconds. In accordance with needs, the polling cycle may be caused to be shorter or longer. Herein, the cable modems of DOCSIS 1.0 and 1.1 are used as the cable modems from which measured values of the transmission state are collected through polling in the present invention, and the polling protocol uses SNMPv2C for collecting MIB information of the cable modems. Specifically, the main MIB information to be collected from the cable modems is DOCSIS-RFI MIB information defined in RFC 2670, and SNMP MIB defined in RFC 1907 and RFC 2233. One polling session performed on the cable modem according to SNMPv2C is completed with one packet of a SNMP get-request PDU (Protocol Data Unit) and one packet of a get-response PDU. Specifically, in the cable router 14, the pointer information of the cable modem to be subjected to polling is obtained, and then, the reception information of the cable modem is individually subjected to polling. Therefore, polling of one cable modem performed by the failure detection server 10 requires two sets of PDUs, i.e., an SNMP get-request PDU and an SNMP get-response PDU. The measured values collected from the cable modems on the CATV transmission lines through such polling performed by the failure detection server 10 include the following listed items.

(1) Downstream reception level
(2) Upstream transmission level
(3) Upstream reception level
(4) Downstream S/N
(5) Upstream S/N
(6) Downstream code word error (CWE)
(7) Upstream code word error (CWE)

Furthermore, as failure information not dependent on polling, there is trap information by which a cable modem per se responds determining that it is failure when polling from the failure detection server 10 is not received. In relation to this polling abnormality in a cable modem, also in the failure detection server 10 side, time out against polling is monitored and failure is determined as polling-no-response. Therefore, it can be understood that the cable modem per se is abnormal if there is merely polling-no-response, meanwhile, failure is in the polling downstream side if a link-down trap from the cable modem which does not respond to polling is received.

2. Failure Determination Process by Means of Polling of Cable Modems

Figure 4:
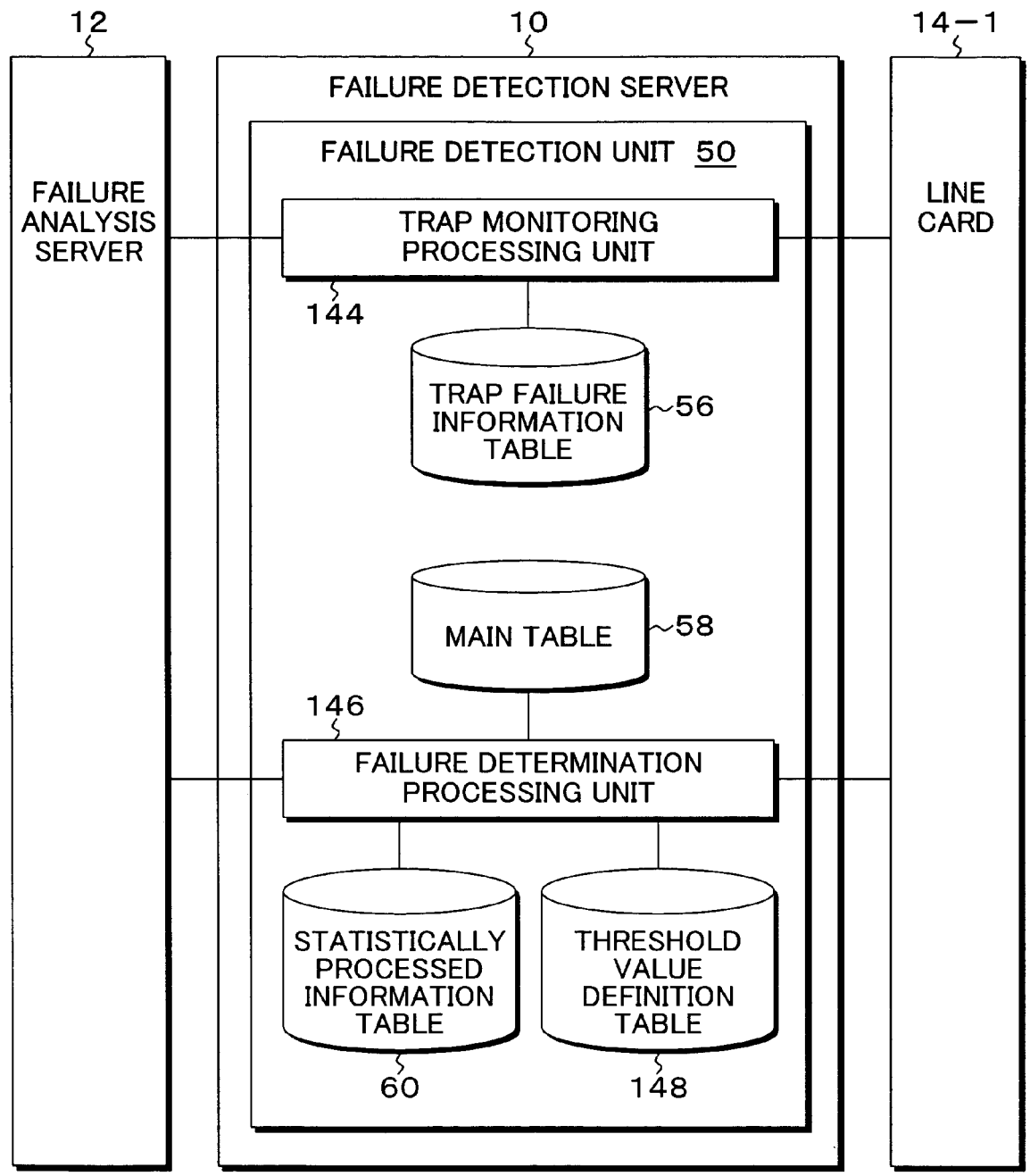
FIG. 4 is a block diagram of a functional configuration of a failure detection unit provided in the failure detection server of FIG. 2 and FIG. 3.

FIG. 4 is a block diagram of the functional configuration of the failure detection unit 50 provided in the failure detection server 10 of FIG. 2 and FIG. 3. In FIG. 4, a trap monitoring processing unit 144 and a failure determination processing unit 146 are provided in the failure detection unit 50 of the failure detection server 10. The trap monitoring processing unit 144 receives link-down traps, which are due to polling no-response, records the addresses representing cable modems and the failure substances in the trap failure information table 56. The failure determination processing unit 146 subjects the measured values, which have been collected from the cable modems through polling, to comparison with threshold values set according to a threshold value definition table 148, thereby determining whether they are in failure or normal, and records the determination results in the main table 58. Moreover, the failure determination processing unit determines polling-no-response as failure as well, and records the result in the main table 58. Furthermore, the failure determination processing unit obtains the average value, the maximum value, and the minimum value of 20 minutes of the measured values, which have been collected through polling and stores the values in the statistically processed information table 60.

Figure 5:
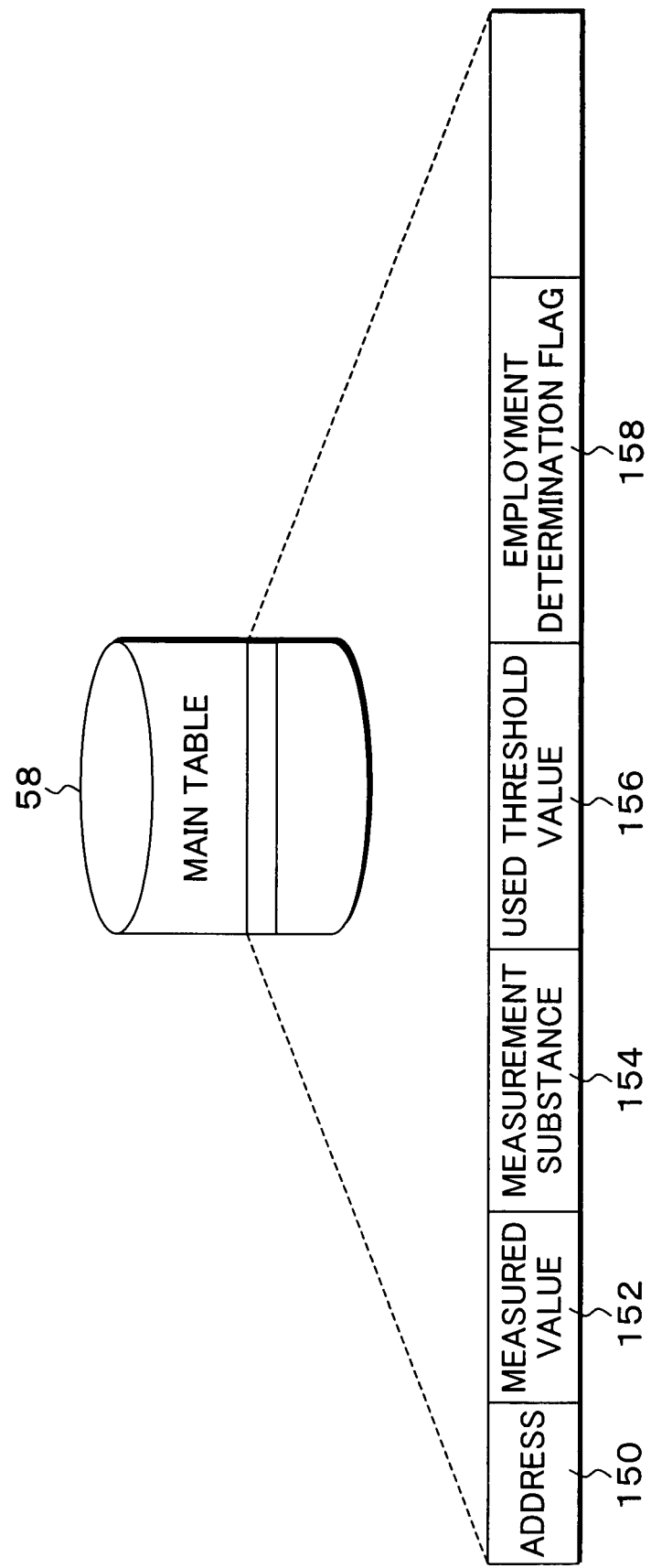
FIG. 5 is an explanatory diagram of the main table of FIG. 4.

FIG. 5 is an explanatory diagram of the main table 58 provided for the failure determination processing unit 146 of FIG. 4. In the main table 58, one record for each of all the cable modems to be subjected to polling is generated and recorded. One record of the main table 58 includes, as taken out to the lower side to be illustrated, an address 150 of a cable modem, measured values 152 collected through polling, a determined failure substance 154, used threshold values 156 used in failure determination, and an employment determination flag 158. Herein, with respect to the CATV transmission lines 15 shown in FIG. 1 to which the present invention is applied, unique addresses are allocated in advance to the transmission devices located between the failure detection server 10 and the transmission line end side. That is, unique addresses are allocated to ports MAC1 and MAC2 of the failure detection server 10 and the body of the cable router 14; with respect to the CATV transmission lines 15 following the optical node 24, a unique address is allocated to each of the bodies, input ports, and output ports of the transmission devices; and a unique address is allocated to each of the cable modems 11-1 to 11-14. Therefore, the devices on the CATV transmission lines 15 can be specified by the addresses thereof. Each of the records of all the cable modems stored in the main table 58 shown in FIG. 5 can be specified which cable modem the record is belonging to by the address 150 at the head. The measured values 152, the failure substance 154, and the used threshold values 156 subsequent to the address 150 will be explained in later description. The employment determination flag 158 is a flag corresponding to the redundant setting of the cable modems from which the measured values are collected by the failure detection server 10. With respect to the failure detection server 10 of the present invention, up to four cable modems called primary, secondary, third, and fourth can be redundantly set on a feeder line which is at an end of the CATV transmission lines 15. For example, on the feeder line following EA 32 of FIG. 1, four cable modems 11-1 to 11-4 are allocated as those to be subjected to polling, and, basically, measured values of one of them are collected through polling.

Therefore, the failure detection server 10 assumes the cable modem 11-1 as the primary, the cable modem 11-2 as the secondary, the cable modem 11-3 as the third, and the cable modem 11-4 as the fourth, performs polling on all of them thereby collecting measured values, and records the measured values 152 of each of them in the main table 58 of FIG. 5 with respective addresses 150. Among these, the primary cable modem 11-1 is set as the default object to be subjected to failure detection, the employment determination flag 158 of the record having the address of the cable modem 11-1 is set to an effective state, and the employment determination flags 158 in the records having the addresses other than this, i.e., that of the cable modems 11-2 to 11-4 are off. Therefore, the failure determination processing unit 146 of FIG. 4 subjects the measured values 152 of the record of which employment determination flag 158 is on in the main table 58 to failure determination. When such redundant setting of the cable modems is carried out, if failure occurs in the primary cable modem 11-1 set as the default and results in polling-no-response, the employment determination flag 158 thereof is turned off, and the employment determination flag 158 of the cable modem 11-2 serving as the secondary is turned on. If the secondary fails, the employment determination flag is switched to that of the third, and if the third fails, it is switched to that of the fourth. As described above, up to four cable modems are allocated to one feeder line thereby providing redundancy of the cable modem against failure. However, the basics of the present invention include, as the minimum configuration, two modems, i.e., primary and secondary modems disposed on one feeder line.

Figure 6:
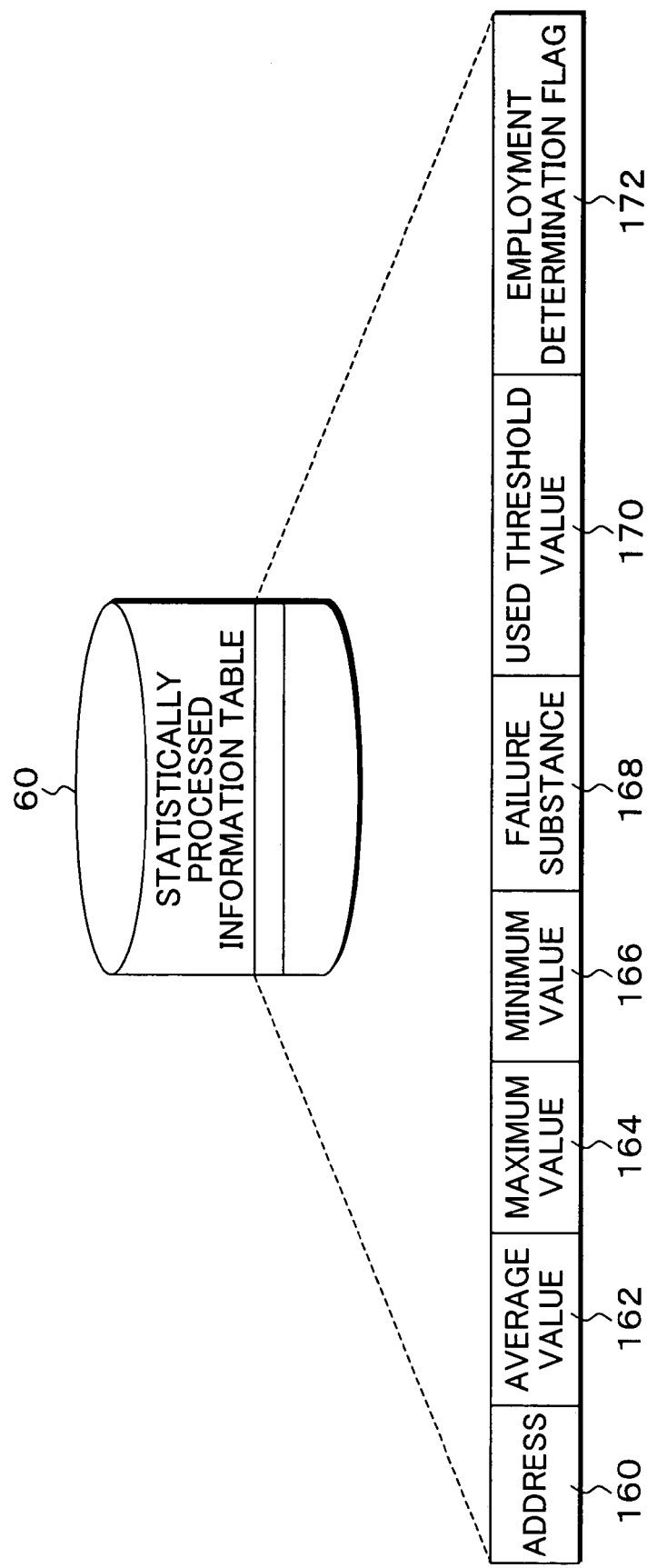
FIG. 6 is an explanatory diagram of the statistically processed information table of FIG. 4.

FIG. 6 is an explanatory diagram of the statistically processed information table 60 of FIG. 4. In the statistically processed information table 60, an average value 162 is calculated as the statistic of every 20-minute interval with respect to the measured values 152 in the records of all cable modems recorded in the main table 58, and, in addition to this, a maximum value 164 and a minimum value 166 of every 20-minute interval are recorded subsequent to an address 160. Furthermore, as well as the record of the main table 58, a failure substance 168, used threshold values 170, and an employment determination flag 172 are provided.

Figure 7:
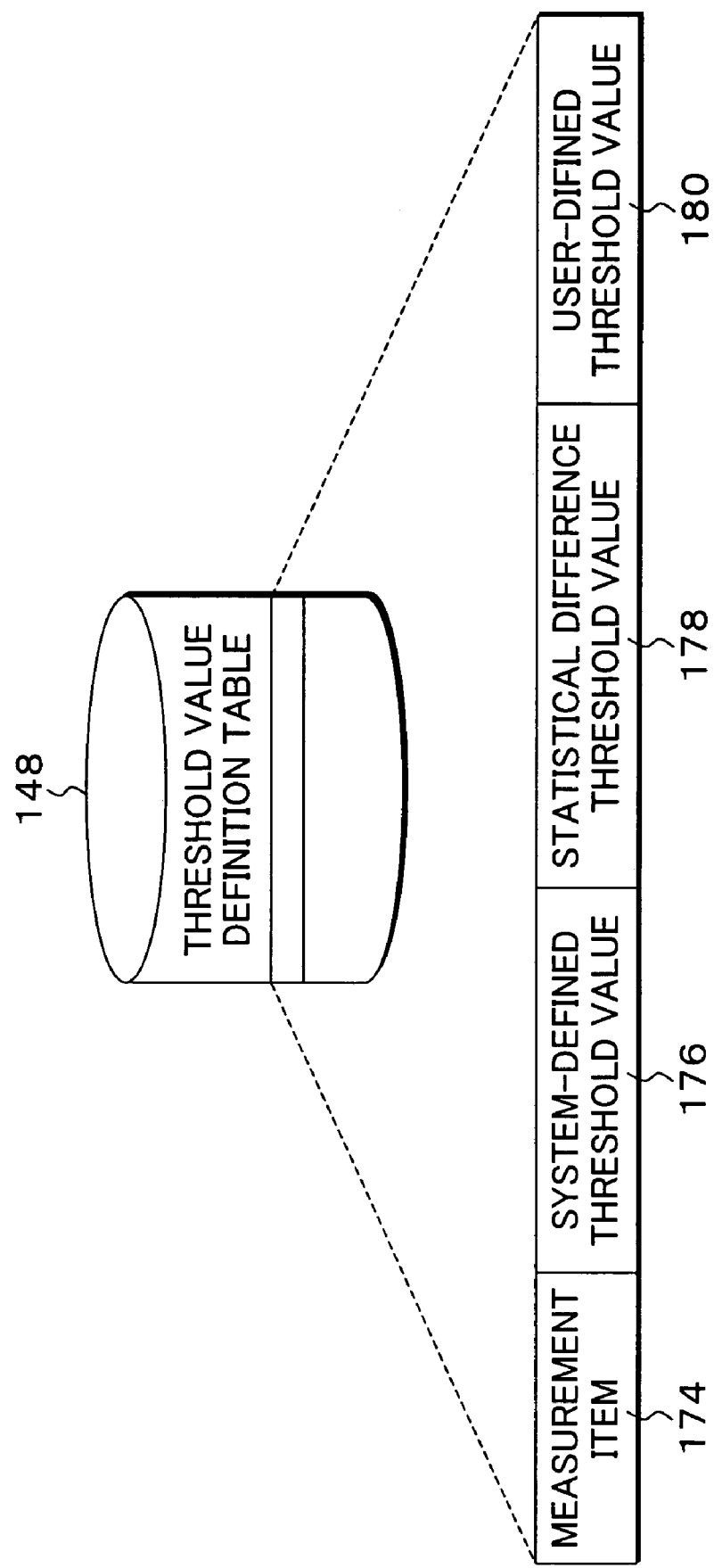
FIG. 7 is an explanatory diagram of the threshold definition table of FIG. 4.

FIG. 7 is an explanatory diagram of the threshold value definition table 148 of FIG. 4. In the threshold value definition table 148, system-defined threshold values 176, statistical difference threshold values 178, and user-defined threshold values 180 are stored for each of the types, i.e., measurement items 174 of the measured values collected from the cable modems. These threshold values are used in comparison with the measured values collected from the cable modems through polling, in order to determine whether it is in failure or normal.

Figure 8:
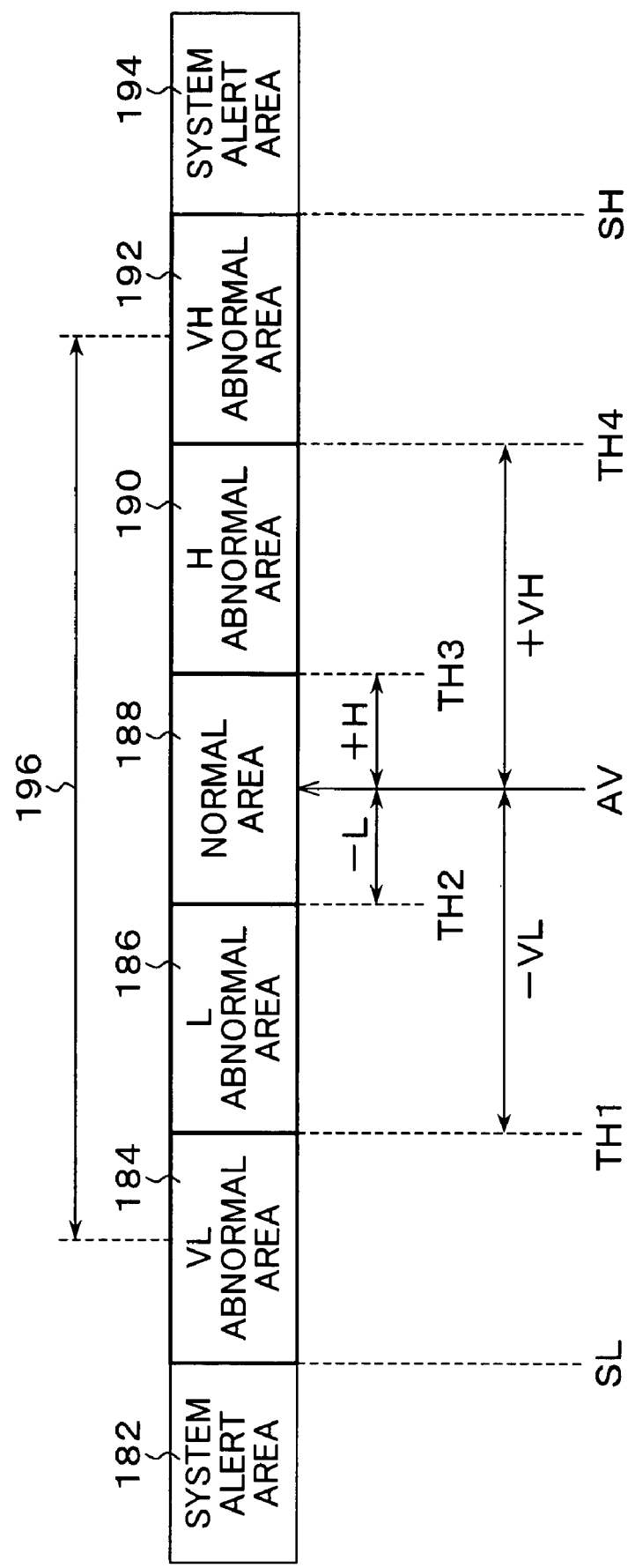
FIG. 8 is an explanatory diagram of the setting state of system-defined threshold values, statistical difference threshold values, and user-defined threshold values used in the present invention.

FIG. 8 is an explanatory diagram of the setting state of the threshold values used in determination of the measured values performed in the failure determination processing unit 146 of FIG. 4. In FIG. 8, a system lower-limit threshold value SL and a system upper-limit threshold value SH are used as the system threshold values. The system threshold values represent the specification range specified in DOCSIS and the environmental conditions at least required for a normal operation of the system. For example, an upstream transmission output level of a cable modem is specified as 8 to 58 dBmV (QPSK), and, in the failure detection server 10, the specification range is recorded in a table as the system threshold values, i.e., the system lower-limit threshold value SL=8 dBmV and the system upper-limit threshold value SH=58 dBmV.

Therefore, when a measured value collected from a cable modem through polling is less than the system lower-limit threshold value SL, it is determined to be in a system alert area 182, and a failure substance corresponding thereto is recorded in the main table 58; while, when the measured value exceeds the system upper-limit threshold value SH, it is determined to be in a system alert area 194, and, similarly, a failure substance corresponding thereto is recorded in the main table 58. Next, the user-defined threshold values are threshold values that can be arbitrary set by the user regardless of the specification and the type of the cable modem to be monitored. In this example, the setting area of user-defined threshold values 196 is set in the area between the lower-limit system alert area 182 and the upper-limit system alert area 194. It should be noted that the result of determination according to the user-defined threshold values is used only in display for the user, and is not used as the failure information that is used by the failure analysis server 12 for estimating the failure location on the transmission lines. The statistical difference threshold values will next be described. The statistical difference threshold values are the values to be added to or subtracted from an average value AV, which is serving as a reference, of measured values obtained through statistical processing performed at every 20-minute interval, so as to obtain failure determination threshold values. In FIG. 8, the average value AV is an average value calculated from the measured values of previous 20 minutes, and relative threshold values for determining failure in subsequent 20 minutes are set with the average value AV serving as a reference value. More specifically, failure determination threshold values TH1, TH2, TH3, and TH4 are set by adding difference threshold values −VL and +VH for major variation determination, and difference threshold values −L and +H for determining minor variation to the average value AV serving as a reference value. Therefore, with a normal area 188 including the average value AV serving as the center, there set an H abnormal area 190 and a VH abnormal area 192 on the upper limit side, and an L abnormal area 186 and a VL abnormal area 184 on the lower limit side.

FIG. 9 shows the recorded contents of the threshold definition table 148 of FIG. 7 in a table structure as a specific example. In FIG. 9, the downstream transmission level, the upstream transmission level, the downstream S/N, and the upstream S/N are provided as measurement items, and recording areas of the system-defined threshold values, the statistical difference threshold values, and the user-defined threshold values are provided for each of the measurement items. The system-defined threshold values comprise the lower-limit threshold value SL and the upper-limit threshold value SH, wherein, for each of the threshold values, a threshold value according to the specification, etc. of the cable modem is stored as an absolute value. Herein, each of the downstream S/N and the upstream S/N consists of only the lower-limit threshold value SL. As the statistical difference threshold values, specific values are separately stored for each of the statistical difference threshold values VL and VH for determining major variation, and the statistical difference threshold values L and H for determining minor variation. The user-defined threshold values comprise merely recording space, and specific numerical values thereof are omitted. With such statistical difference threshold values used in a failure determination process of the present invention, threshold values are relatively set by adding predetermined statistical difference threshold values VL, L, H, and VH to the average value serving as the reference obtained through a statistical processing of the previous 20 minutes. The CATV transmission lines are under a strong influence caused by temperature variation due to solar irradiation, seasonal variations, etc., and the measured values of the transmission state collected through polling are greatly varied in accordance with the temperature variation. Therefore, use of a threshold value dependent on an absolute value in failure determination of the measured values collected from cable modems are not always considered to be appropriate, because erroneous determination due to the temperature variation may occur. Therefore, in the present invention, an average value of the measured values obtained in a statistical processing of a previous 20 minutes is employed as a reference value for determining the threshold values of the subsequent 20 minutes, and predetermined statistical difference threshold values are added to the reference value, thereby setting threshold values for subjecting measured values to determination. Accordingly, the threshold values undergo variation following the temperature variation at that point in time. Thus, by virtue of such setting of relative threshold values based on an average value of 20-minute measured values, failure determination canceling out the variation in measured values due to temperature variation is implemented, and the accuracy for determining failure can be significantly improved. Moreover, although a fixed value serving as the default is necessary only in the first 20 minutes from start-up of the system since an average value of 20 minutes is used for obtaining the reference value for setting the threshold values of subsequent 20 minutes, thereafter, threshold values are set according to the statistical difference threshold values corresponding to the average value of the measured values actually collected from cable modems, thus causing little time lag upon system start-up.

Figure 10:
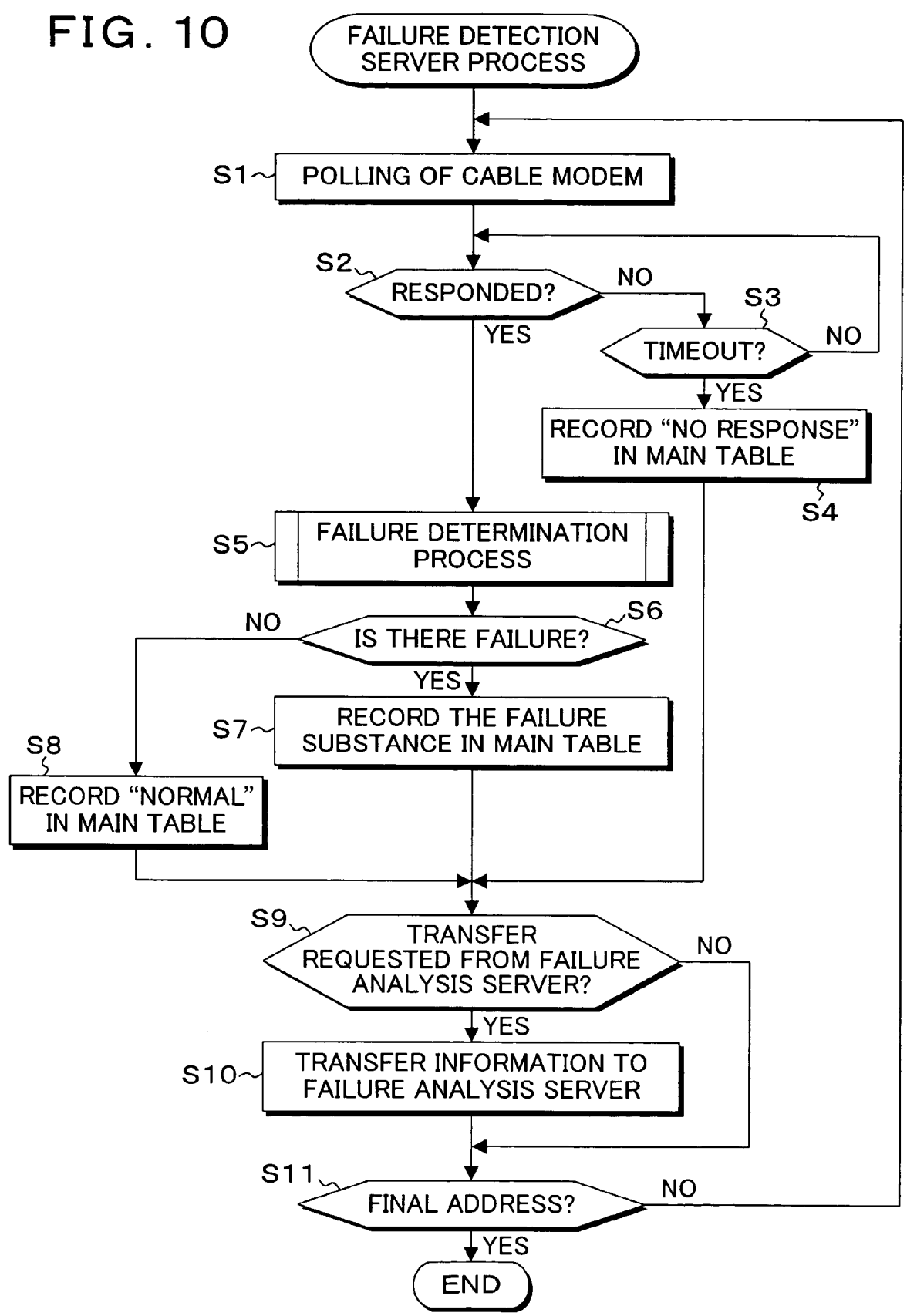
FIG. 10 is a flow chart of a failure detection server process according to the present invention.

FIG. 10 is a flow chart of a failure detection server process performed in the failure detection server 10 of the present invention. In FIG. 10, in a step S1, polling of a cable modem specifying a first address is performed every time it reaches to polling start timing in, for example, every 30 seconds, and whether there is a response or not is checked in a step S2. If there is no response, time out is checked in a step S3. If time out is found, "polling no response" is recorded in the main table 58 as failure information in a step S4.

If response to polling is found in the step S2, the process proceeds to a step S5 wherein failure determination process based on the collected measured values is executed. As a result of the failure determination process, if presence of failure is determined in a step S6, the process proceeds to a step S7 wherein the failure substance is recorded in the main table 58. Meanwhile, if there is no failure, the process proceeds to a step S8 wherein "normal" is recorded in the main table.

Subsequently, whether a transfer request from the failure analysis server 12 is present or not is checked in a step 9, and if there is a transfer request, the failure information is transferred to the failure analysis server in a step S10. Subsequently, whether it is a final address or not is checked in a step S11. Thereafter, the process from the step S1 is repeated until it reaches to the final address.

Figure 11:
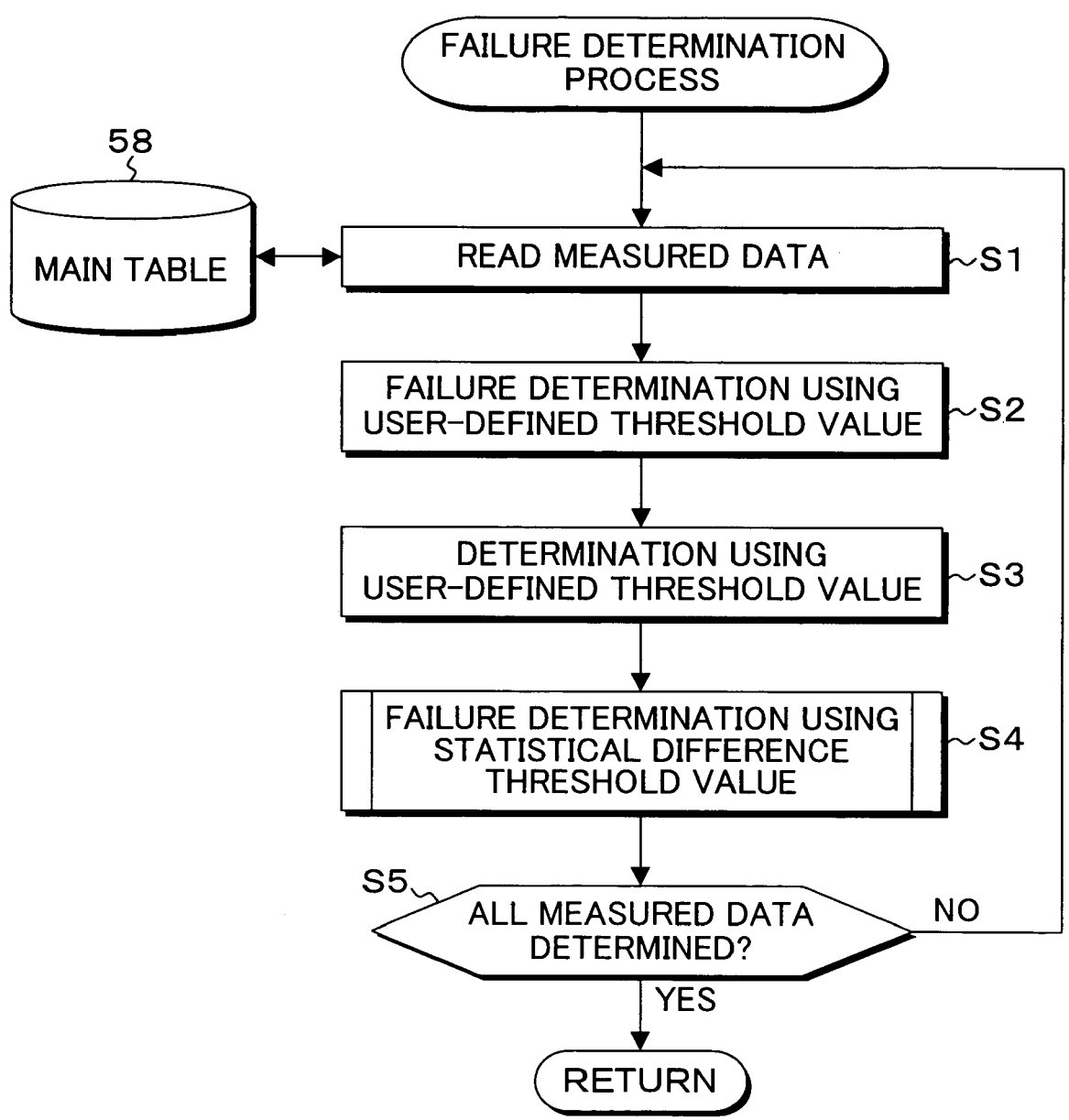
FIG. 11 is a flow chart of the failure determination process of FIG. 10.

FIG. 11 is a flow chart showing the details of the failure determination process in the step S5 of FIG. 10. In FIG. 11, in the failure determination process, the measured values collected through polling are read from the main table 58 in a step S1, and failure determination by use of the system-defined threshold values is performed in a step S2. Subsequently, in a step S3, determination is performed by use of the user-defined threshold values, wherein, if the result is abnormal, merely the display color thereof is changed, and the result is not used for failure determination. Furthermore, in a step S4, failure determination by use of the statistical difference threshold values is performed. Then, until determination of all measured data is finished in a step S5, the process from the step S1 is repeated.

Figure 12:
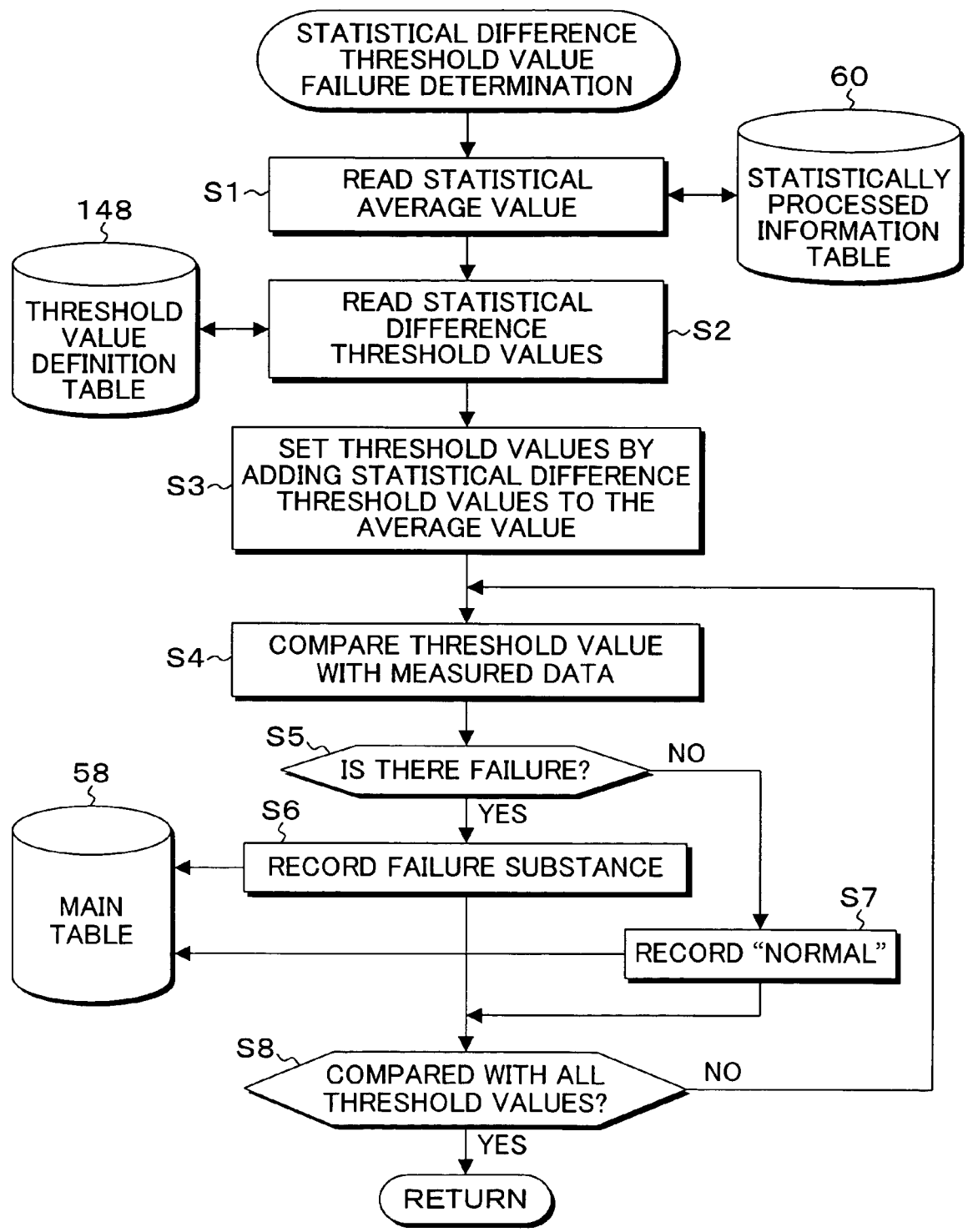
FIG. 12 is a flow chart of the failure determination process of FIG. 10 using statistical difference threshold values.

FIG. 12 is a flow chart showing the details of the determination process by use of the statistical difference threshold values in the step S4 of FIG. 11. In FIG. 12, in the statistical difference threshold value failure determination process, first, the average value calculated from the measured values of the previous 20-minute period is read from the statistically processed information table 60 in a step S1, the statistical difference threshold values −VL, −L, H, and VH are read from the threshold value definition table 148 in a step S2, and threshold values are set by adding the statistical difference values to the average value in a step S3. Subsequently, the measured data is compared with the threshold values in a step S4, and if presence of failure is determined in a step S5, the failure substance is recorded in the main table 58 in a step S6. If no failure is found in the step S5, "normal" is recorded in the main table 58 in a step S7. This process is repeated, and when finished, the process returns to that of FIG. 11.

3. Failure Analysis for Estimating Failure Location(s) on Transmission Lines

Figure 13:
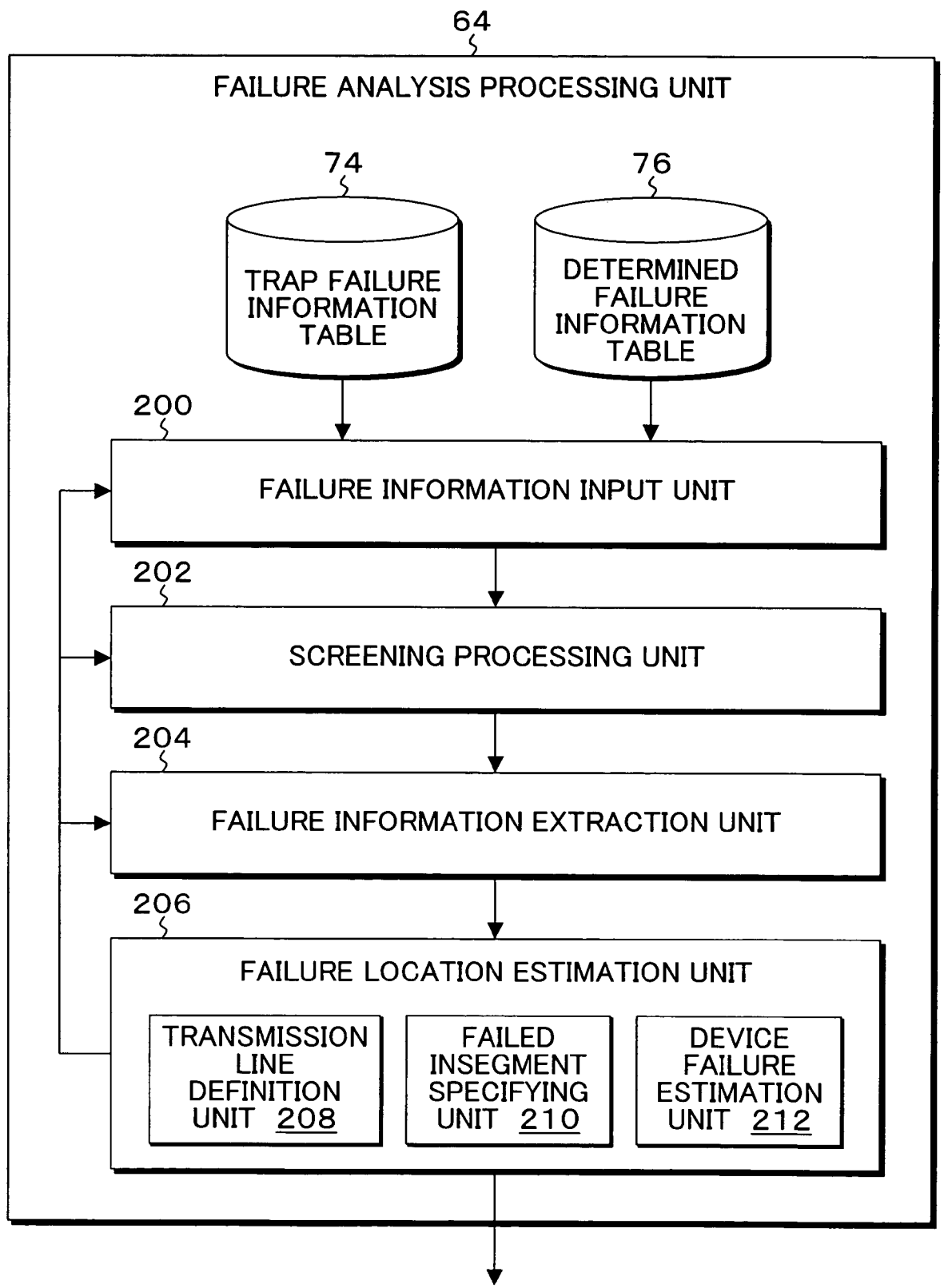
FIG. 13 is a functional block diagram of the failure analysis processing unit provided in the failure analysis server of FIG. 2 and FIG. 3.

FIG. 13 is a block diagram of the functional configuration of the failure analysis unit 64 provided in the failure analysis server 12 of FIG. 2 and FIG. 3. In FIG. 13, in the failure analysis unit 64, a failure information input unit 200, a screening processing unit 202, a failure information extraction unit 204, and a failure location estimation unit 206 are provided. The trap failure information table 74 and the determined failure information table 76 storing the failure information transferred from the failure detection server 10 side are provided for the failure information input unit 200. A transmission line definition unit 208, a failure insegment specifying unit 210, and a device failure estimation unit 212 are provided for the failure location estimation unit 206. The failure analysis unit 64 is activated in every 30 seconds which is the polling rate of the failure detection server 10, and executes a failure analysis process for estimating the failure location(s) on the CATV transmission line, with respect to the failure information transferred from the failure detection server 10. First, the failure information input unit 200 inputs the failure information determined with respect to collected measured values of a cable modem and polling-no-response detected by the failure detection server 10 to the determined failure information table 76. At the same time, the failure information input unit 200 inputs link-down traps, which are generated upon polling-no-response, from the trap failure information table 74. The screening processing unit 202 eliminates logically conflicting failure information from the failure information which has been determined by the cable modem measured values and input by the failure information input unit 200. The failure information extraction unit 204 obtains a differential between the screened failure information of this time and the failure information of the previous time, thereby extracting changed failure information and newly generated failure information. Among these, the changed failure information includes that of a case in which the type of failure is changed and that of a case in which failure is recovered.

With respect to logically abstracted data structure of the CATV transmission lines built by the transmission line definition unit 208, the failure location estimation unit 206 estimates the failure location(s) by repeating state determination at a connection point of the upstream side starting from the transmission line end position at which the cable modem of the determined failure information is disposed. The process performed by the failure location estimation unit 206 is implemented as functions of the transmission line definition unit 208, the failure insegment specifying unit 210, and the device failure estimation unit 212. First, the transmission line definition unit 208 defines a failure search unit called an insegment, and logically abstracts the CATV transmission lines so as to express them as a continuous collection of the insegments. The failure insegment specifying unit 210 sets the insegment which is at the end at which the cable modem corresponding to failure information is positioned as a failure end insegment, and then, repeats state determination toward the upstream side in insegment units, thereby specifying the failure insegment. The process for searching failure locations by expressing the CATV transmission lines as a collection of insegments in the above described manner will be described in detail in the later description.

Figure 14:
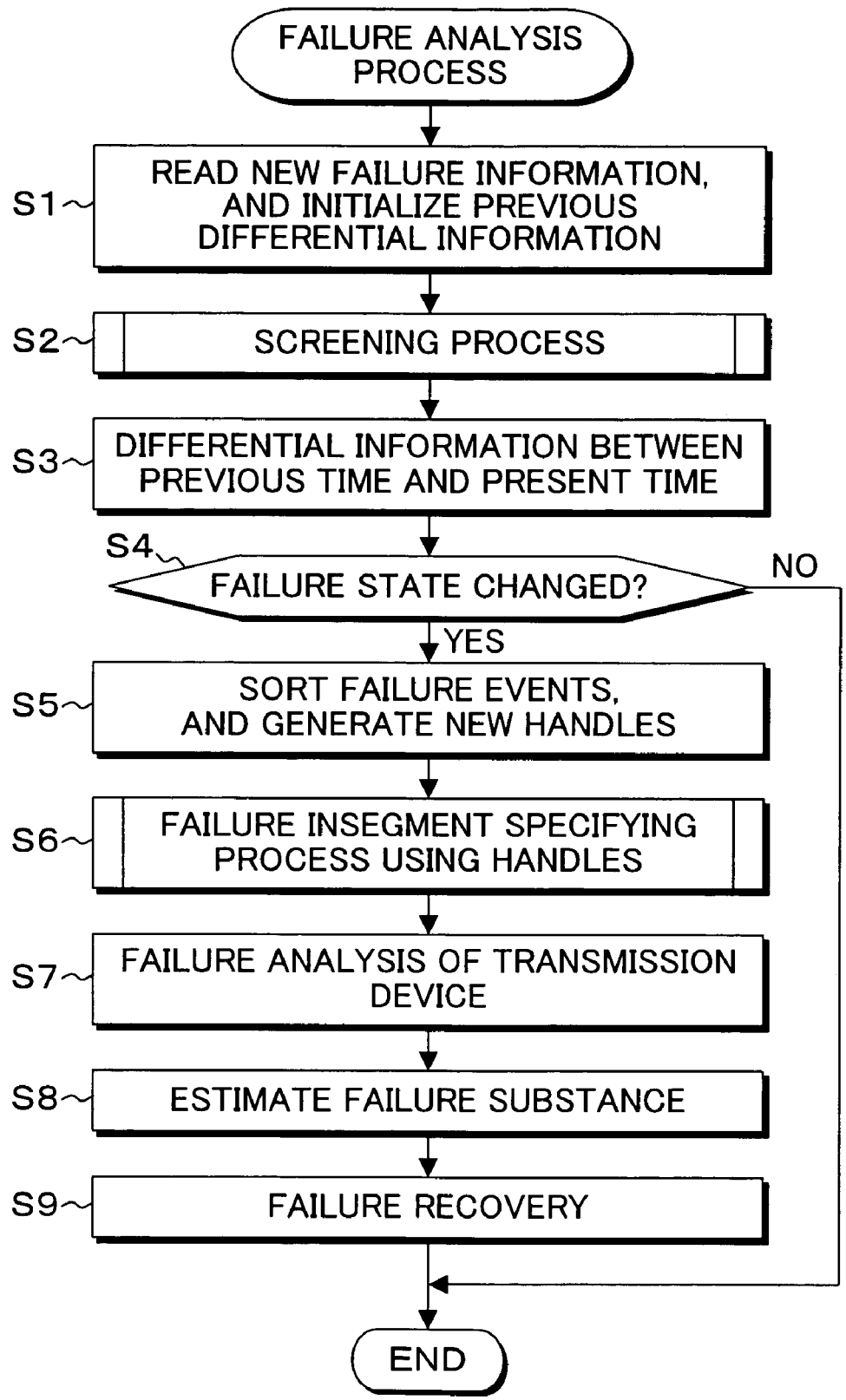
FIG. 14 is a flow chart of a failure analysis process according to the present invention.

FIG. 14 is a flow chart of processing operations performed in the failure analysis unit 64 of FIG. 13. In FIG. 14, a failure analysis process is executed once in every 30 seconds which is the polling rate of the failure detection server 10. In the failure analysis process, first, in a step S1, new failure information transferred from the failure detection server 10 is read, and previous differential information is initialized. Subsequently, the process proceeds to a step S2, wherein, with respect to the new failure information, there checked whether or not the failure information determined from measured values of a cable modem is logically conflicting with the transmission states of the front and the back thereof, i.e., "normal" or "abnormal" determined from the measured values of the cable modems of the front and back thereof, and, if there is confliction, a screening process of eliminating the abnormal information so as to change it to normal information is performed.

Subsequently, in a step S3, the differential information between the previous time and this time is generated. That is, the differential between the previously used failure information and the failure information read this time is obtained, such that the resultant information serves as the failure information used in failure analysis. In the differential information generated through the differential processing, the information of this time that is same as that of previous time is eliminated, and the failure information newly generated in this time and the differential information changed from the previous time remain.

Among these, the changed differential information includes, as described above, the differential information in which the failure substance is changed and the normal information in which failure is recovered. In a step S4, with respect to the differential information, whether or not there is change in the failure information is checked, and if there is no change, the process is terminated.

If there is change in the failure information, the process proceeds to a step S5, wherein the failure information is sorted by failure events, and then, a new handle is generated for a newly generated failure event. Herein, the generation of a new handle is to generate a handle instance and a thread.

Subsequently, in a step S6, a failure insegment specifying process is executed on the insegment collection representing the CATV transmission lines as a logically abstracted data structure, by use of each of the handle instance newly generated in the step S5 and the handle instances already created for continuing failure. In the failure insegment specifying process, the failure insegment(s) is specified by disposing the threads and advancing them toward the upstream side starting from the failure end insegment to which the cable modem having the failure information belongs at an end of the CATV transmission lines comprising the insegment collection. The process for specifying a failure insegment by use of a handle will be described in detail in later description. When the failure insegment is specified in the step S6, in a step S7, a failure substance analysis program unique to a transmission device is started for the transmission device to which the failure insegment belongs, thereby performing failure analysis. Then, in a step S8, the failure substance in the transmission device is estimated. Furthermore, in a step S9, a continuously generated handle instance is eliminated with respect to failure recovery in which previous failure information becomes normal.

Herein, a logically abstracting expression method of the CATV transmission lines in the failure analysis process of the present invention, i.e., the data structure of the CATV transmission lines to be subjected to failure analysis will be described.

As shown in FIG. 1, since the transmission devices of the CATV transmission lines 15 consist of only physical layer functions, and the physical layer specifications of the transmission devices are normalized and standardized, logical abstraction can be performed in functional units. Therefore, in the present invention, the objects to be analyzed in the CATV transmission lines 15 which are to be subjected to analysis of failure locations ranges from the rear part of an optical modulating/demodulating unit of the headend 22 in FIG. 1 to feeder lines of the premises of subscribers.

Figure 15:
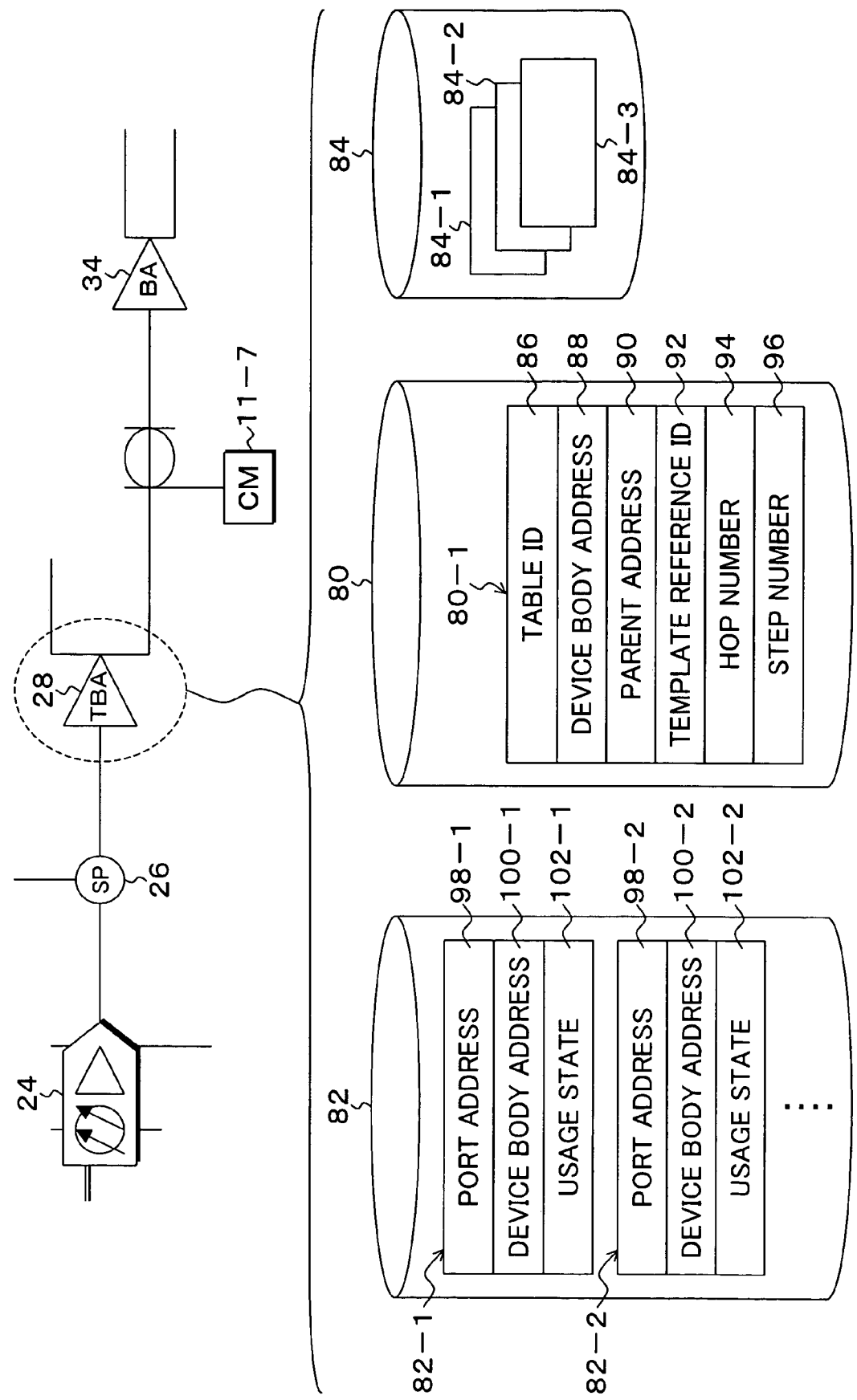
FIG. 15 is an explanatory diagram of transmission device information used in the present invention.

The CATV transmission lines 15 have a tree-like configuration branching from upstream to downstream, and, basically, the cable modems of the premises of subscribers connected to feeder lines from which measured values are to be collected are to be monitored; therefore, monitoring is performed in feeder line units. When the failure location is to be determined by the failure analysis server 12 by means of an algorithm of software, unique and peculiar addresses have to be given to meeting points (branching points, when viewed from the upstream side) at which end feeder lines meet on the CATV transmission lines. Therefore, in the present invention, as is already described, with respect to the transmission devices within the area from the optical node 24 to the feeder lines, a unique address using a unique code is allocated to each of the bodies, the input ports, and the output ports of the transmission devices. Thus, the transmission devices on the CATV transmission lines 15 can be specified by the addresses that have been allocated in advance. With respect to the addresses allocated to each of the devices, device information according to a device management main table 80, a device port management sub table 82, and a device template table 84 shown in FIG. 15 is prepared in advance as table information in the master table 68 of the failure analysis server 12 of FIG. 2 and FIG. 3. Moreover, in the master table 68, an insegment management table 85 shown in FIG. 21 defining an insegment collection which logically abstracts the CATV transmission lines 15 so as to express them is provided.

Figure 16:
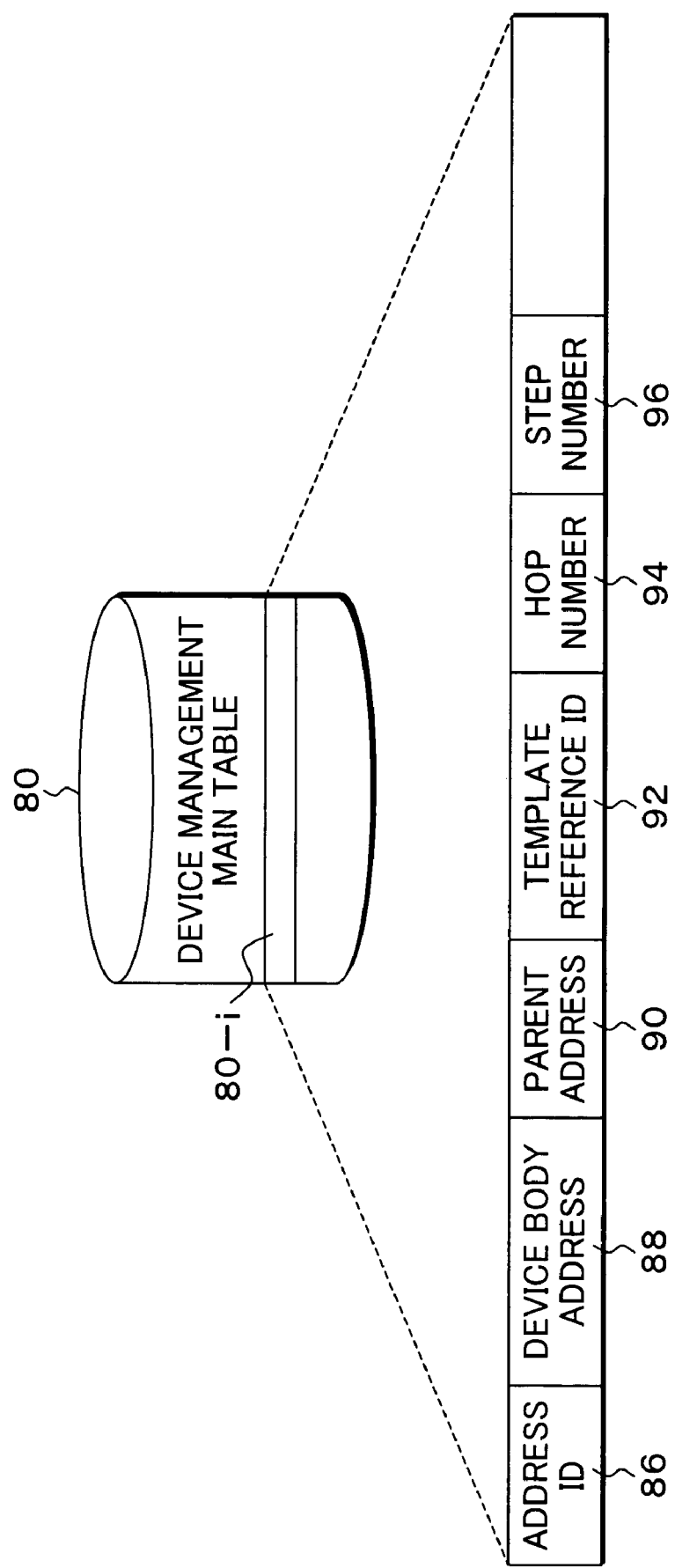
FIG. 16 is an explanatory diagram of the device management main table of FIG. 15.

FIG. 15 employs, as an example, the TBA 28 connected to the output port side of the optical node 24 of FIG. 1 via a splitter 26, so as to show the device management main table 80, the device port management sub table 82, and the device template table 84. Firstly, in the device management main table 80, a record is stored for every transmission device on the CATV transmission lines, and a record 80-1 of the TBA 28 is shown in this example. The record contents of the device management main table 80 are shown as a record 80-$i$ alongside in FIG. 16. In the record 80-1, a table ID 86, a device body address 88, a parent address 90, a template reference ID 92, a hop number 94, and a step number 96 are stored. The table ID 86 is a unique code of the record 80-1. The device body address 88 stores a body address of the TBA 28. The template reference ID 92 is a record ID of a corresponding template of the device template table 84. The parent address 90 is the address of the transmission device that is at the upstream side of the body address of the TBA 28, in this example, the address of an output port of the splitter 26. The hop number 94 is the value that is counted up by one every time passing through a transmission device having an amplification circuit, i.e., a transmission device having an amplification circuit such as a TBA, a BA, a DA, or an EA, wherein the number of the optical node 24 is assumed to be one.

In FIG. 15, the hop number of the optical node 24 is one, and the hop number at the subsequent splitter does not change since it is a passive device.

Figure 17:
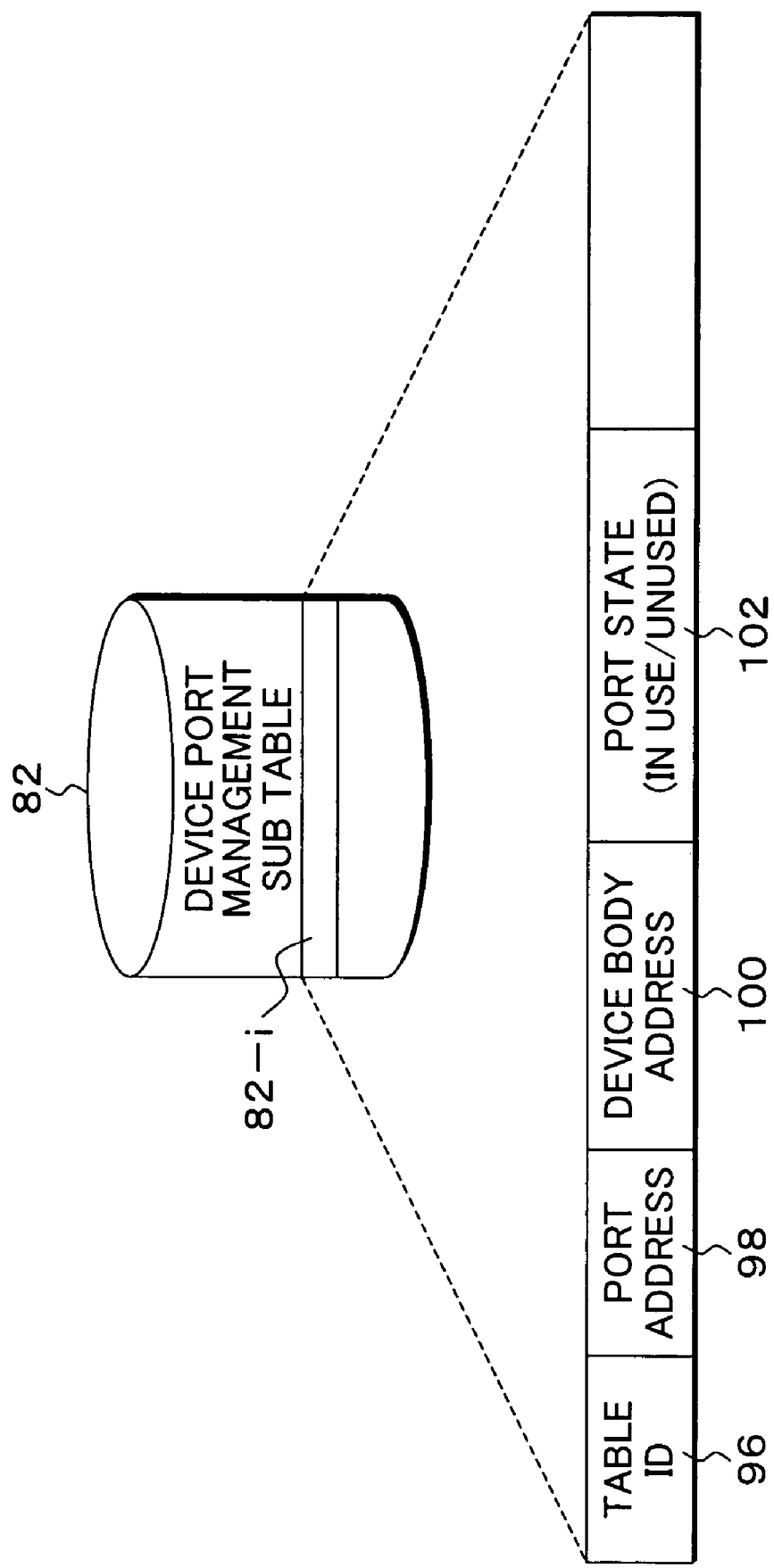
FIG. 17 is an explanatory diagram of the device port management table of FIG. 15.

Then, the hop number becomes two at the TBA 28, and then, the hop number becomes three at the BA 34. The hop number is used for selecting measured values upon multipoint display of statistical information which will be disclosed in later description. The step number 96 is the value that is counted up by one, regardless of the presence of an amplification circuit, every time a transmission line branches, wherein the number of the failure detection server 10 of FIG. 1 is assumed to be one. The step number is shown, for example, in FIG. 22, wherein the failure detection server 10 is a step 1, the line cards composing the cable router 14 are a step 2, and the optical node 24 is a step 3, thereafter, it increases every time the transmission lines branch so as to be a step 4, a step 5, and a step 6. The step number 96 is used in a failure searching process performed toward the upstream side by means of threads of failure insegments when the CATV transmission lines are logically abstracted as a collection of insegments The device port management sub table 82 stores, corresponding to the record 80-1 of the TBA 28 in the device management main table 80, records 82-1 and 82-2 corresponding to output ports. The device port management sub table 82 is shown as a record 82-1 alongside in FIG. 17, and stores a table ID 96, a port address 98, a device body address 100, and a port state 102, wherein the port state 102 indicates whether it is in use or unused. The table ID is omitted in the record 82-1 and 82-2 of FIG. 15. Furthermore, in the device template table 84, templates 84-1, 84-2, and 84-3 specifying the internal configurations of the transmission devices are stored.

Figure 18:
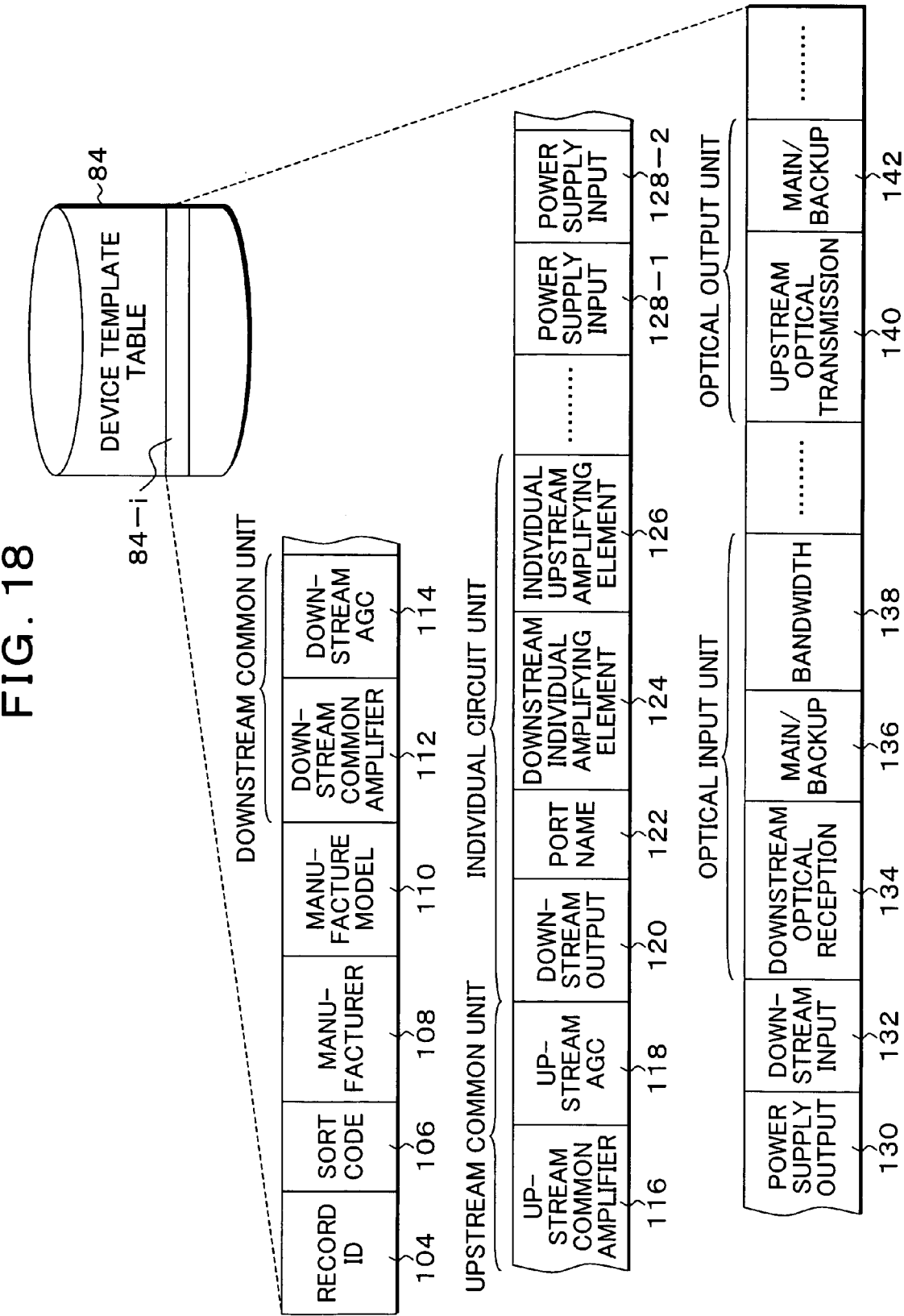
FIG. 18 is an explanatory diagram of the device template table of FIG. 15.

FIG. 18 is an explanatory diagram of the device template table 84, wherein the record of a template 84-1 is enlarged and described. The record of the template 84-1 of FIG. 18 corresponds to the template data structure of FIG. 18.

Figure 19:
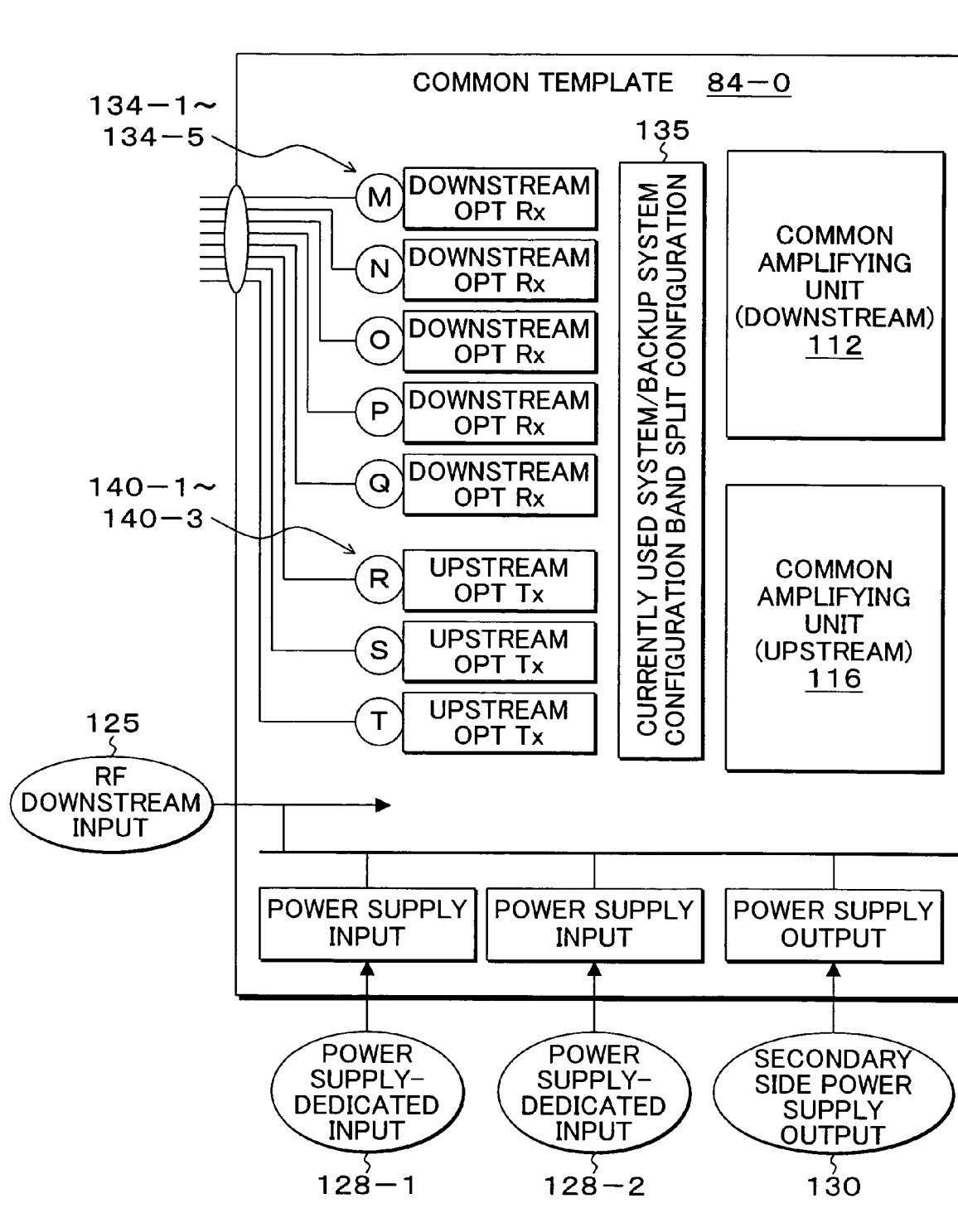
FIG. 19 is an explanatory diagram of a template used in failure analysis of the present invention.
Figure 20:
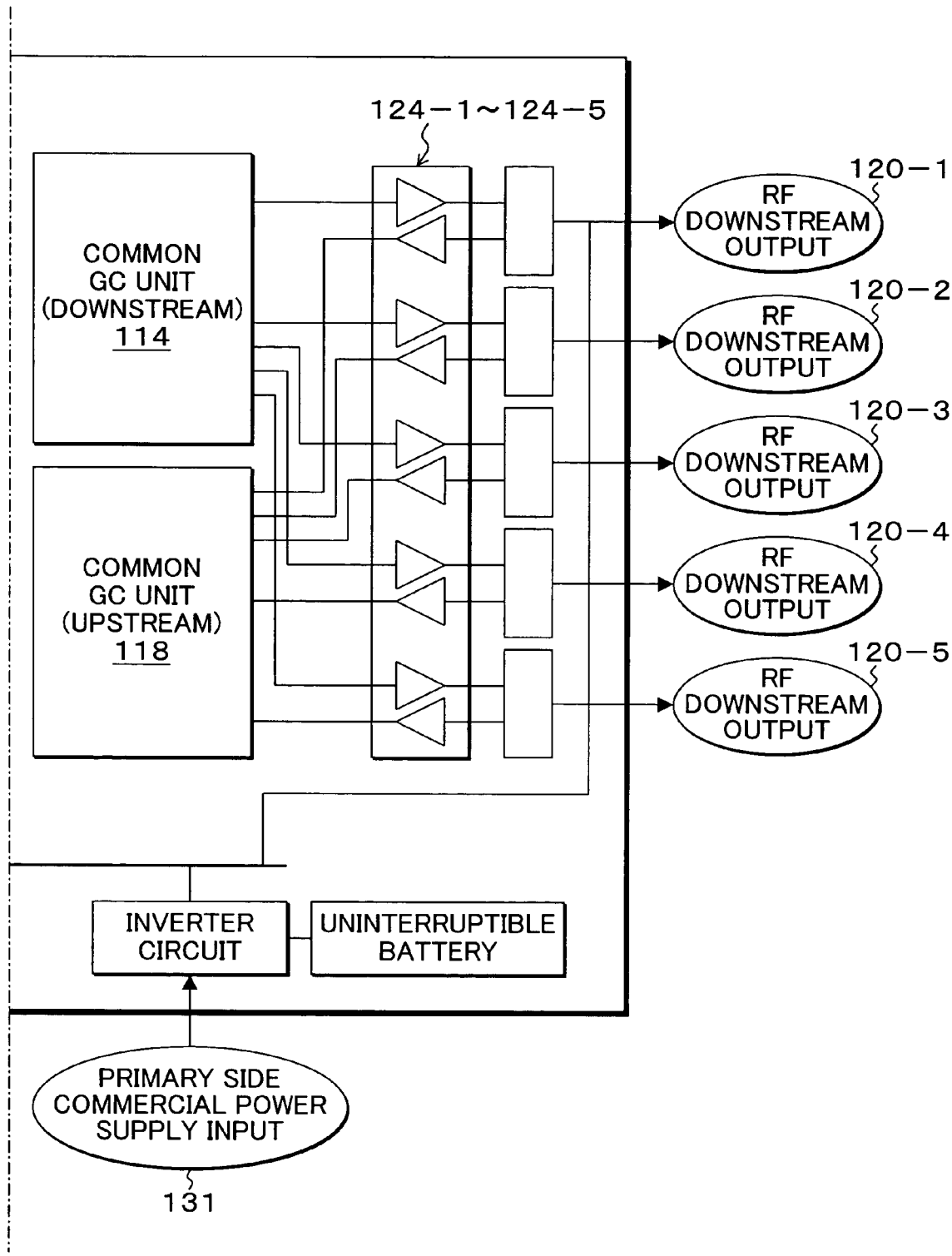
FIG. 20 is an explanatory diagram, subsequent to that of FIG. 19, of the template used in the failure analysis of the present invention.

FIG. 19 and FIG. 20 show the data structure of a template 84-0 that can be applied to all transmission devices disposed on the CATV transmission lines 15. In the common template 84-0 provided are a downstream common amplifier 112, a downstream common gain-control unit (common GC unit) 114, an upstream common amplifier 116, an upstream common gain-control unit 118, individual amplifiers 124-I to 124-5, RF downstream outputs 120-1 to 120-5, a RF downstream input 125, power supply dedicated inputs 128-1 and 128-2, a secondary side power supply output 130, a primary side commercial power supply input 131, downstream optical reception units 134-1 to 134-5, upstream optical transmission units 140-1 to 140-3, and a setting unit 135 of a currently used system/backup system configuration and a band split configuration. Corresponding to such common template 84-0 of FIG. 19 and FIG. 20, the record 84-i is prepared for every transmission device in the device template table 84 of FIG. 18, and the fields corresponding to the functional units of the template 84-0 are provided after a record ID 104, a sort code 106, a manufacturer 108, and a manufacture model 110. Therefore, in the present invention, for example, when a template 84-1 of the TBA 28 of FIG. 15 is to be set, because the TBA 28 has a bifurcate output port, the RF downstream input 125 and the RF downstream outputs 120-1 and 120-2 in the template 84-0 of FIG. 19 and FIG. 20 are set in an effective state. Accordingly, the corresponding downstream common amplifier 112, the downstream common GC unit 114, and the individual amplifying units 124-1 and 124-2 are automatically set to be effective. That is, the flags indicating that functions are effective are turned on in the fields representing the functions corresponding to the record 84-1 in the device template table 84 of FIG. 18, and the fields other than that are invalidated. In the above described manner, in the present invention, internal circuits of transmission devices can be easily defined by specifying input/output with respect to the common template.

Figure 21:
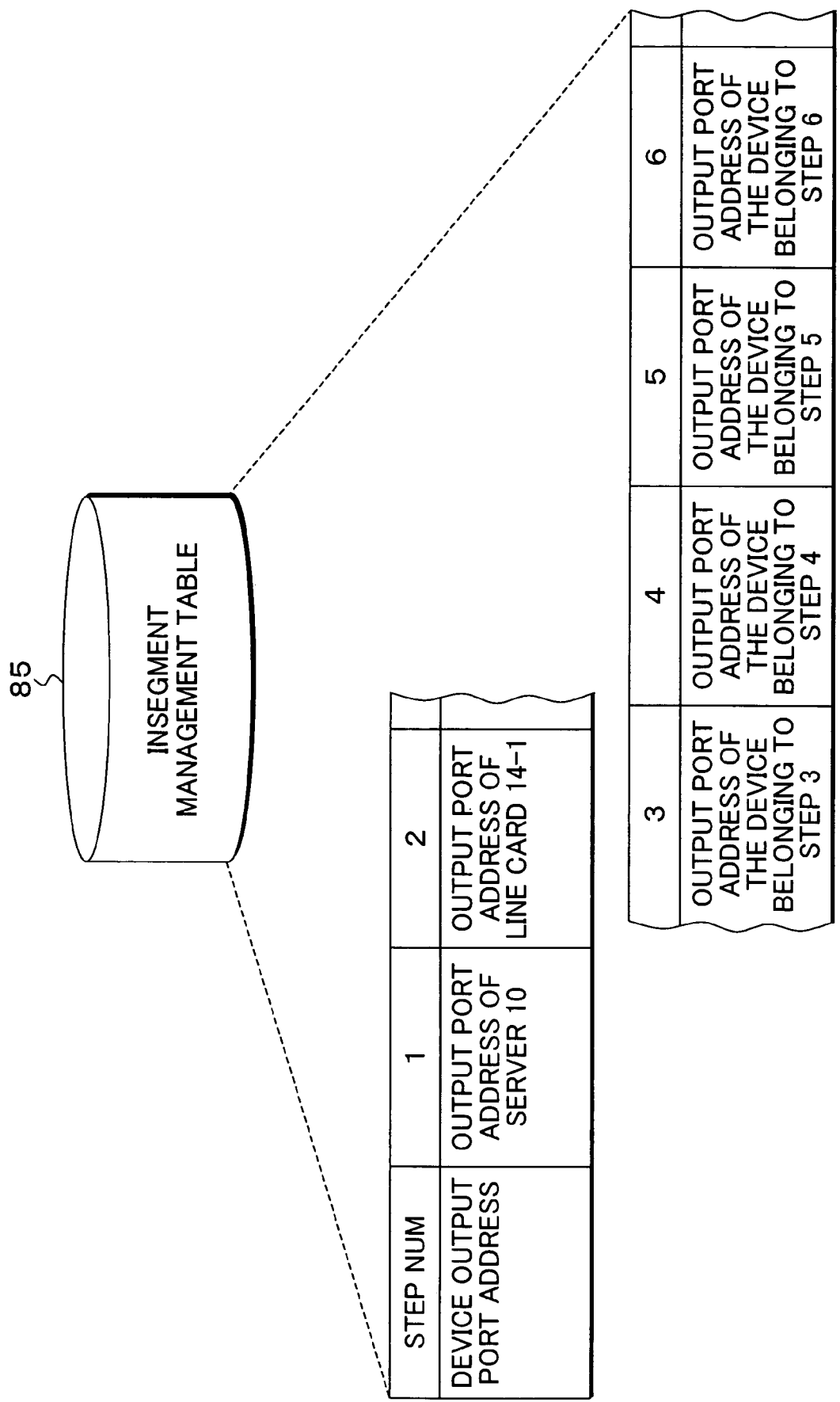
FIG. 21 is an explanatory diagram of an insegment management table used in the failure analysis of the present invention.

FIG. 21 is an explanatory diagram of the insegment management table 85 provided in the master table 68 of the failure analysis server 12. In the insegment management table 85, corresponding to the step number shown in FIG. 22 which is counted up one by one every time the transmission line branches wherein the number of the failure detection server 10 is one, and the address of the insegment belonging to each of the step numbers, i.e., output port addresses to which insegments belong are stored.

According to the insegment management table 85, positions on the transmission lines of the insegment collection obtained by logically abstracting the CATV transmission lines can be specified.

An insegment serving as the processing unit of failure analysis of the present invention will next be described. The CATV transmission lines 15 to be monitored by the present invention can be defined as a tree-like network starting from the optical node 24 and branching toward the downstream side. Therefore, starting from the point of the failure information that has been determined from the measured values of a cable modem disposed at an end, the failure analysis server 12 repeatedly determines the state at each of the connection points of the tree-like network toward the upstream side, thereby estimating the failure location. In the present invention, with respect to the tree-like network forming the CATV transmission lines, unique addresses are allocated to the body and input/output ports of each transmission device, thereby expressing the CATV transmission lines 15 by logically abstracting them as a continuous address/parent address collection comprising the pair of the address and the upstream parent address thereof. In order to determine failure locations of transmission lines from the CATV transmission lines 15 which are logically abstracted as such continuous collection of addresses/parent addresses, an idea expressing not merely connection points but the internal circuits of the transmission devices at connection points have to be adopted. Therefore, in the present invention, the idea of insegments such as that shown in FIG. 23 is adopted.

Figure 23:
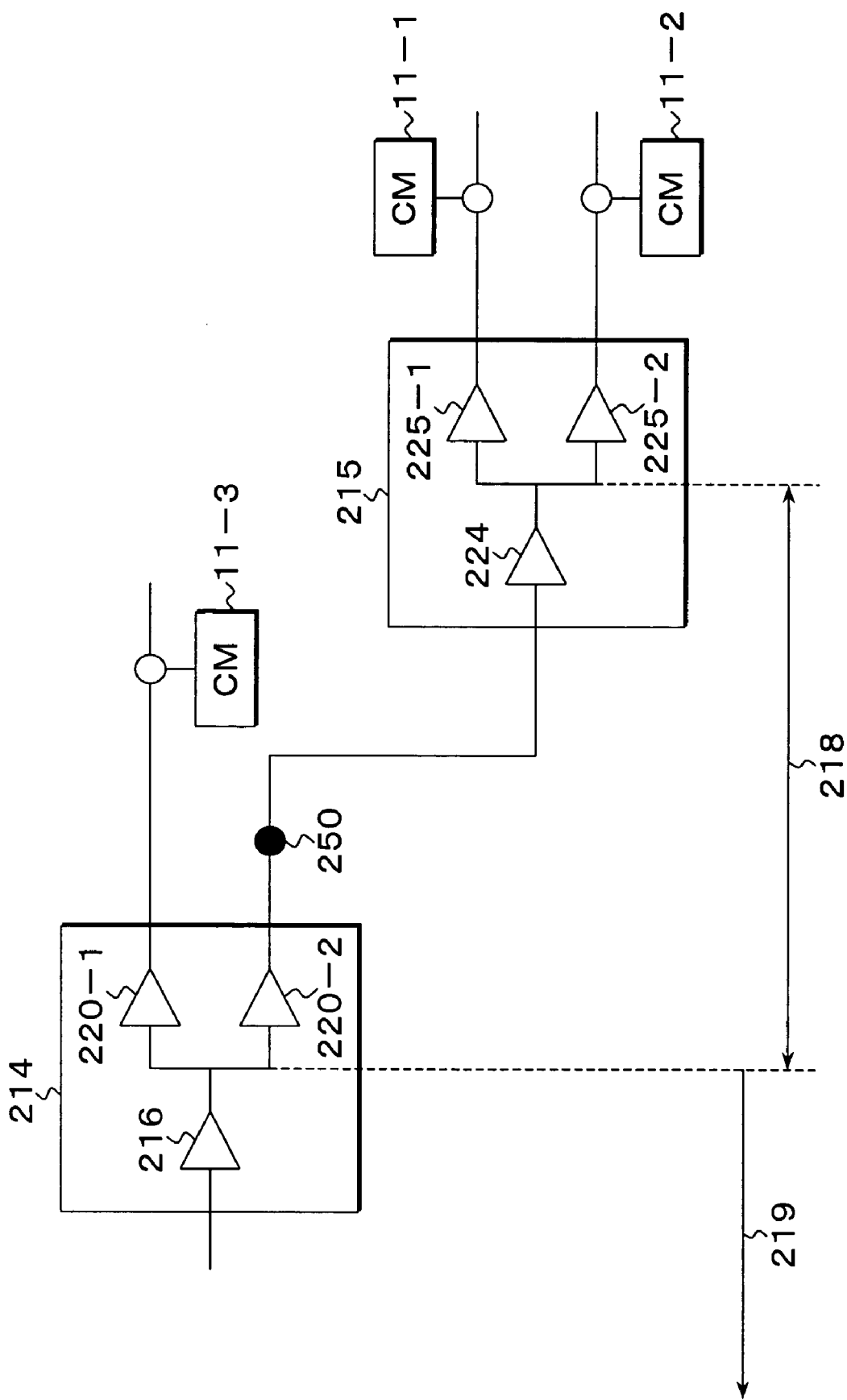
FIG. 23 is an explanatory diagram of an insegment in the present invention.

FIG. 23 focuses on a branch connection using BAs in the CATV transmission lines. More specifically, an amplifier 215 is connected to a lower-side output port of an amplifier 214, and is further bifurcated. Herein, focusing on the amplifiers 214 and 215, the interior thereof can be separately considered as common circuits 216 and 224, and individual circuits 220-1 and 220-2, and 225-1 and 225-2, respectively. With respect to the transmission lines of such amplifiers 214 and 215, in the present invention, the part from the common circuit 224 of the amplifier 215 to the individual circuit 220-2 of the amplifier 214 at the upstream side is defined as one insegment 218.

As the address of the insegment 218, the parent address viewed from the amplifier 215, i.e., an address 250 of the lower-side output port of the amplifier 214, which is at the upstream side, is allocated. In FIG. 23, the cable modems 11-1 and 11-2 are provided on the feeder lines of the parent-side output port and the lower-side output port of the amplifier 215, and the cable modem 11-3 is provided on the feeder line of the upper-side branched output of the amplifier 214, and it is assumed that failure determination is performed by the failure detection server 10 through collection of measured values. Herein, the following three patterns are conceivable as the failure state of the case in which failure is detected in any one of the cable modems 11-1, 11-2, and 11-3.

(Pattern 1)

Pattern 1 is the case in which the cable modems 11-1 and 11-2 are normal, and the cable modem 11-3 is abnormal. In this case, any of: failure of the individual circuit 220-1 of the amplifier 214, failure of the cable modem 11-3, and failure of a cable or a connector connecting the amplifier 214 and the cable modem 11-3, can be estimated.

(Pattern 2)

Pattern 2 is the case in which the cable modems 11-1 and 11-2 are in failure, and the cable modem 11-3 is normal. In this case, failure in any of the common circuit 224 of the amplifier 215, the individual circuit 220-2 of the amplifier 214, or a cable or a connector connecting the amplifiers 214 and 215, can be estimated.

(Pattern 3)

Pattern 3 is the case in which the cable modems 11-1 and 11-3 are normal, and the cable modem 11-2 is abnormal. In this case, any of: failure of the individual circuit 225-2 of the amplifier 215, failure of the cable modem 11-2, and failure of a cable or a connector connecting the amplifier 215 and the cable modem 11-2, can be estimated.

As is clear from above described Patterns 1 to 3, determination of a failure location requires not only estimation of transmission devices, but also estimation in the connection between two transmission device bodies, wherein, in principle, the estimated malfunction area extends to the internal circuits of transmission devices positioned at both ends of a transmission line. Because of above described reason, in the present invention, when the amplifier 215 is employed as an example as shown in FIG. 23, the part from the individual circuit 220-2 at the front of the output port of the upstream-side amplifier 214 to the common circuit 224 at the rear of the input port of the amplifier 215, which is a transmission device of the downstream side, is defined as an insegment viewed from the amplifier 215, and is expressed by the address 250 of the output port of the upstream-side amplifier 214, i.e., the parent address viewed from the amplifier 215. In accordance with the adoption of the idea of such insegment, in the malfunction location specifying process of the present invention, failure information of the same kind is disposed at an end of the insegment collection which is logical abstraction of the CATV transmission lines, then, a failure insegment is specified by determination of the transmission state repeated from the failure point to the upstream side, and the failure cause is estimated by checking the internal configuration of the transmission devices belonging to the failure insegment. Herein, insegments of the case in which the CATV transmission lines are expressed as a logically abstracted insegment collection can be regarded separately as following four types of insegments such as those shown in FIG. 22(B).

(1) Insegments (2) Directly monitored insegments (3) End insegments (4) Failure insegments FIG. 22(A) shows the CATV transmission lines that are logically abstracted in accordance with the definition of normal cable modems, failure cable modems, and the four types of insegments of FIG. 22(B). It should be noted that the normal cable modems are the cable modems of which measured values are determined to be normal, and the failure cable modems are the cable modems of which measured values are determined to be in failure, that does not mean whether the cable modems per se are normal or in failure, except for the case of polling-no-response.

In FIG. 22(A), the cable modems 11-1, 11-4 to 11-6, and 11-7 disposed at ends of the transmission lines are the directly monitored insegments and end insegments. The end insegment to which the cable modem 11-1 belongs is a failure insegment determined through failure analysis to be in failure.

Also, the insegment from an individual circuit of an amplifier 238 to the common circuit of an amplifier 242 connecting the cable modem 11-10 therebetween is a failure insegment. Furthermore, the insegments connecting the cable modems 11-2, 11-3, 11-8, and 11-10 in the middle of the transmission lines are also direct insegments. The parts to which cable modems are not connected represent mere insegments.

Figure 24:
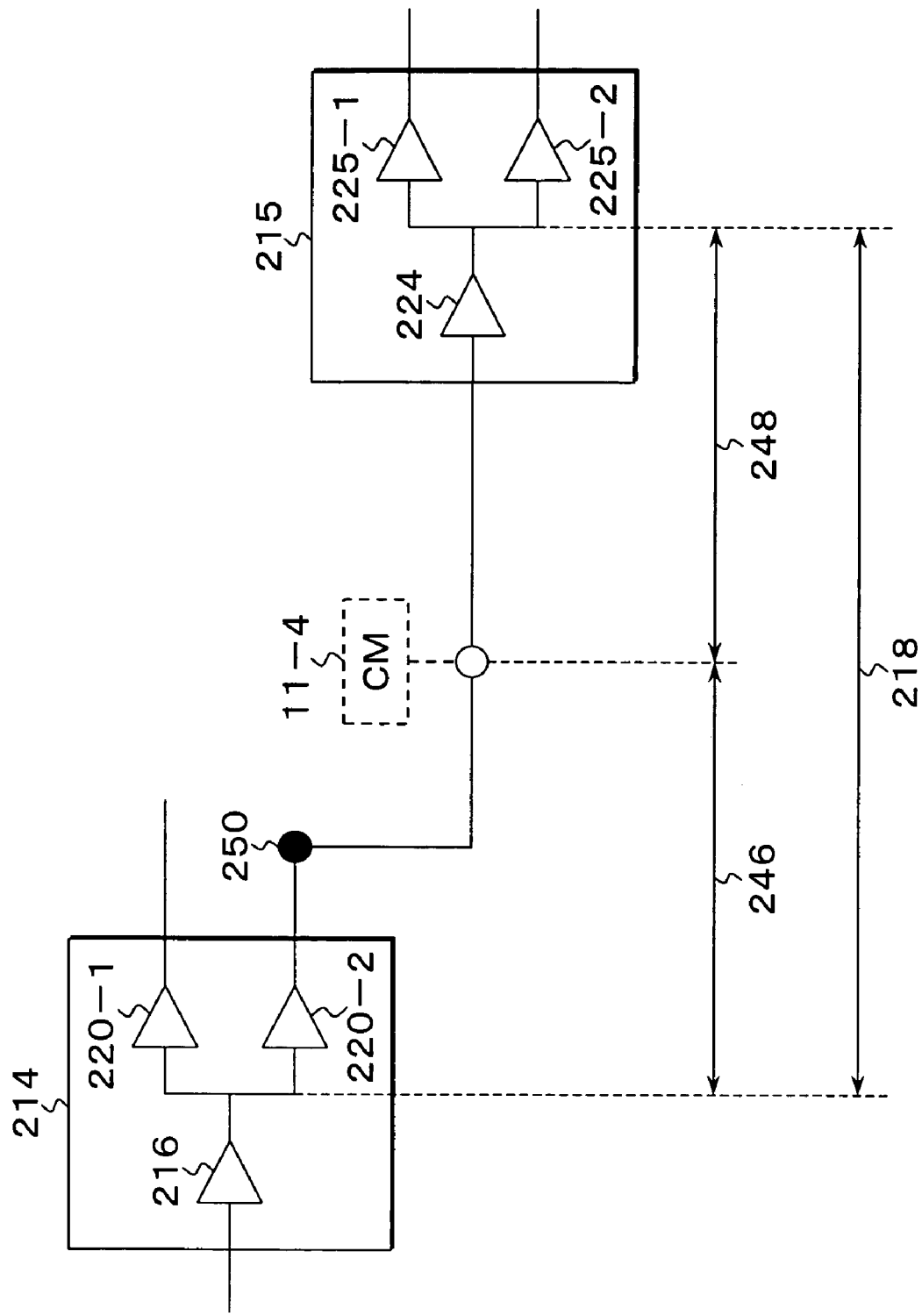
FIG. 24 is an explanatory diagram of insegment division in the present invention.

FIG. 24 is an explanatory diagram of an insegment in the case in which a cable modem is disposed on a transmission line connecting two transmission devices on a transmission line. In FIG. 24, the cable modem 11-4 is connected on the transmission line between the amplifier 215 connected to the lower-side branch output of the amplifier 214, and the transmission state between the amplifier 214 and the amplifier 215 is collected through measured values of the cable modem 11-4, thereby determining whether it is in failure or normal. Herein, although the insegment 218 of the amplifier 215 ranges from the individual circuit 220-2 of the upstream-side amplifier 214 to the common circuit 224 of the amplifier 215, by providing the cable modem 11-4 in the middle of the insegment 218, the failure location in the insegment 218 can be narrowed down depending on whether the cable modem 11-4 is normal or abnormal. When the cable modem 11-4 is provided in the insegment 218, bordered at the position of the cable modem 11-4, the insegment 218 can be divided into a backward insegment 246 at the upstream side and a forward insegment 248 at the downstream side.

Accordingly, when the cable modem 11-4 is not provided, the part from the individual circuit 220-2 of the amplifier 214 to the common circuit 224 of the amplifier 215 is caused to be the estimation area of a failure location according to the insegment 218; however, when the cable modem 11-4 determined to be in failure is present on the insegment 218, the failure location can be narrowed down by dividing it into the backward insegment 246 and the forward insegment 248. That is, when the measurement information of the cable modem 11-4 represents failure, the failure location can be narrowed down to be in the backward insegment 246 of the upstream side. The failure cause can be estimated merely by the determination process of the individual circuit of the amplifier 214. Meanwhile, when the measured values of the cable modem 11-4 are normal, the failure location is narrowed down to the forward insegment 248 at the downstream side, and the failure cause can be estimated merely by the determination process of the common circuit of the amplifier 215.

Figure 25:
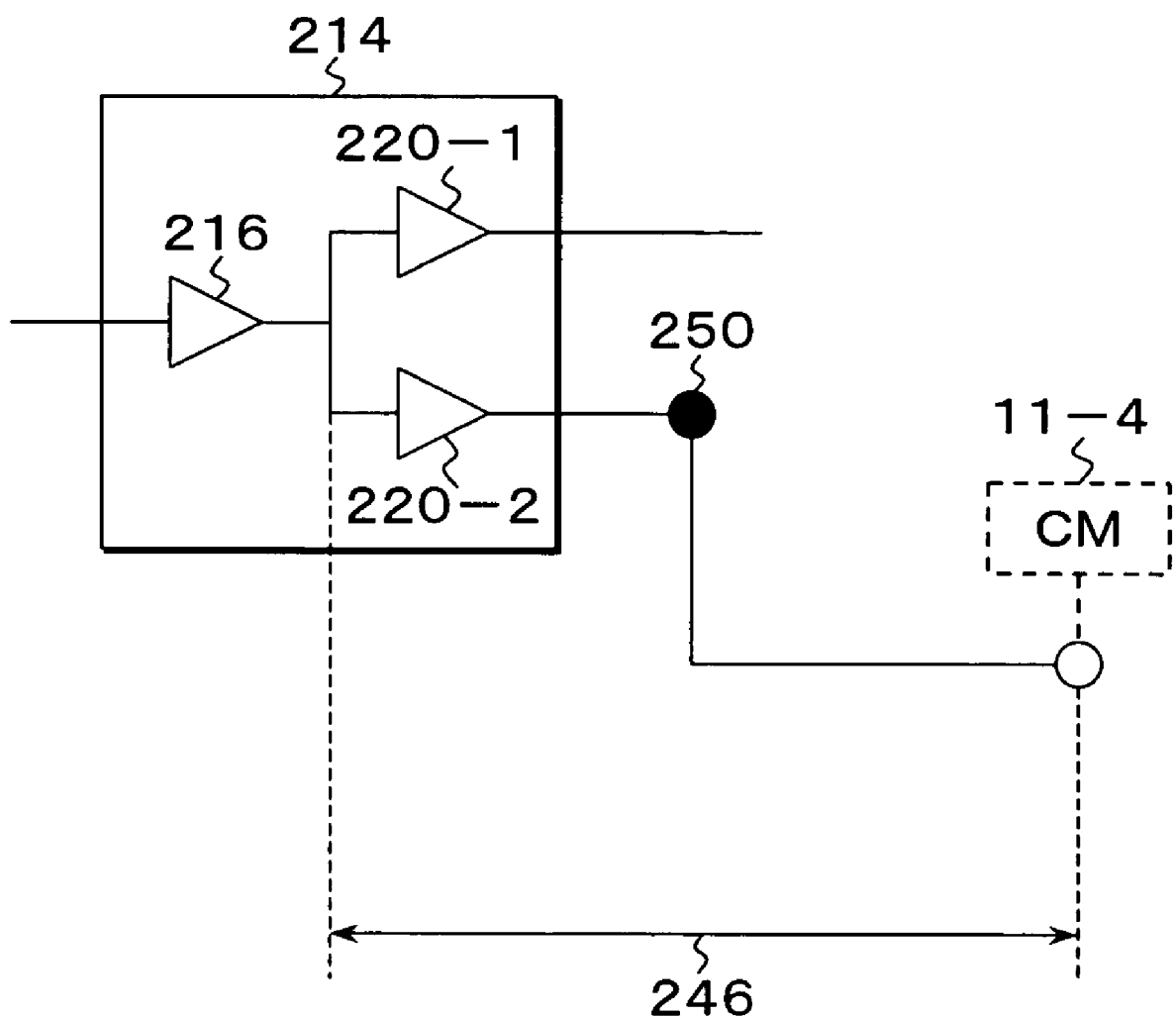
FIG. 25 is an explanatory diagram of an end insegment in the present invention.

FIG. 25 is an explanatory diagram of the insegment from which the downstream side of the cable modem 11-4 of FIG. 24 is removed. When the downstream side of the cable modem 11-4, i.e., the forward insegment 248 is removed in this manner, only the backward insegment 246 of the upstream side remains. The backward insegment 246 is equivalent to an end insegment in the insegment collection of FIG. 22(A), e.g., the end insegment of the cable modem 11-1 connected to the feeder line of the output port of an amplifier 230. That is, end insegments of feeder lines in the insegment collection of the present invention can be treated equivalently to the backward insegment 246 of the case in which a cable modem is provided on the insegment 218 of FIG. 24.

Figure 26:
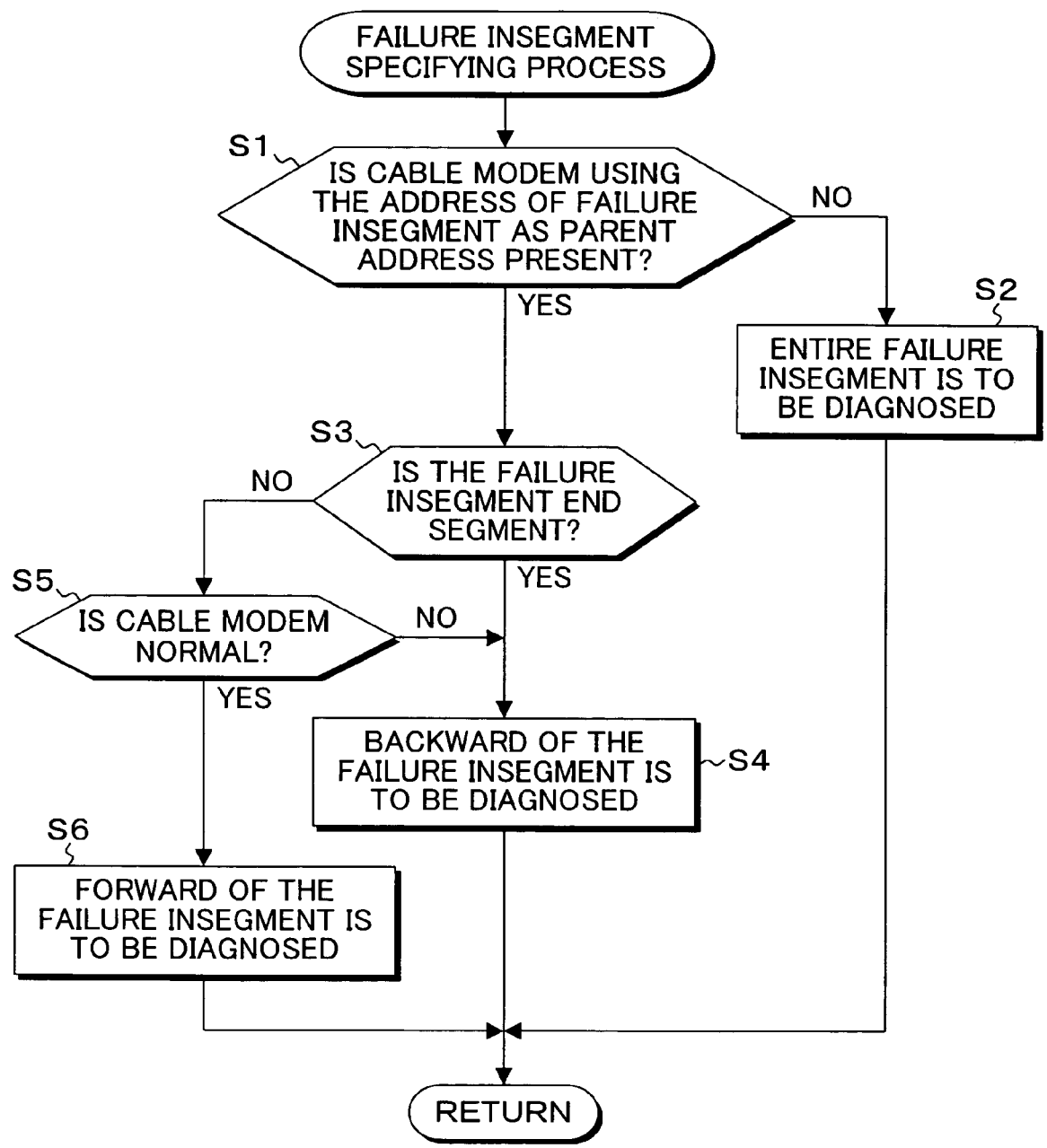
FIG. 26 is a flow chart of a failure insegment specifying process according to the present invention.

FIG. 26 is a flow chart of the failure insegment specifying process performed by the failure analysis server 12 with respect to the insegment collection expressing the logically abstracted CATV transmission lines, and showing the contents of the failure insegment specifying process of the step S6 in the flow chat of FIG. 14. In FIG. 26, in the failure insegment specifying process, whether or not there is any cable modem using the address of the failure insegment as a parent address is checked in a step S1. Herein, as shown in FIG. 22, if the insegment 218 is determined to be the failure insegment, the address thereof is the address 250 of the output port of the individual circuit 220-2 of the amplifier 214, and the address 250 serves as the parent address of the cable modem 11-4 connected on the insegment 218. If there is no cable modem having the address of the failure insegment as the parent address in above described manner, it is mere failure insegment. Accordingly, the process proceeds to a step S2 wherein the entire failure insegment is determined to be diagnosed.

Meanwhile, if there is a cable modem using the address of the failure insegment as the parent address, whether or not the failure insegment is an end insegment such as that of FIG. 25 is checked in a step S3. If it is an end insegment, the process proceeds to a step S4, wherein the backward of the failure insegment is determined to be diagnosed.

That is, in FIG. 25, the backward insegment 246 side viewed from the cable modem 11-4, i.e., the end insegment is determined to be diagnosed. If the failure insegment is not an end insegment in the step S3, it is an insegment 218 such as that in FIG. 24, therefore, whether or not the measured values of the cable modem belonging to the failure insegment is normal is checked. If the measured values of the cable modem are abnormal, the process proceeds to the step S4, wherein the backward of the failure insegment is determined to be diagnosed.

Figure 27:
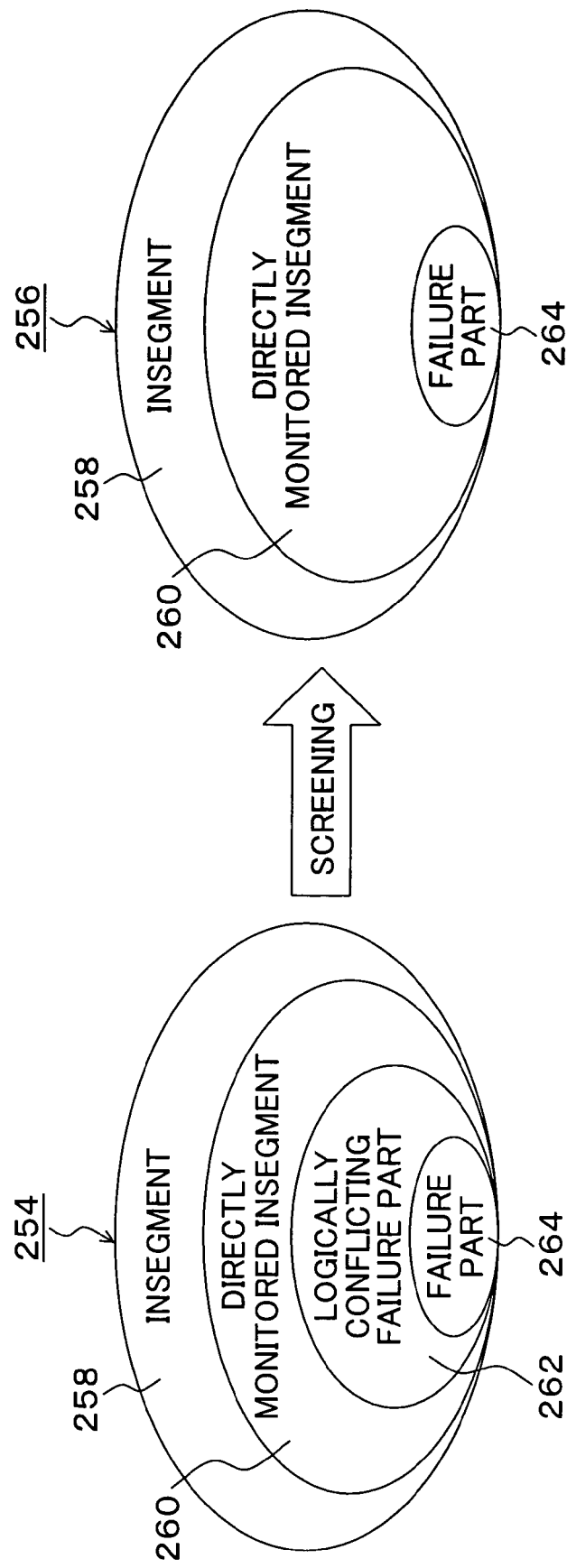
FIG. 27 is an explanatory diagram of a screening process according to the present invention.

For example, in FIG. 24, if the measured values of the cable modem 11-4 are normal, the backward insegment 246 is determined to be diagnosed. If the measured values of the cable modem are abnormal in a step S5, the process proceeds to a step S6, wherein the forward of the failure insegment is determined to be diagnosed. That is, the forward insegment 248 is determined to be diagnosed in the insegment 218 of FIG. 24. Next, a process of the screening processing unit 202 provided in the failure analysis unit 64 of FIG. 13 will be described. FIG. 27 abstractly shows unprocessed data 254 and processed data 256 of a screening process performed in the failure analysis server 12. The unprocessed data 254 includes insegments 258 determined by the addresses of all output ports, directly monitored insegments 260 provided with cable modems, logically conflicting failure part 262, and failure part 264.

In the logically conflicting failure part 262 in such unprocessed data 254, logically conflicting failure information is generated due to, for example, failure in a tap-off to which a cable modem is connected, lead-in wire failure, protector failure, concurrent failure of a redundant cable modem group, and SNMP polling failure. Therefore, in the present invention, preceding to analysis of failure locations, screening for eliminating the logically conflicting failure part 262 is executed. The screening for eliminating the logically conflicting failure part 262 is a process for changing failure information to be normal. Accordingly, as shown in the processed data 256, the area in which the logically conflicting failure part 262 is added to the directly monitored insegments 260 in the unprocessed data 254 serves as the directly monitored insegments 260 in the processed data 256.

Figure 28:
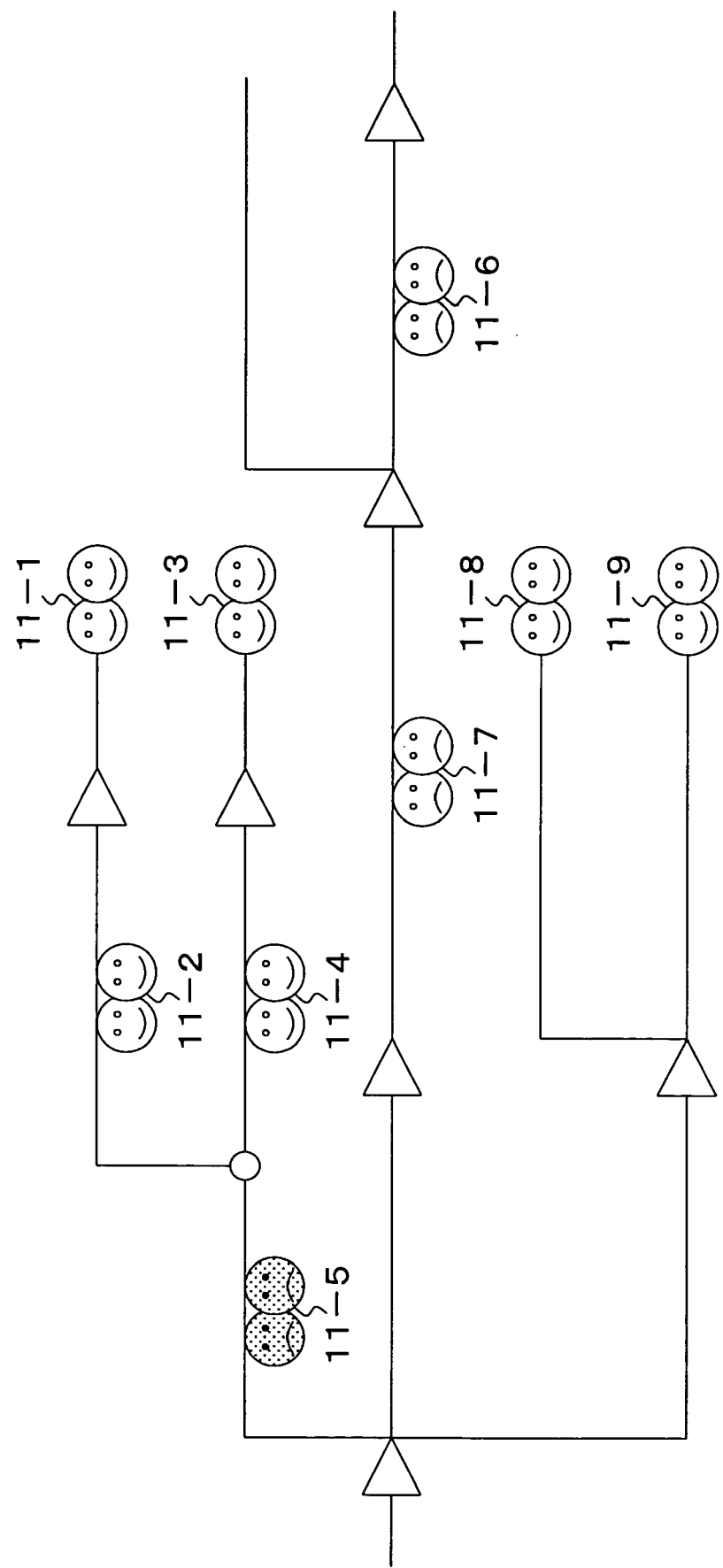
FIG. 28 is an explanatory diagram of logically conflicting failure information which is to be subjected to screening.

FIG. 28 is a specific example of a failure insegment that is to be screened. In FIG. 28, if the measured values of the cable modem 11-5 are abnormal, all the measured values of the cable modems 11-1 to 11-4 in the downstream side thereof are supposed to be abnormal. However, in this case, all the measured values of the cable modems 11-1 to 11-4 in the downstream side are normal, thereby causing logical conflict with the fact that the measured values of the cable modem 11-5 are abnormal.

In the screening process of the present invention, directly monitored insegments having such logically conflicting failure information are eliminated, and the state of the insegments are forcibly changed to normal.

Figure 29:
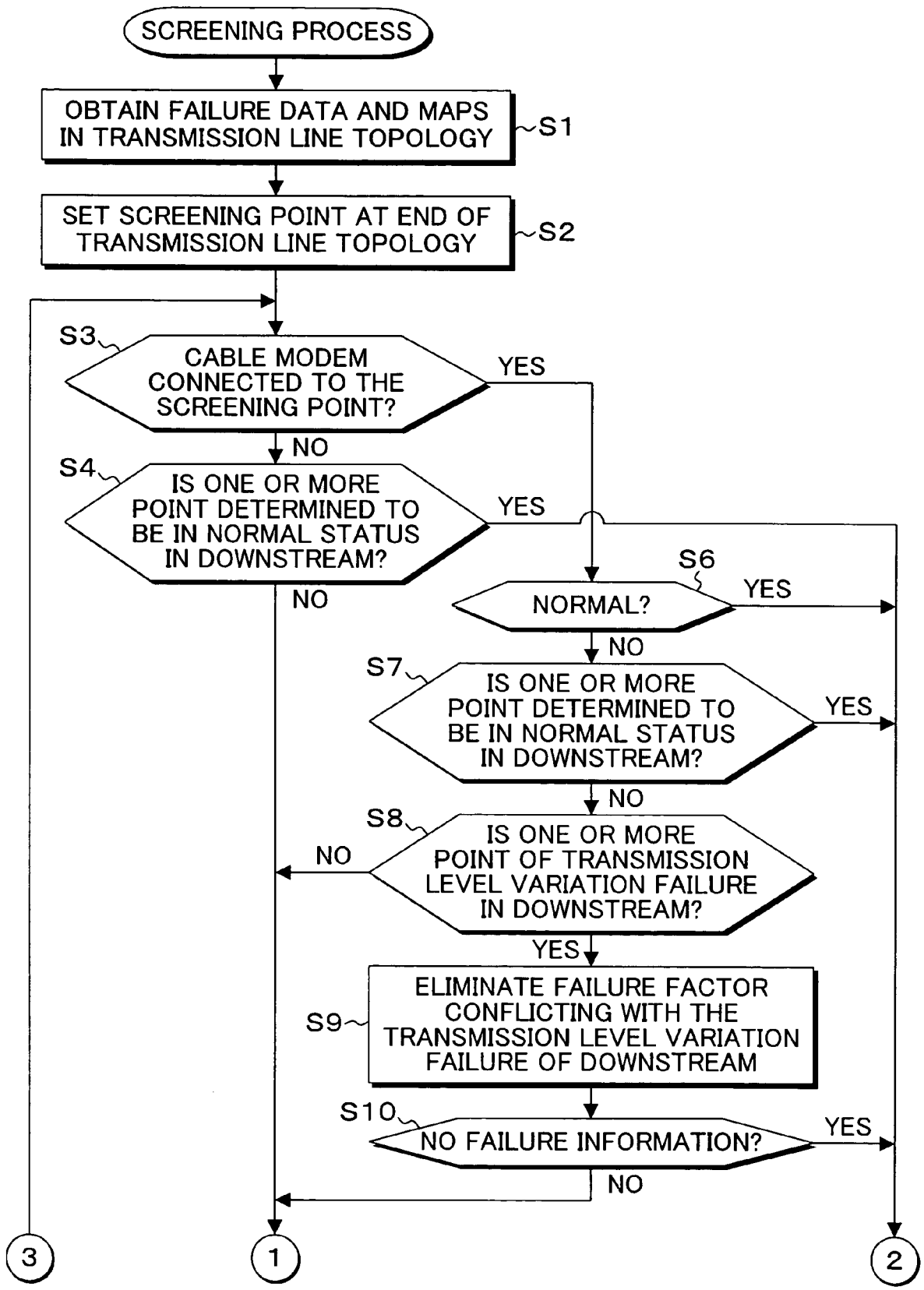
FIG. 29 is a flow chart of a screening process according to the present invention.
Figure 30:
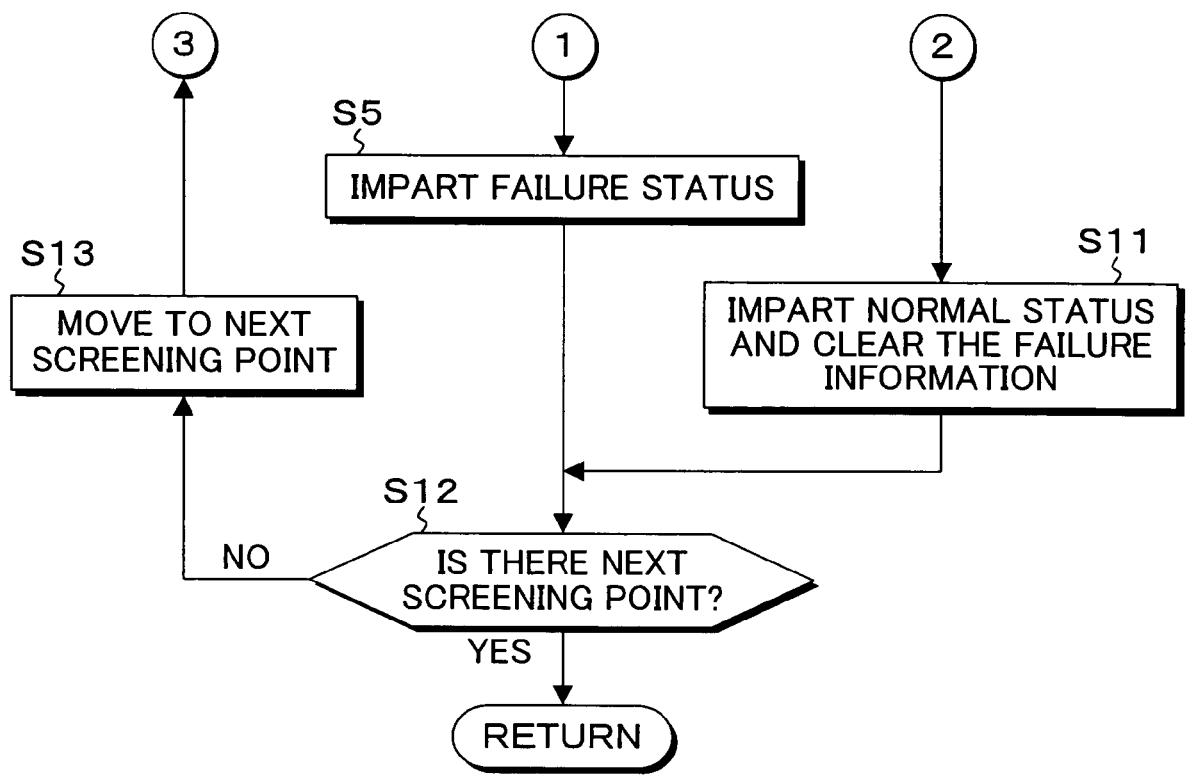
FIG. 30 is a flow chart, subsequent to that of FIG. 29, of the screening process according to the present invention.

FIG. 29 and FIG. 30 are flow charts of the screening process in the present invention, showing details of the screening process shown in the step S2 of the flow chart of FIG. 14. In the screening process of FIG. 29 and FIG. 30, firstly, in a step S1, the failure information transferred from the failure detection server 10 is obtained, and mapped on a directly monitored insegment to which the cable modem determined to be in failure from measured values belongs on the logically abstracted transmission line topology. Subsequently, the point of the screening process is set at an end of the transmission line topology in a step S2, and whether or not a cable modem is connected to the screening point is checked in a step S3. If no cable modem is connected thereto, whether or not one or more points determined to be in a normal status is in the downstream is checked in a step S4. Because the first screening point is at an end insegment, there is no point in the downstream side determined to be in a normal status, and the process proceeds to a step S5 wherein a failure status is imparted. Then, there is a next screening point in a step S12, therefore, the process moves to a next screening point in a step S13, and returns to the process of the step S3 again wherein whether or not a cable modem is connected to the screening point is checked. If there is no connected cable modem even when it proceeds to the next screening point, whether or not one or more points determined to be in a normal status is in the downstream side is checked in the step S4. If there is, the process proceeds to the step S11 in which the screening of imparting a normal status so as to clear the failure information is performed. If a cable modem is found out to be connected to the screening point in the step S3, whether or not the measured values of the cable modem are normal is checked in a step S6. If they are normal, the process proceeds to the step S11, wherein a normal status is imparted so as to clear the failure information since there is a logical contradiction. If they are not normal in the step S6, whether or not one or more points determined to be in a normal status is in the downstream is checked in a step S7, and if there is, in the step S11, a normal status is imparted so as to clear the failure information since there is a logical contradiction. If one or more points determined to be in a normal status are not in the downstream side in the step S7, whether or not one or more points of transmission level variation failure are in the downstream is checked in a step S8. If there is no such points, a failure status is imparted in the step S5, and the process proceeds to a next screening point. If there are one or more points of transmission level variation failure in the step S8, the failure factor(s) conflicting with the transmission level variation failure of the downstream is eliminated in a step 59. If all failure information is eliminated in a step 510 as a result of the failure factor elimination, the process proceeds to the step S11, wherein a normal status is imparted and the failure information is cleared. If failure information remains even after elimination of failure factors, the process proceeds from the step S10 to the step S5, wherein a failure status is imparted, and proceeds to a next screening point. When screening is repeated from such failure end insegment with which the failure data of an end of the transmission topology is mapped to the output port of the head-end 22 in the upstream side, logically conflicting failure insegments can be eliminated. Next, by employing part of the CATV transmission lines 15 of FIG. 31 as an example, a failure location estimation process performed by the failure analysis server 12 of the present invention will be described in detail.

Figure 31:
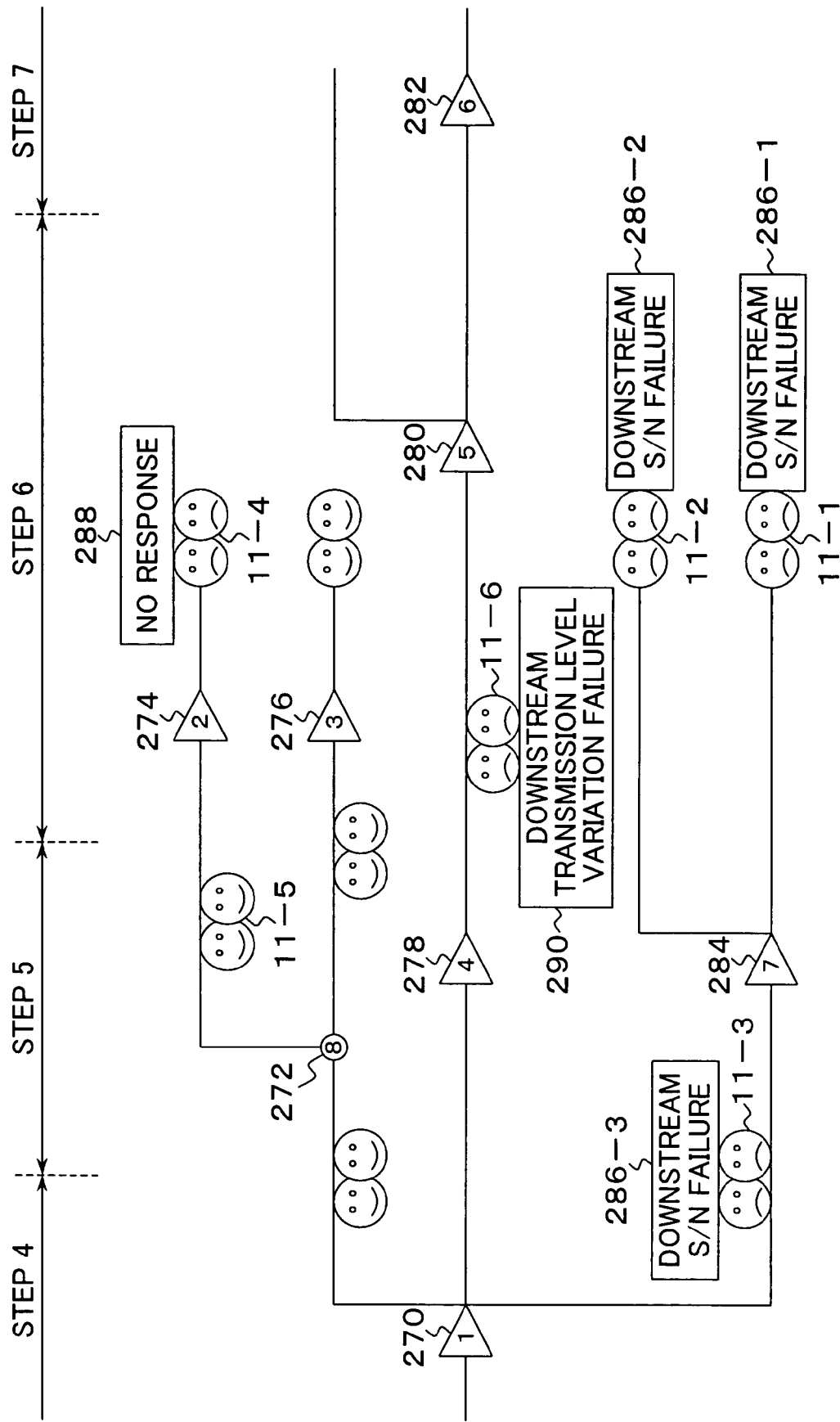
FIG. 31 is an explanatory diagram of the failure information of CATV transmission lines which are to be subjected to a failure insegment specifying process of the present invention.

In FIG. 31, the CATV transmission line part in the position of the step number 4 to the step number 7 is abstracted, the cable modems 11-1 and 11-2 provided at ends are determined to be in downstream S/N failure 286-1 and 286-2 according to the measured values, and the cable modem 11-3 in the upstream side thereof is also determined to be in downstream S/N failure 286-3 according to the measured values. Furthermore, the cable modem 11-4 is causing failure of polling-no-response 288. Moreover, the cable modem 11-6 is causing downstream transmission level variation failure 290. All the measured values of the cable modems other than those above are normal. The process based on such failure information in the CATV transmission lines is as the following.

Figures 32A, 32B:
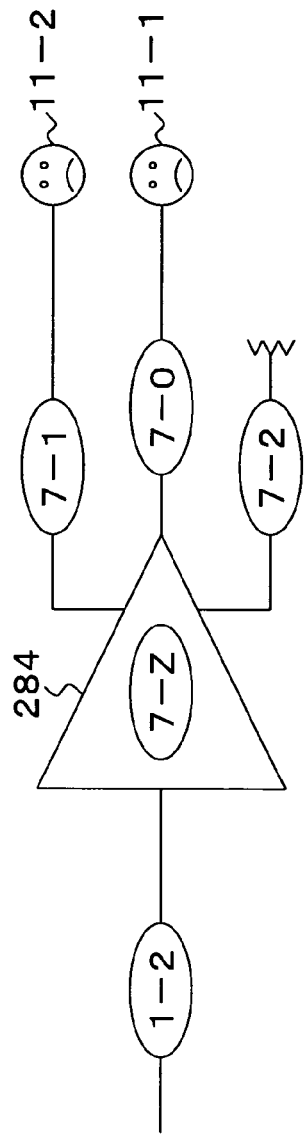
FIGS. 32A and 32B are explanatory diagrams at the time when failure analysis is started from the cable modems of FIG. 31 having downstream S/N failure.

FIGS. 32A and 32B represent a failure location estimation process based on the downstream S/N failure 286-1 and 286-2 of the cable modems 11-1 and 11-2, and the mapping state of the failure information before the process is started. That is, FIG. 32A abstracts the input and output sides of an amplifier 284, wherein the body address of the amplifier 284 is 7-Z, output port addresses thereof are 7-0, 7-1, and 7-2, and the input port address thereof is an output port address 1-2 of an amplifier 270 which is at the upstream side. It should be noted that these addresses are the addresses that are expressed in a simplified manner so as to simplify the explanation. A work table such as that in FIG. 32B is prepared for such transmission line part of FIG. 32A. The work table is provided with address status, failure substance, and state information, and sets the status of the addresses of the body and each of the ports of the amplifier 284. Herein, the output port of the address 7-2 of the amplifier 284 is unused, and that of the ports other than this is "undetermined" since failure search has not been performed. Meanwhile, with respect to the output ports of the addresses 7-0 and 7-1, "downstream S/N failure" is stored as failure information according to the measured values of the cable modems 11-1 and 11-2.

Figures 33A, 33B:
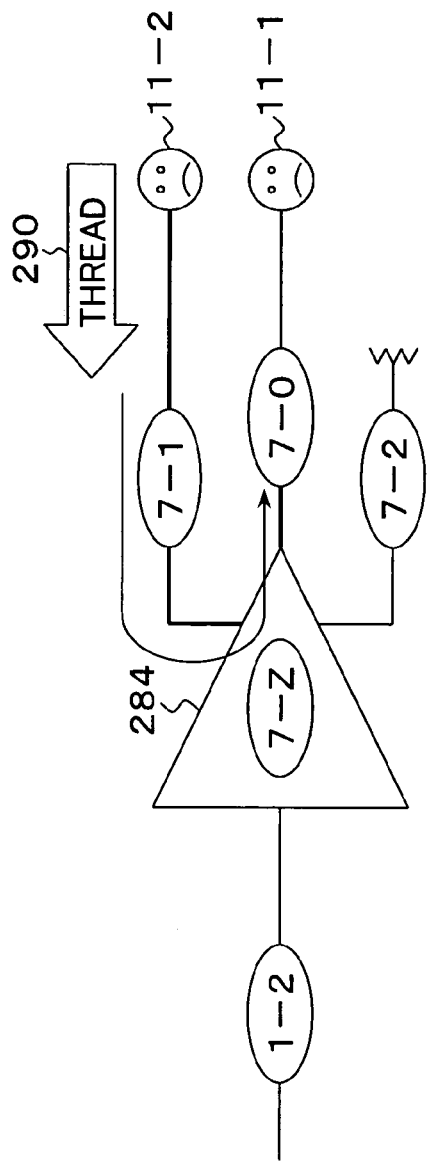
FIGS. 33A and 33B are explanatory diagrams of the state in which a first thread is advanced subsequent to FIGS. 32A and 32B.
Figures 34A, 34B:
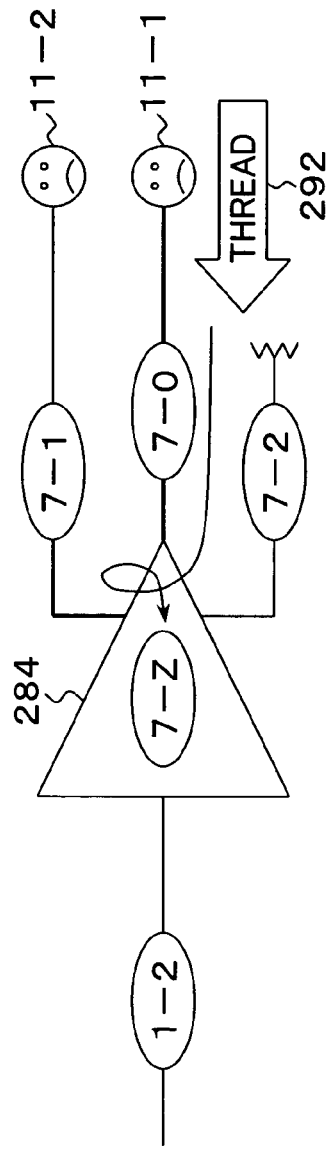
FIGS. 34A and 34B are explanatory diagrams of the state in which the first thread is advanced subsequent to FIGS. 33A and 33B.

Subsequently, as shown in FIG. 33A, according to a handle instance newly created for the downstream S/N failure, a thread 290 is set at a failure point, for example, the insegment to which the cable modem 11-2 belongs, and is caused to advance in the upstream direction so as to determine the transmission state of the output port of the address 7-1. As a result of this determination, the status of the output port of the address 7-1 in the work table of FIG. 33B is changed from previous "undetermined" to "failure". Herein, after determining the output port of the address 7-1, the thread 290 determines the state of other output ports of the address 7-0 and that in a used state. Since the port of the address 7-0 has not been subjected to determination by another thread, the thread 290 disappears at this point. Then, as shown in FIG. 34A, another thread 292 is set on the insegment including the cable modem 11-1 as a failure point, and caused to advance toward the upstream side, thereby determining the transmission state of the output port of the address 7-1. Accordingly, the status of the output port of the address 7-0 in the work table of FIG. 34B, "undetermined" until this moment is changed to "failure". The thread 292 that has determined the output port of the address 7-0 determines the state of the other output port of the address 7-1. At this point, the state is set to be "failure" as a result of the determination performed by the thread 290 that has arrived before and disappeared, therefore, the thread 292 survives and checks the state of the body of the amplifier 284. At this point, both the output ports of the amplifier 284 having the addresses 7-0 and 7-1 are in "failure", therefore, the thread 292 changes the status of the body having the address 7-Z in the work table to "entire failure", and further advances toward the upstream side.

Figures 35A, 35B:
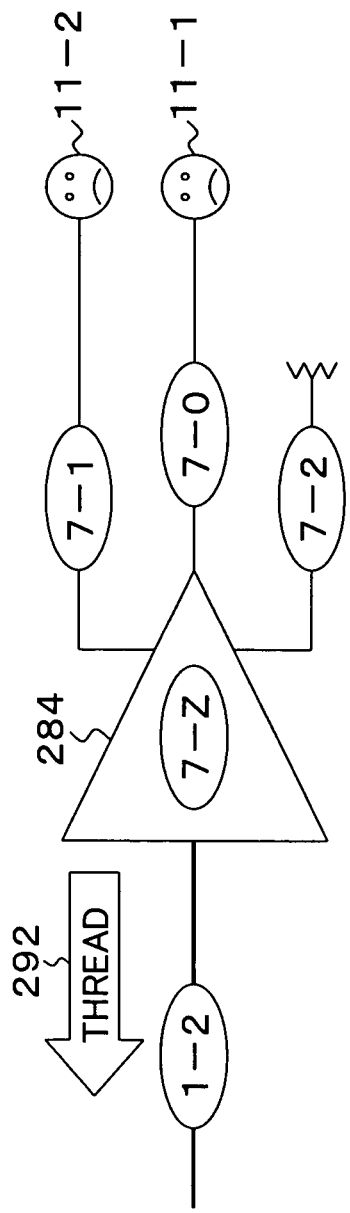
FIGS. 35A and 35B are explanatory diagrams of the state in which a second thread is advanced toward the input side subsequent to FIGS. 34A and 34B.
Figures 36A, 36B:
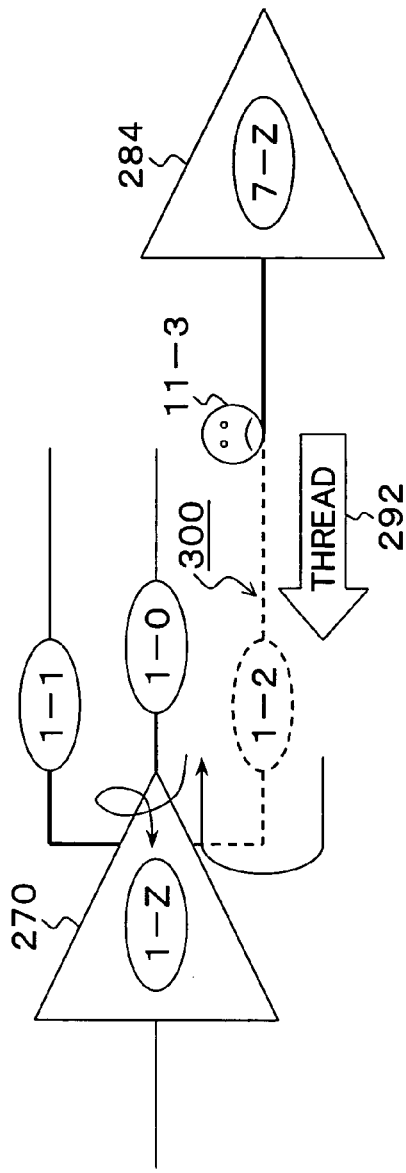
FIGS. 36A and 36B are explanatory diagrams of the state in which a thread arrived at an output port of an upstream-side transmission device and determined a failure insegment.

FIG. 35A shows the state in which the thread 292 has advanced to the input side of the amplifier 284, and the contents of the work table at this point is changed to that of FIG. 36B. FIG. 35A shows the state in which the thread 292 has advanced to the output port of an address 1-2 of the upstream-side amplifier 270 and performed determination. Herein, the cable modem 11-3 is present on the insegment of the amplifier 284, and the failure substance according to the measured values of the cable modem 11-3 is downstream S/N failure, therefore, the thread 292 changes the status of the output port of an address 1-2 from "undetermined" to "failure", and sets the failure substance "downstream S/N failure". Then, after performing determination of other output ports having addresses 1-0 and 1-1, the thread 292 advances to the body of an address 1-Z of the amplifier 270, since other threads have reached the ports and the status of all of them has set to "normal". In determination of the body, the status of the body is set to "mixed failure", because the status of the address 1-0 and 1-1 is "normal" and the state of the output port of the address 1-2 is "failure". When the amplifier 270 has mixed failure in above described manner, the insegment from the individual circuit of the amplifier 270 to the common circuit of the amplifier 284 is specified as the failure location. However, because the cable modem 11-3 is present on the failure insegment, and the failure has determined from the measured values, in this case, the backward insegment of the side of the upstream amplifier 270 is determined as a failure insegment, and "backward failure insegment" is recorded in the state information.

Figures 37A, 37B:
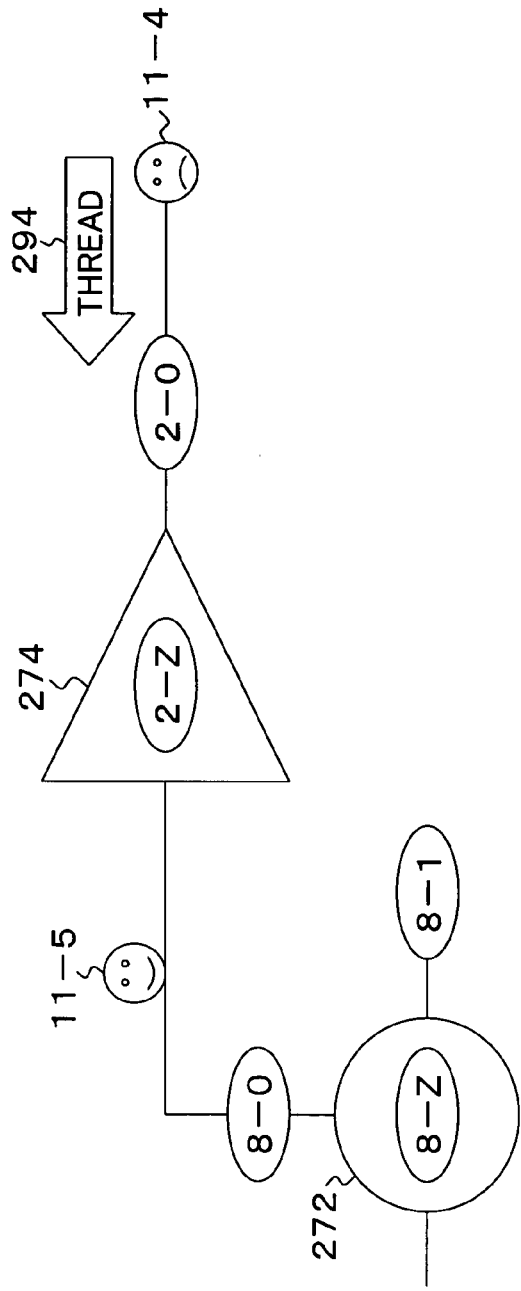
FIGS. 37A and 37B are explanatory diagrams at the time when failure analysis in which a thread is advanced starting from the cable modem of FIG. 31 having downstream no-response failure is started.
Figures 38A, 38B:
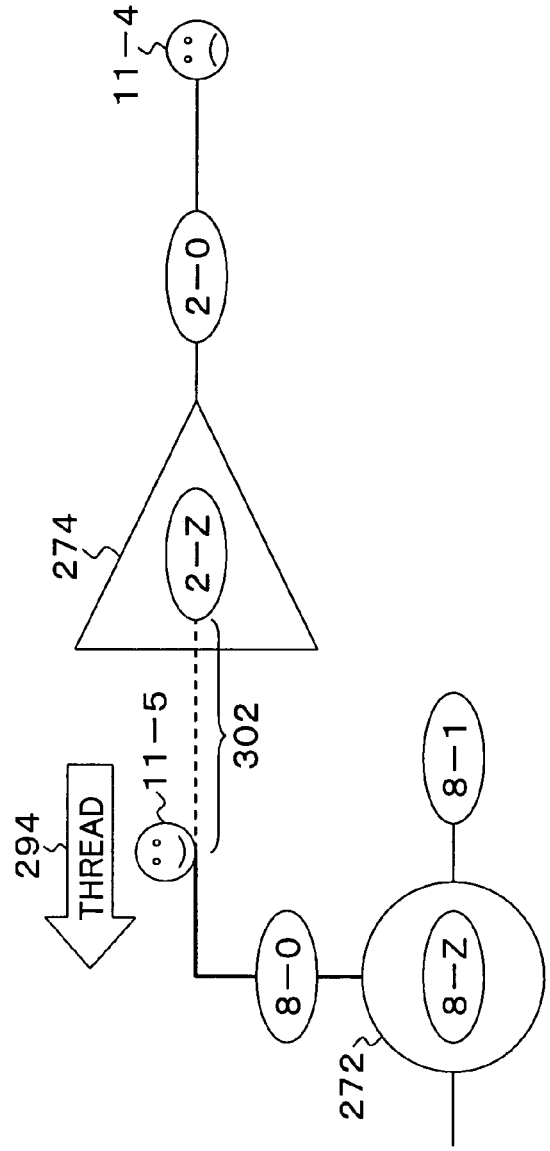
FIGS. 38A and 38B are explanatory diagrams of the state in which the thread arrived at an output port of the upstream-side transmission device and determined failure segment.

FIG. 37A abstracts the system ranging from the splitter 272 to the amplifier 274 of FIG. 31. In this part of the transmission lines, the cable modem 11-4 belonging to an end insegment is in the state of polling-no-response 288, and a thread 294 is advanced from this point to the upstream side, thereby searching the failure location. Herein, in the work table of FIG. 37B, "undetermined" state of the output port of an address 2-0 of the amplifier 274 is determined to "failure", the failure substance is set to "no response", and the thread advances to the body of an address 2-Z of the amplifier 274 so as to set the status to "entire failure". Subsequently, as shown in FIG. 38A, the thread 294 advances to the upstream side of the amplifier 274, subjects a port of an address 8-0 of the splitter 272 to determination, changes the status from "normal" to "failure", and sets the failure substance to "no response". Herein, the insegment between the splitter 272 and the amplifier 274 is determined to be a failure insegment. However, because the cable modem 11-5 is present on the failure insegment, and the measured values thereof are normal, the forward insegment in the downstream side is determined to be a failure insegment 302, and "forward failure insegment" is recorded as the state information of the body address 2-Z of the amplifier 274.

Figures 39A, 39B:
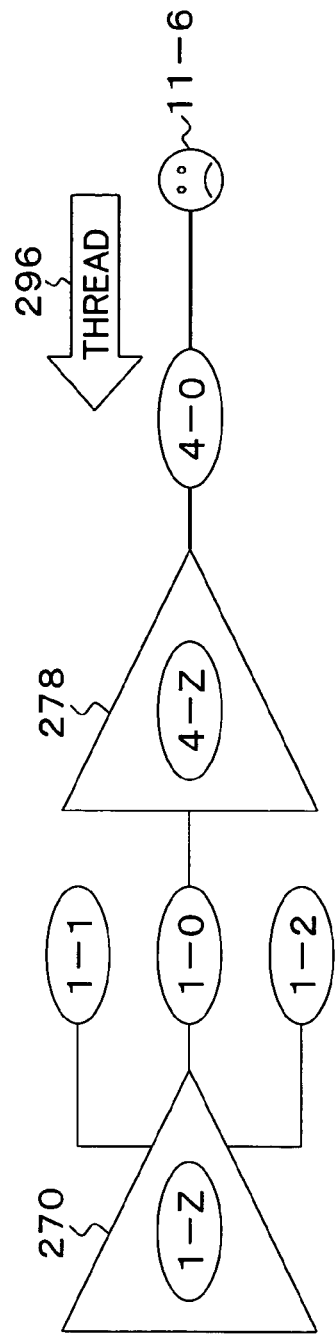
FIGS. 39A and 39B are explanatory diagrams at the time when failure analysis in which a thread is advanced starting from the cable modem of FIG. 31 having downstream transmission level variation failure is started.

FIGS. 39A and 39B show search of a failure location in the part of amplifiers 270 and 278 of FIG. 31. In FIG. 39A, downstream transmission level variation failure is determined from measured values by the cable modem 11-6, it is subjected to mapping as a failure point, and a thread 296 is advanced to the upstream side from this failure point, so as to subject the output port of an address 4-0 of the amplifier 278 to determination, and subsequently, the body of an address 4-Z of the amplifier 278 is subjected to determination. As a result, as shown in FIG. 39B, the status of the output port of the address 4-0 is changed from "undetermined" to "failure", and the failure substance is set to "downstream transmission level variation failure". Subsequently, the status of the body of the address 4-Z is changed from "undetermined" to "entire failure".

Figures 40A, 40B:
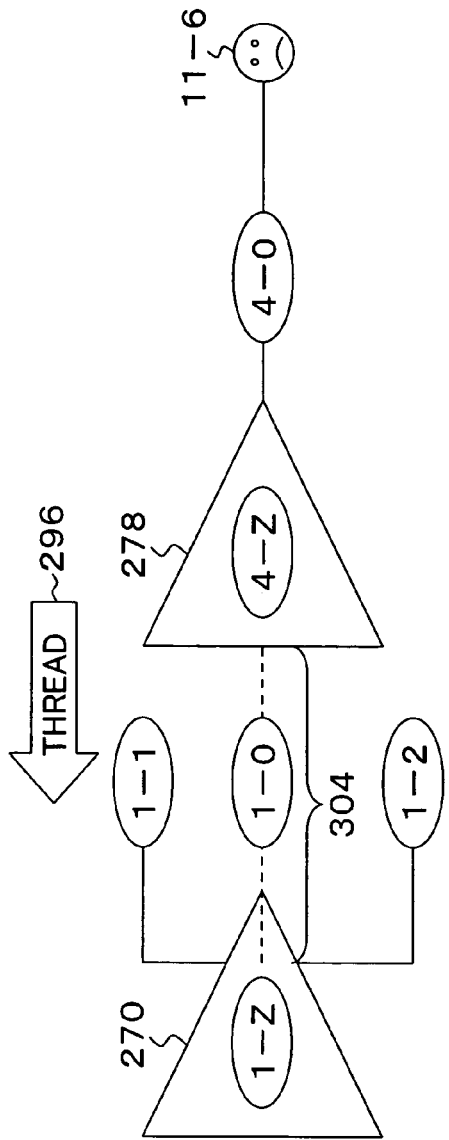
FIGS. 40A and 40B are explanatory diagrams of the state in which the thread arrived at an output port of the upstream-side transmission device and determined a failure insegment.

Subsequently, as shown in FIG. 40A, after the thread 296 advances to the upstream side of the amplifier 278 so as to perform determination of the output port of the address 1-0 of the amplifier 270, performs determination of other ports having the addresses of 1-1 and 1-2, and performs determination of the body having the address 1-Z.

As a result, in the work table of FIG. 40B, the state of the output port of the address 1-Z is changed from "undetermined" to "failure", and, subsequently, the state of the body of the address 1-0 is changed from "undetermined" to "mixed failure". At this point, other ports of the addresses 1-1 and 1-2 of the amplifier 270 are "normal", therefore the status of the body of the address 1-Z is set to "mixed failure". As a result, the insegment to which the output port of the address 1-0 belongs is determined to be a failure insegment, and the determination result "failure insegment" is written as the state information.

Figure 41A:
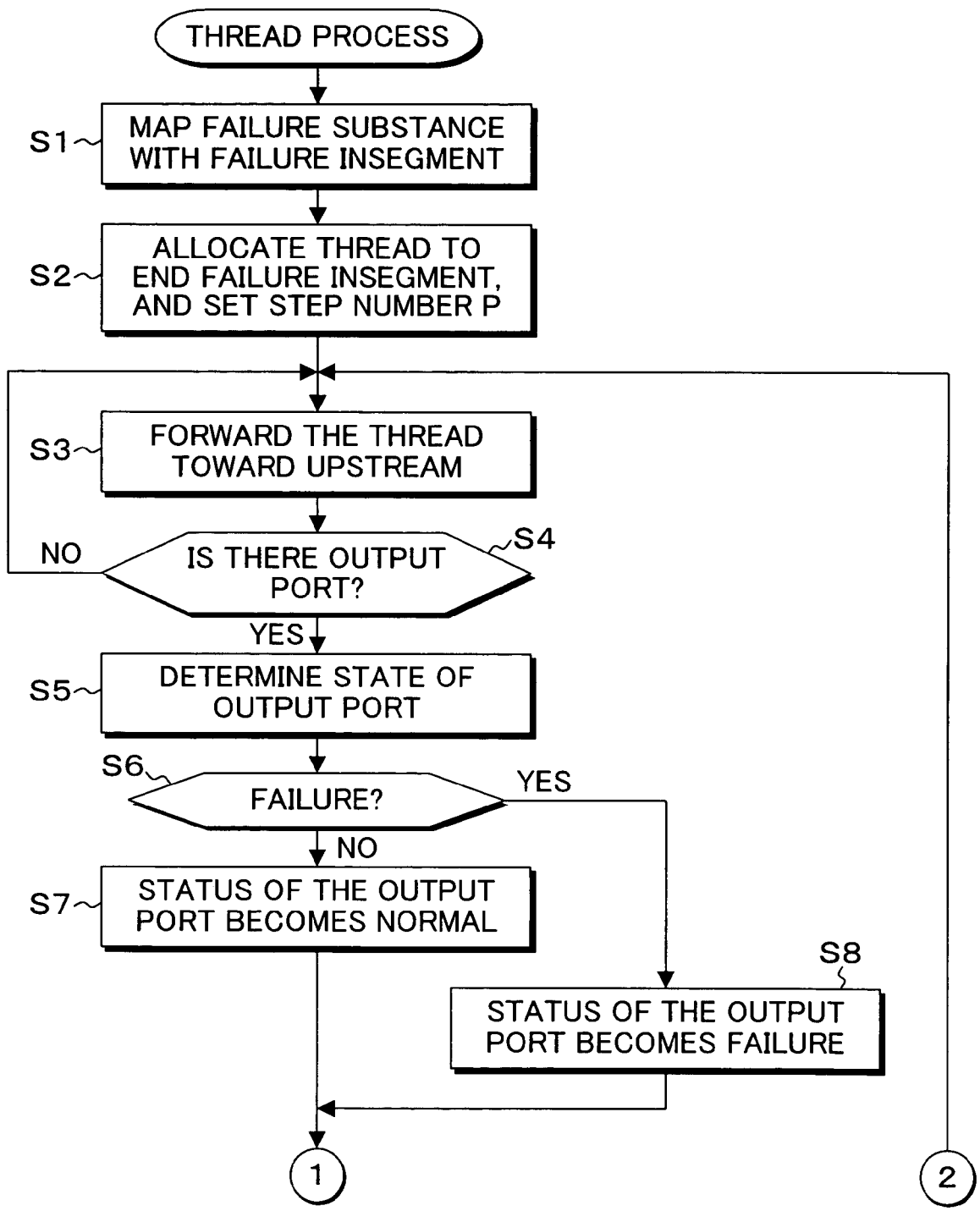
FIGS. 41A and 41B are flow charts of a thread process in the present invention.
Figure 41B:
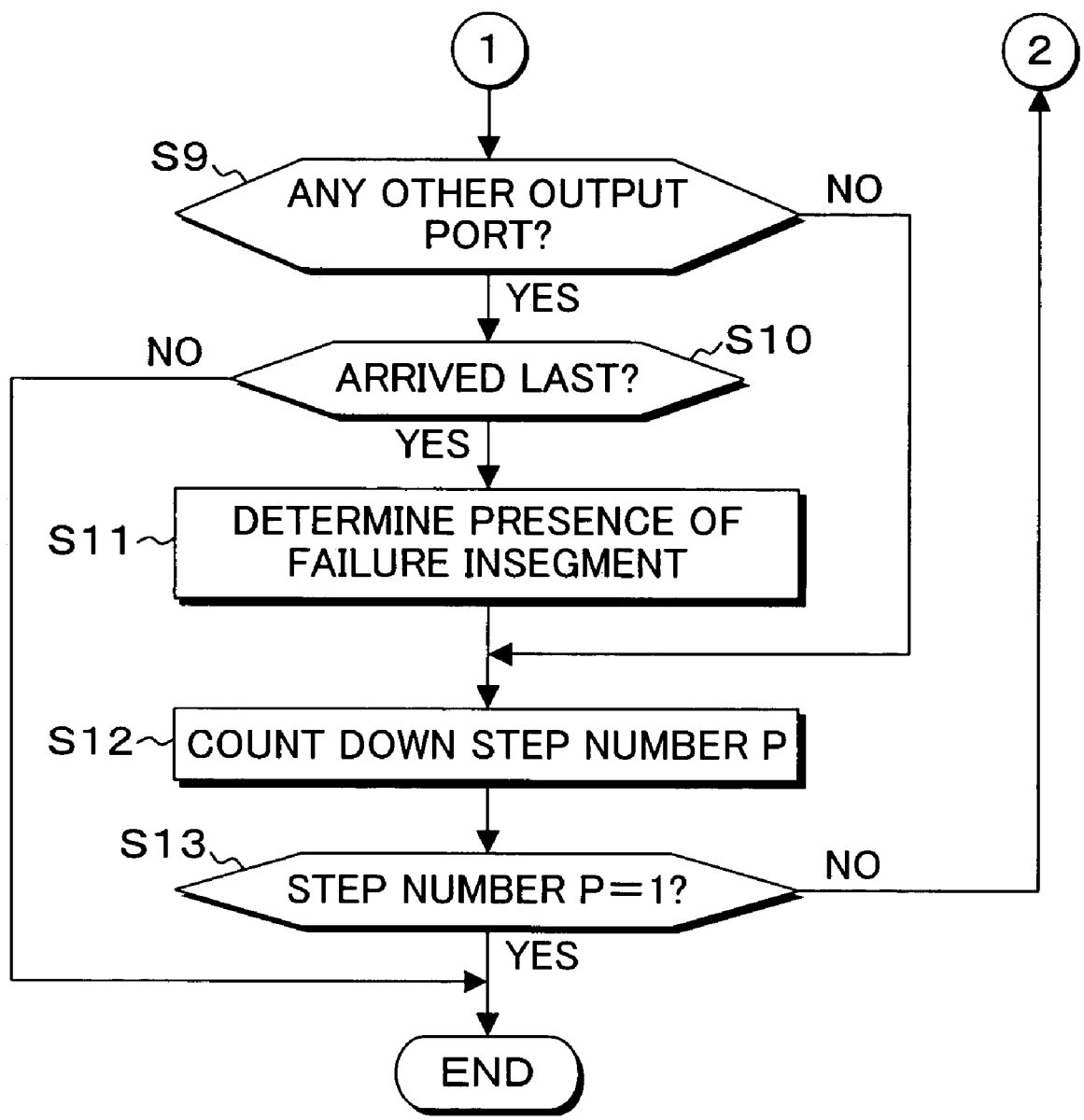

FIGS. 41A and 41B are flow charts of a malfunction specifying process by means of a thread advanced to the upstream side, wherein a failure substance is mapped with a failure insegment of a cable modem at an end of CATV transmission lines such as that of FIGS. 32A and 32B to FIGS. 40A and 40B. In the thread process of FIG. 41, after failure substances are mapped with failure insegments in a step S1, in a step S2, a thread is disposed at an end failure insegment, and a step number P belonging to the insegment is set. Then, the thread is advanced toward the upstream side in a step S3, and the presence of an output port is checked in a step S4. If there is an output port, the state of the output port is determined in a step S5, and whether or not it is failure is determined in a step S6. If there is no failure, the status of the output port is set to normal in a step S7, and if there is failure, in a step S8, the status of the output port is set to failure, and the failure substance is written.

Subsequently, whether or not there is another output port(s) is checked in a step 9, and if there is another output port(s), whether or not the thread per se arrived last is checked in a step S10. If it arrived last, the thread survives without change, and, in a step S11, it advances to the device body so as to determine the presence of a failure insegment, and records the determination result. Then, after the step number P is counted down by one in a step S12, in a step S13, whether or not the step number P=1, which is the final step number, is checked.

If it has not returned to one, the process proceeds to the step S3 again, wherein the thread is advanced toward the upstream side. On the other hand, if there is another thread(s) that has not yet arrived at the another output port(s) when the thread per se arrived at the output port in the step S10, it terminates the process and disappears. As described above, in the process of specifying the failure location(s) on the CATV transmission lines of the present invention according to failure information, a handle instance is generated for each failure type, failure substances are mapped with failure insegments at ends of the transmission lines, and a thread is disposed at each of failure points and advanced to the upstream side, such that each of the threads gradually returns along the step number in parallel, while repeating a determination process at every connection point so as to specify the failure location(s). Therefore, in a case in which the number of cable modems within the range from the headend to ends is, for example, over several hundreds, even when failure occurs simultaneously in a large number of cable modems, by efficiently advancing threads from end failure points, the failure locations on the transmission lines are automatically specified in units called failure insegments, and, by performing processes of analyzing the configuration constituents of the transmission devices belonging to the insegments, the failure substances can be appropriately estimated.

4. Multipoint Statistical Display

Figure 42:
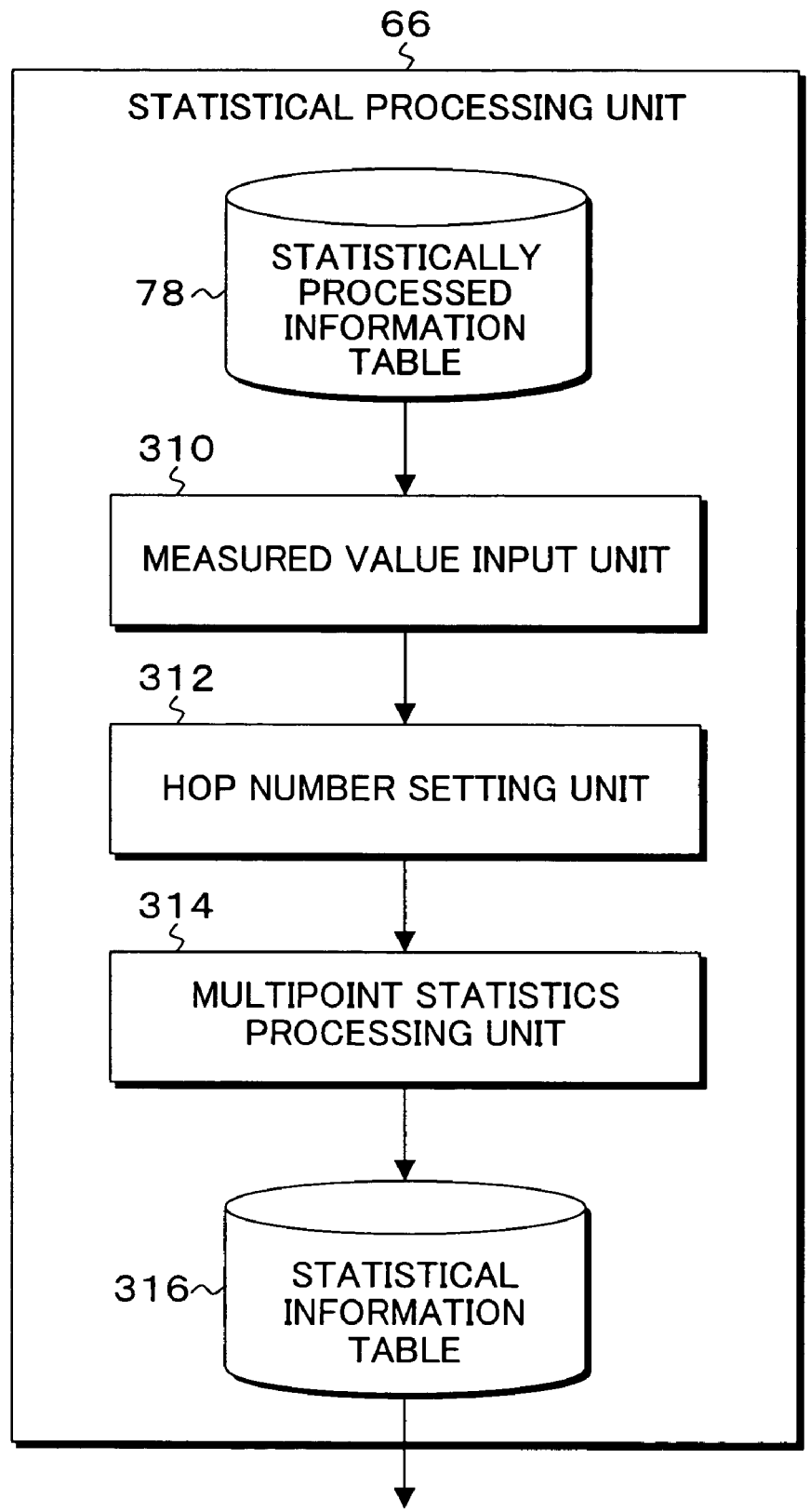
FIG. 42 is a functional block diagram of the statistical processing unit provided in the failure analysis server of FIG. 2 and FIG. 3.

FIG. 42 is a block diagram of the functional configuration of the statistical processing unit 66 provided in the server processing unit 62 of the failure analysis server 12 of FIG. 2 and FIG. 3. The statistical processing unit 66 is provided with a measured value input unit 310, a hop number setting unit 312, and a multipoint statistics processing unit 314, inputs statistical measured values of the statistically processed information table transferred from the failure detection server 10, and performs a statistical display process in which statistics corresponding to a plurality of points are displayed along with time on a time axis.

In other words, the measured value input unit 310 inputs statistical measured values of each cable modem, comprising an average value, a maximum value, and a minimum value obtained as 20-minute statistical values of the failure detection server 10. The hop number setting unit 312 sets a hop number that is added one by one every time passing through an active device, including an amplification circuit, toward the downstream, wherein the number of the optical node 24 in the CATV transmission lines 15 shown in FIG. 1 is assumed to be one. The multipoint statistics processing unit 314 selects, from the statistical measured values input by the measured value input unit 310, measured values of a plurality of cable modems disposed at the position at which the hop number thereof is the same, generates statistical information from the selected measured values and stores it in the statistical information table 316, and then, subjects the multipoint statistics to graph display in which the time axis is the horizontal axis and the vertical axis is that of the measured values in a display.

Figure 43:
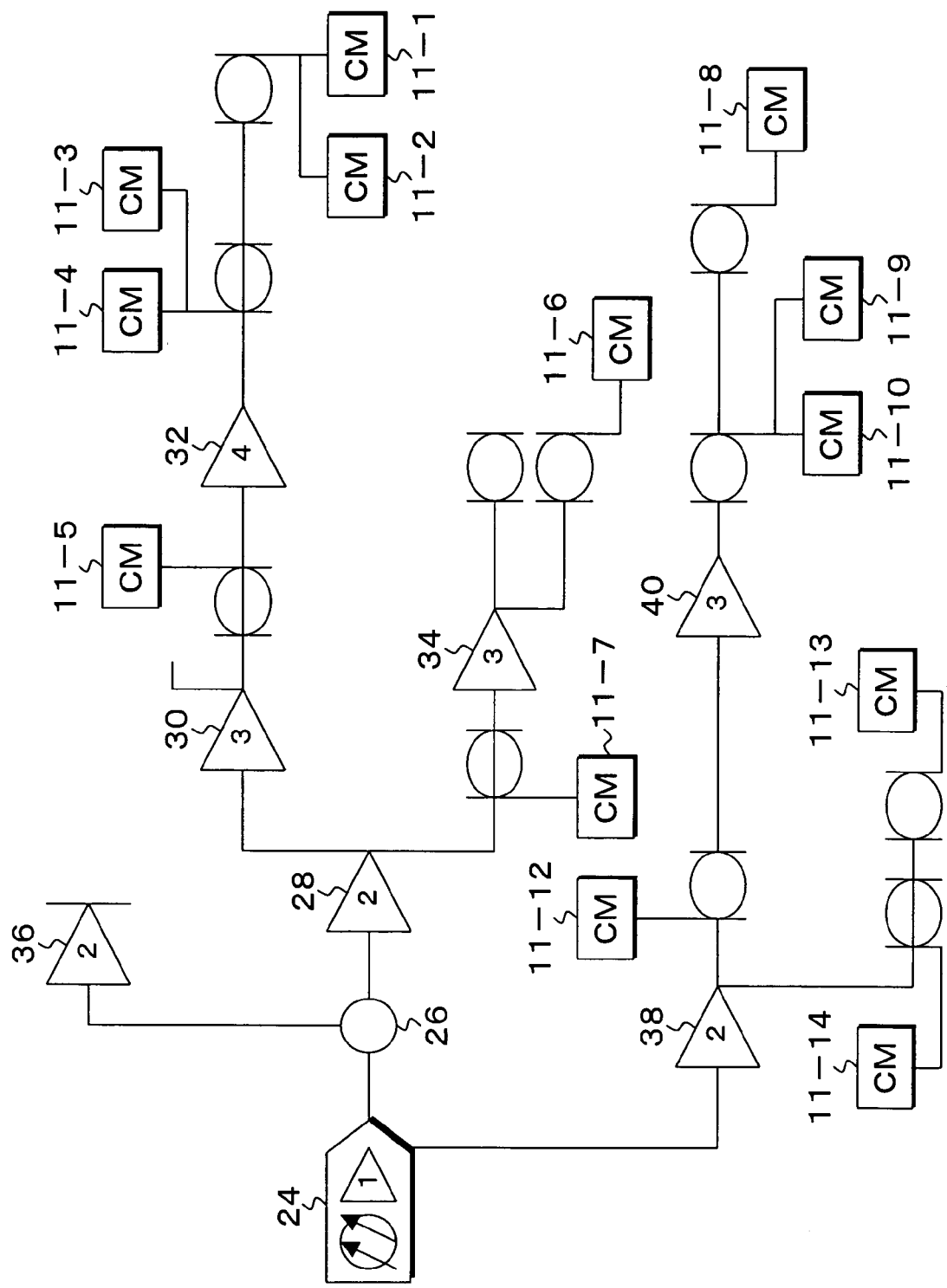
FIG. 43 is an explanatory diagram of CATV transmission lines in which the hop numbers serving as references of multipoint statistical display in the statistical process of FIG. 42 are shown.

In FIG. 43, the downstream side of the optical node 24 of the CATV transmission lines 15 of FIG. 1 is abstracted, and the setting of hop numbers with respect to the transmission lines is shown.

Figure 44:
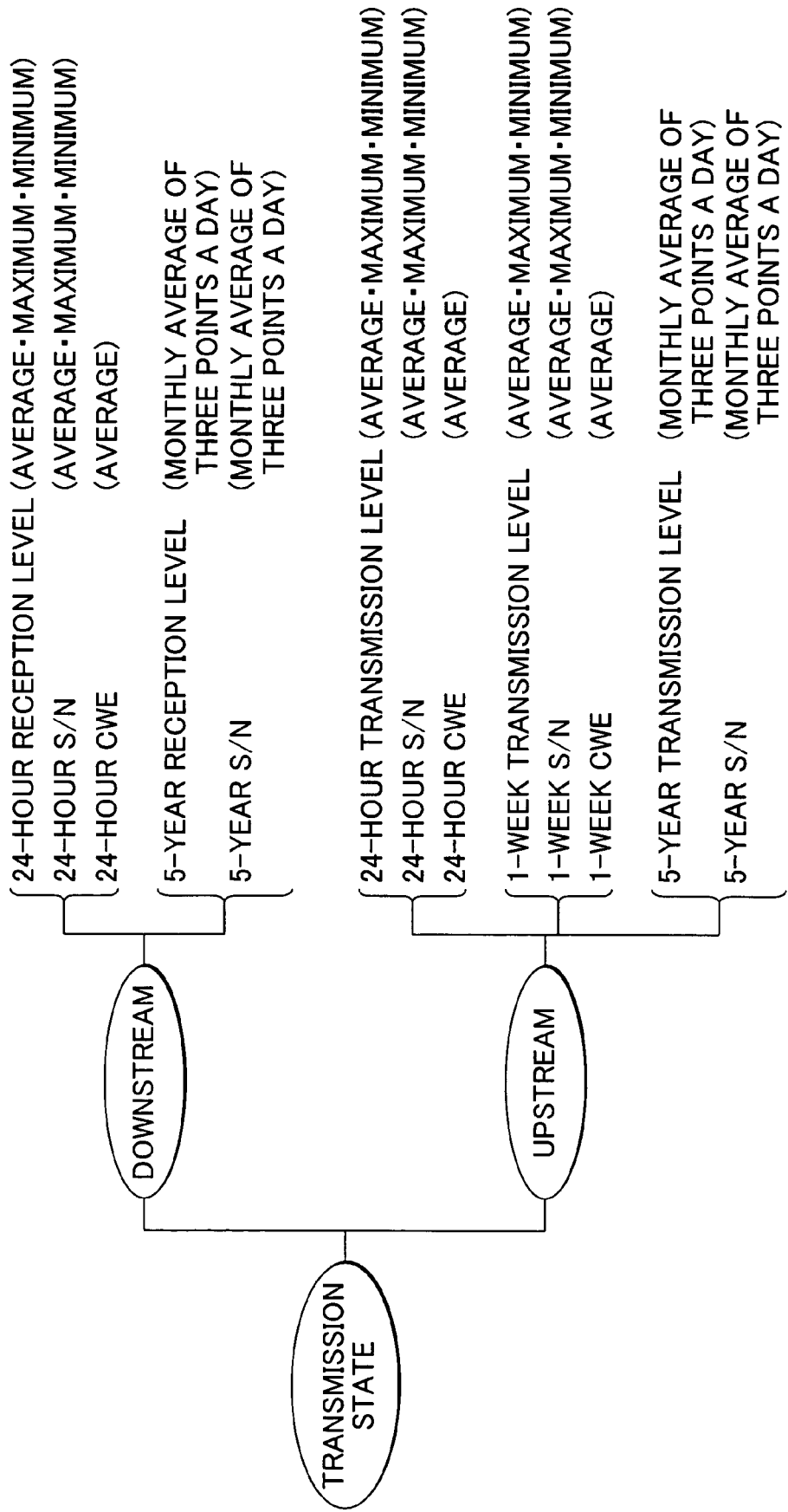
FIG. 44 is an explanatory diagram of statistical data of the state of transmission lines to be subjected to multipoint statistical display.
Figure 45:
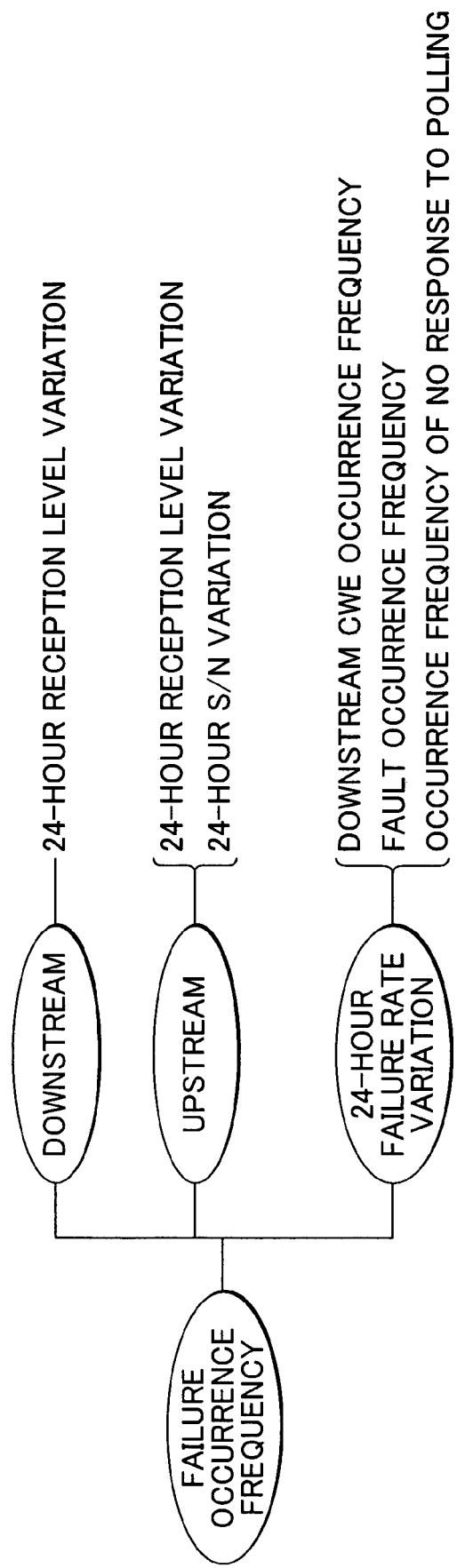
FIG. 45 is an explanatory diagram of statistical data of failure frequency to be subjected to multipoint statistical display.

That is, as shown in the optical node 24, the hop number is, hop number=1 at this point, and the hop number=2 at the TBAs 28 and 38 which are next active devices. Subsequently, at the BA 30 and 34 and the EA 40, the hop number=3. Moreover, the hop number=4 at the EA 32. In such CATV transmission lines 15, when the 20-minute statistical measured values from which the polling stream measurement results of the cable modems 11-1 to 11-14 are obtained are to be subjected to multipoint display so as to carry out comparison display of the transmission line state, if cable modems at arbitrary positions are selected so as to carry out multipoint display, the comparison display per se is nonsense since the conditions on the transmission lines are different. Therefore, in the present invention, in multipoint display of the measured values of cable modems, the measured values of the cable modems having the same hop number is subjected to multipoint display. For example, the cable modems corresponding to the hop number=2 are four cable modems 11-7, and 11-12 to 11-14, therefore, the measured values of the cable modems are subjected to multipoint display, thereby enabling statistical display of the measured values under almost-equivalent transmission line conditions. Similarly, the cable modems corresponding to the hop number=3 are the cable modems 11-5, 11-6, and 11-8 to 11-10, and, since the multipoint display of the measured values thereof is under the same transmission line conditions, significance is imparted to comparison display. Furthermore, the cable modems of the hop number=4 are the cable modems 11-1 to 11-4, and multipoint display is also carried out for these, thereby enabling comparison display under the same transmission line conditions. In such present invention, the statistical data to be subjected to multipoint statistical display is, with respect to the state of the transmission lines, the statistical data shown in FIG. 44. The data of failure frequency is the data shown in FIG. 45.

When the statistics based on the measured values collected from the cable modems of the same hop number of such statistical data are subjected to multipoint comparison display in the same graph, the statistical measured values can be subjected to appropriate comparative determination in the same transmission conditions.

Herein, the failure detection server 10 and the failure analysis server 12 shown in FIG. 2 and FIG. 3 are implemented by hardware resources of a computer. In the computer, connected to a bus of a CPU are RAM, a hard disk controller, a floppy disk driver, a CD-ROM driver, a mouse controller, a key board, a display controller, a communication port, etc. The hard disk controller is connected to a hard disk driver, loads application programs for executing the failure detection process and the failure analysis process of the present invention, and, upon start-up of the computer, invokes necessary programs from the hard disk and deploys them in the RAM so as to execute them by the CPU.

In the CATV transmission line monitoring system of the present invention, the system configuration is divided into the failure detection server 10 and the failure analysis server 12 as shown in FIG. 2 and FIG. 3, wherein the both systems are separated for the reason that a plurality units of the failure detection server 10 has to be installed, in accordance with needs, depending on the number of cable modems to be subjected to polling in the CATV transmission lines 15. For example, the number of cable modems that can be polled by one failure detection server 10 is, for example, 600, and the number of cable modems in a typical CATV system is generally, about 2,000 to 15,000. Therefore, even in a minimum scale, it is configured such that four failure detection servers 10 are installed for a failure analysis server 12. On the other hand, the restriction due to the number of the cable modems on the CATV transmission lines is not imposed on the failure analysis server 12 side, therefore, it can be provided as a common system for the plurality of failure detection servers 10. Certainly, as another embodiment, the failure detection server 10 and the failure analysis server 12 may be configured as one server.

The present invention is not limited by the above described embodiments, and includes arbitrary modifications that do not impair the objects and the advantages thereof. In addition, the numerical values described in the above described embodiments do not impose limitation on the present invention.

INDUSTRIAL APPLICABILITY

As described above, according to the present invention, an average value is obtained from the measured values of, for example, 20 minutes, collected from cable modems, the average value is used as a reference value for relatively determining the threshold values of the subsequent 20 minutes, and the threshold values are set by adding or subtracting predetermined statistical difference threshold values, to or from the reference value; accordingly, relative threshold value setting corresponding to actual temperature variation due to solar irradiation and seasonal variation can be realized, and, even when measured values vary under great influence of temperature variation, failure determination by use of precise threshold values canceling out the variation due to temperature variation can be carried out.

Moreover, in the present invention, when failure information is to be determined from the measured values that have been collected through polling, and a failure location(s) on transmission lines is to be estimated by analyzing it according to the failure information, a screening process for eliminating logically conflicting failure information from the determined failure information is performed in advance; accordingly, accuracy of the process for estimating the failure location(s) that is subsequently performed can be significantly improved.

Moreover, in the present invention, there introduced a new idea of an insegment of which unit ranging from an individual circuit of an upstream-side transmission device to a common circuit of a downstream-side transmission device as the unit for analyzing the failure location(s) on CATV transmission lines, the CATV transmission lines are logically abstracted as a collection of insegments, and, after the failure information is mapped in the end side with respect to the insegment collection, a failure location searching process is performed by repeating a process for determining the transmission state at a connection point of the upstream side; accordingly, even in a large scale CATV transmission lines, the failure location (s) on the transmission lines can be efficiently and readily estimated by specifying the substance of the failure at the failure point(s) at the end(s), furthermore, the failure location (s) can be determined down to the interior of transmission device(s), the accuracy of specifying the failure location(s) is improved, and responses such as repair and replacement upon occurrence of failure can be carried out more appropriately.

Furthermore, in the present invention, there introduced a new idea of a hop number that is added one by one every time passing through an active device having an amplification circuit, starting from an optical node to the downstream side in the CATV transmission lines, and statistical data is obtained and subjected to multipoint display, with respect to the measured values having the same hop number among the measured values of cable modems; accordingly, the hop number enables multipoint comparison display of the measurement information corresponding to the position under the almost same transmission conditions, and comparison display of multipoint statistics utilizing the statistics obtained from cable modem measured values can be performed more appropriately.

What is claimed is:

1. A CATV transmission line monitoring system comprising:
an information collecting unit for periodically collecting, by polling, a plurality of measured values detected at a plurality of cable modems, the plurality of cable modems being installed so as to be distributed over feeder lines of a subscriber's premises and a trunk line of CATV transmission lines having a tree structure;
a statistical processing unit for, at every predetermined time interval, calculating an average value of the plurality, of measured values collected during the predetermined time interval and storing the average value as statistically processed information;
a threshold value setting unit for dynamically setting a failure determination threshold value by adding or subtracting a predetermined statistical difference threshold value to or from the average value of a previous time; and
a failure determination unit for determining if a failure is present by comparing the set failure determination threshold value with a measured value collected at this point, and storing the determination result as failure information.

2. The CATV transmission line monitoring system of claim 1, wherein the predetermined time interval is a 20 minute interval.

3. The CATV transmission line monitoring system of claim 1, characterized in that wherein the threshold value setting unit sets a plurality of failure determination threshold values in multiple degrees by adding or subtracting a plurality of predetermined statistical difference threshold values to or from the average value of a previous time.

4. A CATV transmission line monitoring method comprising:
an information collecting step of periodically collecting, by polling, in a head-end side a plurality of measured values detected at a plurality of cable modems, the plurality of cable modems being installed so as to be distributed over feeder lines of a subscriber's premises and a trunk line of CATV transmission lines having a tree structure;
a statistical processing step of, at every predetermined time interval, using a processor to calculate an average value of the plurality of measured values collected during the predetermined time interval and storing the average value as statistically processed information;
a threshold value setting step of dynamically setting a failure determination threshold value by adding or subtracting a predetermined difference threshold value to or from the average value of a previous time; and
a failure determination step of determining if a failure is present by comparing the set failure determination threshold value with a measured value collected at this point, and storing the determination result as failure information.

5. A computer readable storage medium having a program stored thereon that when executed causes a computer to monitor a CATV transmission line, said program causing the computer to perform a method comprising: an information collecting step of periodically collecting, by polling, in the head-end side,
an information collecting step of periodically collecting, by polling, in the head-end side, a plurality of measured values detected at a plurality of cable modems, the plurality of cable modems being installed so as to be distributed over feeder lines of a subscriber's premises and a trunk line of CATV transmission lines having a tree structure;
a statistical processing step of, at every predetermined time interval, calculating an average value of the plurality of measured values collected during the predetermined time interval and storing the average value as statistically processed information;
a threshold value setting step of dynamically setting a failure determination threshold value by adding or subtracting a predetermined difference threshold value to or from the average value of a previous time; and
a failure determination step of determining if a failure is present by comparing the set failure determination threshold value with a measured value collected at this point, and storing the determination result as failure information.

6. A CATV transmission line monitoring system comprising:
a failure information input unit for periodically inputting failure information determined from a plurality of measured values of a plurality of cable modems and failure information collected from the plurality of cable modems, the plurality of cable modems being installed so as to be distributed over feeder lines and a trunk line of CATV transmission lines having a tree structure;
a screening processing unit for determining logically conflicting failure information and changing the determined logically conflicting failure information into normal information;
a failure information extraction unit for extracting changed failure information and newly generated failure information by obtaining a differential of screened failure information between a present this time and a previous time; and
a failure location estimation unit for defining the CATV transmission line as a logically abstract data structure, and estimating, with this data structure as a target, a failure generated location by repeating state determination at an upstream connection point, starting from an end position of the CATV transmission lines on which one of the plurality of cable modems having the failure information is disposed.

7. The CATV transmission line monitoring system of claim 6, wherein the failure location estimation unit includes:
a transmission line definition unit for defining, with respect to a plurality of transmission devices positioned at two connection points, an insegment of the downstream-side transmission device ranging from a common circuit of the downstream-side transmission device to an individual circuit of the upstream-side transmission device, and expressing the CATV transmission lines as a continuous collection of the insegments;
a failure specification processing unit for setting an end insegment as a start point at which the one of the plurality cable modems corresponding to the failure information is positioned, and specifying a failure insegment by repeating state determination in an insegment unit toward the upstream side; and
a failure substance estimation unit for estimating a failure cause by analyzing failure substance of one of the plurality of transmission devices of the specified failure insegment.

8. The CATV transmission line monitoring system of claim 7, wherein
the transmission line definition unit allocates a unique address to each device body, input port, and output port of the plurality of transmission devices on the CATV transmission lines, and allocates the output port address of the upstream-side transmission device to an address of the insegment, and
the transmission line definition unit expresses the continuous collection of insegments as a continuous collection of addresses and parent addresses indicating the allocated address of the insegment and the allocated address of the upstream-side insegment.

9. The CATV transmission line monitoring system of claim 7, wherein
if one of the plurality of cable modems is disposed between the common circuit of the downstream-side transmission device and the individual circuit of the upstream-side transmission device belonging to the insegment, the transmission line definition unit divides the insegment into an upstream-side insegment and a downstream-side insegment bordering at the position of the one of the plurality of cable modems, and
the failure specification processing unit specifies the downstream-side insegment as a failure location if the one of plurality of cable modems has normal information, and specifies the upstream-side insegment as a failure location if the one of plurality of cable modem has failure information.

10. The CATV transmission line monitoring system of claim 7, wherein
the transmission line definition unit defines a step number which is incremented each time passing downstream through a transmission device serving as a branching point of the CATV transmission lines, and
the failure specifying unit specifies the failure insegment by specifying a failure end insegment according to failure information of the continuous collection of insegments, and sequentially advancing threads for failure search upstream of the step number starting from each failure end insegment so as to determine the state.

11. The CATV transmission line monitoring system of claim 10, wherein each sequentially advancing thread determines, every time advancing to an upstream insegment, whether or not the upstream insegment is a connection point after determining the state of an output port of the transmission device belonging to the insegment, and, if a connection point is determined, advances to a next insegment if the sequentially advancing thread arrived last, and disappears if there is a sequentially advancing thread that has not arrived yet.

12. The CATV transmission line monitoring system of claim 7, wherein
the transmission line definition unit defines each of the transmission devices on the CATV transmission lines by selecting and setting effectiveness or ineffectiveness of constituent elements in a common template, and
the failure estimation unit estimates the failure substance by analyzing the template of the transmission device of the specified failure insegment.

13. The CATV transmission line monitoring system of claim 12, wherein the constituent elements of which effectiveness or ineffectiveness to be selected and set include a downstream common amplifying unit, a downstream common gain-control unit, an upstream common amplifying unit, an upstream common gain-control unit, a downstream output, an individual downstream amplifying unit, a downstream input, a power supply input, a power supply output, an optical reception unit, and an optical transmission unit.

14. The CATV transmission line monitoring system of claim 6, wherein the failure information input unit requests a CATV transmission line monitoring system dedicated to failure detection to transfer to the failure information unit failure information determined from a plurality of measured values collected, through polling, of the plurality of cable modems and the failure information from the cable modems.

15. A CATV transmission line monitoring method comprising:
a failure information input step of periodically inputting failure information determined from a plurality of measured values of a plurality of cable modems and failure information collected from the plurality of cable modems, the plurality of cable modems being installed so as to be distributed over feeder lines and a trunk line of CATV transmission lines having a failure information input unit tree structure;
a screening step of using a processor to determine logically conflicting failure information from the failure information of the plurality of cable modems and changing the determined logically conflicting failure information into normal information;
a failure information extraction step of extracting changed failure information and newly generated failure information by obtaining a differential of screened failure information between a present time and a previous time;
a failure location estimation step of defining the CATV transmission line as a logically abstract data structure, and with this data structure as a target, estimating a failure generated location by repeating state determination at an upstream connection point, starting from an end position of the CATV transmission lines on which one of the plurality of cable modems having the failure information is disposed.

16. A computer readable storage medium having a program stored thereon that when executed causes a computer to monitor a CATV transmission line, said program causing the computer to perform a method comprising:
a failure information input step of periodically inputting failure information determined from a plurality of measured values of a plurality of cable modems and failure information collected from the plurality of modems, the plurality of modems being installed so as to be distributed over feeder lines and a trunk line of CATV transmission lines having a tree structure;
a screening step of determining logically conflicting failure information from the failure information of the plurality of cable modems and changing the determined logically conflicting failure information into normal information;
a failure information extraction step of extracting changed failure information and newly generated failure information by obtaining a differential of screened failure information between a present time and a previous time; and
a failure location estimation step of defining the CATV transmission line as a logically abstract data structure, and with the data structure as a target, estimating a failure generated location by repeating state determination at an upstream connection point, starting from an end position of the CATV transmission lines on which one of the plurality of cable modems having the failure information is disposed.

17. A CATV transmission line monitoring comprising:
a measured value input unit for inputting a plurality of measured values periodically collected, by polling, from a plurality of cable modems, the plurality cable modems being installed so as to be distributed over feeder lines of a subscriber's premises and a trunk line of CATV transmission lines having a tree structure;
a hop number setting unit for setting a hop number which is incremented each time passing downstream through an active device, starting from an optical node of the CATV transmission lines; and
a statistical processing unit for selecting measured values of a plurality of cable modems disposed at positions having the same hop number among input measured values, and generating statistical information from the selected measured values of the plurality of cable modems, so as to subject the statistical information to comparison display in a multipoint manner.

18. The CATV transmission line monitoring system of claim 17, wherein the measured value input unit inputs an average value, a maximum value, and a minimum value of every predetermined time obtained from the plurality of measured values collected from the cable modems.

19. The CATV transmission line monitoring system of claim 17, wherein the statistical processing unit subjects the statistical information to comparison display with respect to the plurality of measured values collected from the plurality of cable modems by dividing them into distributions of 24 hours, one week, one month, and one year.

20. A failure analysis method comprising:
- a measured value input step of inputting a plurality of measured values periodically collected, by polling from a plurality of cable modems, the plurality of cable modems being installed so as to be distributed over feeder lines of a subscriber's premises and a trunk line of CATV transmission lines having a tree structure;
- a hop number setting step of setting a hop number which is incremented each counted up time passing downstream through an active device, starting from an optical node of the CATV transmission lines; and
- a statistical processing step of using a processor to select measured values of a plurality of cable modems disposed at the positions having the same hop number among input measured values, and generating statistical information from the selected measured values of the plurality of cable modems, so as to subject the statistical information to comparison display in a multipoint manner.

21. A computer readable storage medium having a program stored thereon that when executed causes a computer to monitor a CATV transmission line, said program causing the computer to perform a method comprising:
- a measured value input step of inputting a plurality of measured values periodically collected, by polling, from a plurality of cable modems, the plurality of cable modems being installed so as to be distributed over feeder lines of a subscriber's premises and a trunk line of CATV transmission lines having a tree structure;
- a hop number setting step of setting a hop number which is incremented each time passing downstream through an active device, starting from an optical node of the CATV transmission lines; and
- a statistical processing step of selecting measured values of a plurality of cable modems disposed at positions having the same hop number among the input measured values, and generating statistical information from the selected measured values of the plurality of cable modems, so as to subject the statistical information to comparison display in a multipoint manner.

* * * * *